(12) United States Patent
Yamagishi

(10) Patent No.: US 6,982,747 B2
(45) Date of Patent: Jan. 3, 2006

(54) NOTIFICATION OF OPERATING STATUS IN IMAGE SENSING SYSTEM

(75) Inventor: Yoichi Yamagishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 820 days.

(21) Appl. No.: 09/858,454

(22) Filed: May 17, 2001

(65) Prior Publication Data

US 2002/0012048 A1    Jan. 31, 2002

(30) Foreign Application Priority Data

May 18, 2000  (JP) .............................. 2000-146940
May 19, 2000  (JP) .............................. 2000-148889

(51) Int. Cl.
  *H04N 5/232*  (2006.01)
(52) U.S. Cl. .............................. 348/211.1; 348/333.01; 348/231; 348/207.1
(58) Field of Classification Search ........... 348/333.01, 348/207.1, 211.1–211.99, 552, 231–233, 348/14; 455/415, 552
See application file for complete search history.

(56) References Cited

U.S. PATENT DOCUMENTS

| | | | |
|---|---|---|---|
| 5,825,413 A | * 10/1998 | Mullis | ........................ 348/155 |
| 6,069,648 A | * 5/2000 | Suso et al. | ................ 348/14.02 |
| 6,522,354 B1 | * 2/2003 | Kawamura et al. | ....... 348/231.2 |
| 6,675,008 B1 | * 1/2004 | Paik et al. | ............... 348/14.02 |
| 6,775,361 B1 | * 8/2004 | Arai et al. | ............... 348/14.01 |
| 6,784,924 B2 | * 8/2004 | Ward et al. | .............. 348/207.1 |

FOREIGN PATENT DOCUMENTS

| | | |
|---|---|---|
| JP | 06-205274 | 7/1994 |
| JP | 11-136323 | 5/1999 |
| JP | 11-186954 | 7/1999 |
| JP | 11-187289 | 7/1999 |
| JP | 11-275394 | 10/1999 |
| JP | 11-275425 | 10/1999 |
| JP | 2000-059501 | 2/2000 |

* cited by examiner

*Primary Examiner*—David L. Ometz
*Assistant Examiner*—Gevell Selby
(74) *Attorney, Agent, or Firm*—Fitzpatrick, Cella, Harper & Scinto

(57) ABSTRACT

In an image sensing system including at least one image sensing apparatus and at least one communication apparatus, the communication apparatus transmits the operating status of the communication apparatus to the image sensing apparatus. The image sensing apparatus determines the received operating status and displays the operating status on the display in accordance with the determination result.

46 Claims, 30 Drawing Sheets

NOTIFICATION OF OPERATING STATUS IN IMAGE SENSING SYSTEM

FIELD OF THE INVENTION

The present invention relates to an image sensing system, image sensing apparatus, communication apparatus, control method therefor, and storage medium and, more particularly, to an image sensing system in which communication is performed between an image sensing apparatus and a communication apparatus, and a control method therefor.

BACKGROUND OF THE INVENTION

Conventionally, image sensing apparatuses such as an electronic camera which records/reproduces a still image or moving image using a memory card having a solid-state memory device as a recording medium have already been commercially available, and communication apparatuses such as a portable telephone for communicating sound and images have also been commercially available.

A person who carries an image sensing system constituted by such an electronic camera and portable telephone can pursue outdoor operation with high mobility without being constrained to indoor operation at an office or home.

In the conventional image sensing system using an electronic camera and portable telephone, when the user senses an image with the electronic camera held by hands, he/she often puts the portable telephone in a bag or the like to avoid interference in image sensing.

For this reason, in, e.g., long-time image sensing for material collection using the electronic camera, the user rarely checks the battery level, radio wave intensity, and the like of the portable telephone. The user does not become aware of the low battery level, incommunicable zone, and other statuses unless he/she comes to make an actual call, and consequently, cannot call.

In this case, the user can know the status if the portable telephone generates warning sound.

However, a mute state must be set to prevent any interference in image sensing or to keep silence. In this case, the user can hardly be aware of the low battery level, incommunicable zone, and other statuses of the portable telephone.

In the conventional image sensing system using an electronic camera and portable telephone, the portable telephone which is a two-way communication device and often used as a passive device is relatively frequently operated on many occasions, while the electronic camera as an active device is relatively infrequently used on a few occasions.

For this reason, the statuses of the portable telephone, including the battery level, are relatively frequently checked, though the statuses of the electronic camera, including the battery level, are relatively rarely checked. The user does not become aware of the low battery level and other statuses of the electronic camera unless he/she comes to execute actual image sensing, so he/she cannot sense intended images or misses the chance of image sensing.

SUMMARY OF THE INVENTION

The present invention has been made in consideration of the above situation, and has as its object to allow a user to know the operating status of a communication apparatus such as a portable telephone in an image sensing apparatus such as an electronic camera.

According to the present invention, the foregoing object is attained by providing an image sensing system comprising at least one image sensing apparatus and at least one communication apparatus, wherein the communication apparatus comprises transmission means for transmitting an operating status of the communication apparatus to the image sensing apparatus; and the image sensing apparatus comprises image sensing means, reception means for receiving the operating status transmitted from the transmission means, first status determination means for determining the operating status of the communication apparatus, which is received by the reception means, and display means for displaying the operating status of the communication apparatus in accordance with a determination result by the first status determination means.

Further, the foregoing object is also attained by providing an image sensing system comprising at least one image sensing apparatus and at least one communication apparatus, wherein the image sensing apparatus comprises image sensing means, status determination means for determining an operating status of the image sensing apparatus, first transmission means for transmitting a determination result by the status determination means to the communication apparatus, first reception means for receiving an operating status of the communication apparatus, and display means, and the communication apparatus comprises second reception means for receiving the determination result transmitted from the first transmission means, and second transmission means for transmitting the operating status of the communication apparatus to the image sensing apparatus in accordance with the determination result received by the second reception means, the display means displaying the operating status of the communication apparatus, which is received by the first reception means.

Furthermore, the foregoing object is also attained by providing a control method for an image sensing system comprising at least one image sensing apparatus and at least one communication apparatus, comprising the transmission step of transmitting an operating status of the communication apparatus to the image sensing apparatus, the reception step of receiving the operating status transmitted in the transmission step, the first status determination step of determining the operating status of the communication apparatus, which is received in the reception step, and the display step of displaying the operating status of the communication apparatus in accordance with a determination result in the first status determination step.

Further, the foregoing object is also attained by providing a control method for an image sensing system comprising at least one image sensing apparatus and at least one communication apparatus, comprising the status determination step of determining an operating status of the image sensing apparatus, the first transmission step of transmitting a determination result in the determination step to the communication apparatus, the first reception step of receiving an operating status of the communication apparatus, the second reception step of receiving the determination result transmitted in the first transmission step, the second transmission step of transmitting the operating status of the communication apparatus to the image sensing apparatus in accordance with the determination result received in the second reception step, and the display step of displaying the operating status of the communication apparatus, which is received in the first reception step.

It is another object of the present invention to improve the convenience by changing the display of the operating status of a communication apparatus in an image sensing apparatus in accordance with the operating status of the image sensing apparatus.

It is still another object of the present invention to allow a user to know call termination at a communication apparatus during use of an image sensing apparatus.

According to the present invention, the image sensing apparatus of the system further comprises second status determination means for determining an operating status of the image sensing apparatus, and the operating status of the communication apparatus includes at least one of an operating status of a power source function and an operating status of a communication function of the communication apparatus, the operating status of the image sensing apparatus is an operating status of an image sensing switch of the image sensing apparatus, and the display means displays at least one of the operating status of the power source function and the operating status of the communication function in accordance with a determination result of the status of the image sensing switch by the second status determination means.

Further, according to the present invention, the method further comprising the second status determination step of determining an operating status of the image sensing apparatus in the image sensing apparatus, wherein the operating status of the communication apparatus includes at least one of an operating status of a power source function and an operating status of a communication function of the communication apparatus, the operating status of the image sensing apparatus is an operating status of an image sensing switch of the image sensing apparatus, and at least one of the operating status of the power source function and the operating status of the communication function is displayed in the display step in accordance with a determination result of the status of the image sensing switch in the second status determination step.

It is still another object of the present invention to allow a user to check, in a communication apparatus such as a portable telephone, the status of an image sensing apparatus such as an electronic camera communicable with the communication apparatus.

According to the present invention, the foregoing object is attained by providing an image sensing system comprising at least one image sensing apparatus and at least one communication apparatus, wherein the image sensing apparatus comprises image sensing means, and transmission means for transmitting an operating status of the image sensing apparatus to the communication apparatus, and the communication apparatus comprises reception means for receiving the operating status transmitted from the transmission means, status determination means for determining the operating status of the image sensing apparatus, which is received by the reception means, and display means for displaying the operating status of the image sensing apparatus in accordance with a determination result by the status determination means.

Further, the foregoing object is also attained by providing a control method for an image sensing system comprising at least one image sensing apparatus and at least one communication apparatus, comprising the notification step of notifying the communication apparatus of an operating status of the image sensing apparatus, the reception step of receiving, in the communication apparatus, the operating status transmitted in the notification step, the determination step of determining, in the communication apparatus, the operating status of the image sensing apparatus, which is received in the reception step, and the display step of displaying the operating status of the image sensing apparatus in accordance with a determination result in the status determination step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
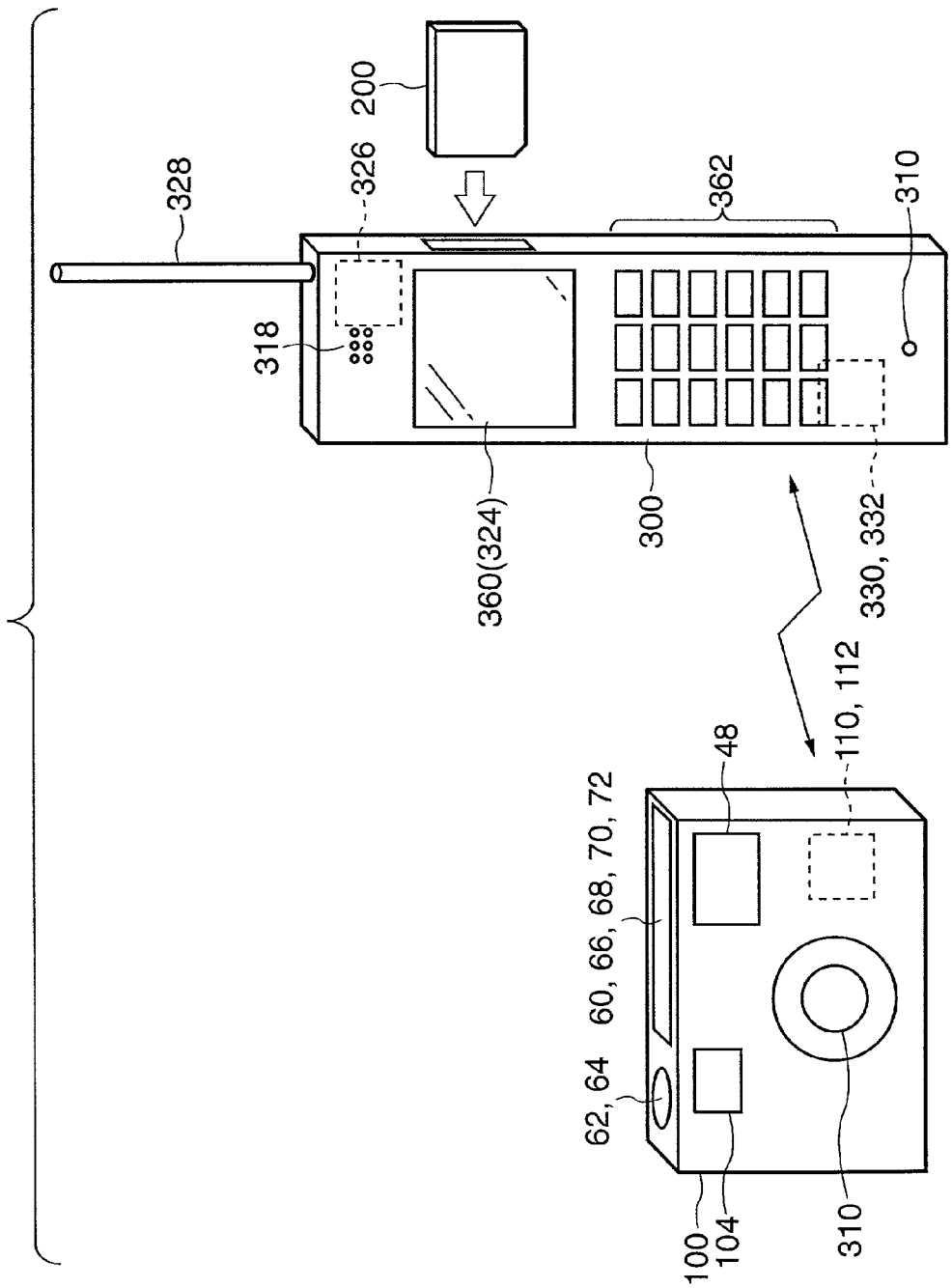
FIG. 1 is a view showing the overall arrangement of an image sensing system according to an embodiment of the present invention.

FIG. 1 is a view showing the overall arrangement of an image sensing system according to an embodiment of the present invention.

Referring to FIG. 1, reference numeral 100 denotes an image sensing apparatus; 200, a recording medium; and 300, a communication apparatus.

The image sensing apparatus 100 and communication apparatus 300 exchange data including commands and images by radio communication through a communication unit 110 and antenna 112, and a communication unit 330 and antenna 332, respectively.

The radio communication between the image sensing apparatus 100 and the communication apparatus 300 is executed by a spread spectrum scheme such as Bluetooth.

The image sensing apparatus 100 transmits image data obtained through a lens 10 to the communication apparatus 300 through the communication unit 110, antenna 112, antenna 332, and communication unit 330. The communication apparatus 300 can record the received image data in the detachable recording medium 200 and also transmit the image data to another communication apparatus or communication base station through a communication unit 326 and antenna 328.

<Description of Arrangement of Image Sensing Apparatus 100>

Figure 2:
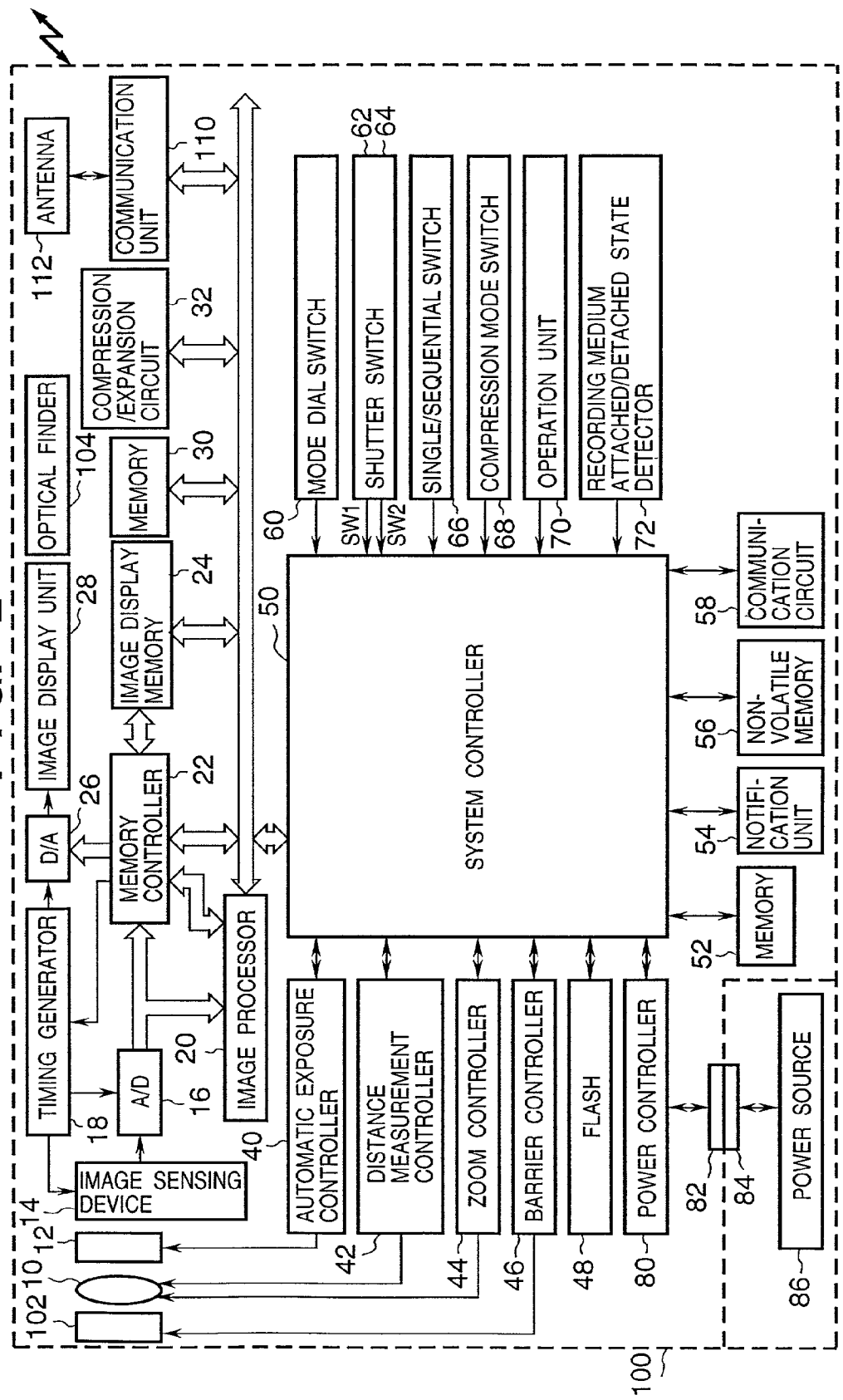
FIG. 2 is a block diagram showing the arrangement of an image sensing apparatus according to the embodiment of the present invention.

FIG. 2 is a block diagram showing a configuration of an image sensing apparatus according to the embodiment of the present invention.

Reference numeral 10 denotes an image sensing lens; 12, a shutter having a diaphragm function; 14, an image sensing device which converts an optical image into an electric signal; 16, an A/D converter which converts an analog signal output from the image sensing device 14 into a digital signal; 18, a timing generator which supplies a clock signal and a control signal respectively to the A/D converter 16 and a D/A converter 26 under the control of a memory controller 22 and a system controller 50. Numeral 20 denotes an image processor which performs predetermined pixel interpolation processing, color conversion processing and the like on image data from the A/D converter 16 or image data from the memory controller 22. The image processor 20 performs predetermined calculation processing using the image data outputted from the A/D converter 16, and the system controller 50 performs through-the-lens (TTL) auto focus (AF) processing, auto exposure (AE) processing, pre-flash (EF) processing on an exposure controller 40 and a distance measurement controller 42, based on the result of calculations. Further, the image processor 20 performs predetermined calculation using the image data outputted from the A/D converter 16, and performs TTL auto white balance (AWB) processing, based on the result of calculations.

The memory controller 22 controls the A/D converter 16, the timing generator 18, the image processor 20, an image display memory 24, the D/A converter 26, a memory 30 and a compression/expansion circuit 32. The image data outputted from the A/D converter 16 is written into the image display memory 24 or the memory 30 via the image processor 20 and the memory controller 22, or only via the memory controller 22.

Reference numeral 28 denotes an image display unit comprising a TFT liquid crystal display (LCD) or the like. Image data written into the image display memory 24 is displayed on the image display unit 28 via the D/A converter 26. An electronic finder function is realized by sequentially displaying obtained images on the image display unit 28. Further, image display unit 28 arbitrarily turns ON/OFF its display in accordance with an instruction from the system controller 50. If the display is turned OFF, the electric consumption of the image sensing apparatus 100 can be greatly reduced.

The memory 30, used for storing obtained still images and moving images, has a sufficient storage capacity for storing a predetermined number of still images and/or a moving image for a predetermined period. In sequential image sensing to sequentially obtain a plural number of still images or panoramic image sensing, a large amount of image data can be written into the memory 30 at a high speed. Further, the memory 30 may be used as a work area for the system controller 50.

The compression/expansion circuit 32 compresses or expands image data by adaptive discrete cosine transformation (ADCT) or the like. The compression/expansion circuit 32 reads image data stored in the memory 30 and performs compression or expansion processing on the read image data, and writes the processed data into the memory 30.

The exposure controller 40 controls the shutter 12 having the diaphragm function. The exposure controller 40 interlocked with a flash 48 also has a flash adjusting function. The distance measurement controller 42 controls focusing of the image sensing lens 10. Reference numeral 44 denotes a zoom controller which controls zooming of the image sensing lens 10; 46, a barrier controller which controls the operation of a barrier 102 to protect the lens; 48, a flash which has an AF auxiliary light projection function and a flash adjusting function.

The system controller 50 controls the exposure controller 40 and the distance measurement controller 42 by the TTL method, in accordance with the result of calculations by the image processor 20 based on the image data from the A/D converter 16.

The system controller 50 controls the overall image sensing apparatus 100. Memory 52 stores constants, variables, and programs for operation of the system controller 50.

Reference numeral 54 denotes a notification unit which notifies operating statuses, messages and the like to the outside by using characters, images, sound and the like, in correspondence with execution of program by the system controller 50. The notification unit 54 comprises one or more combinations of display devices including an LCD and an LED for visual notification and sound generating devices for audio notification. Especially, the display device or devices is/are provided in a single or plural visually-recognizable positions around an operation unit 70 of the image sensing apparatus 100. Further, one function of the notification unit 54 is provided within an optical finder (or optical view finder: OVF) 104.

The display contents of the notification unit 54, displayed on the LCD or the like, include indication of single shot/ sequential image sensing, a self timer, a compression rate, the number of recording pixels, the number of recorded images, the number of recordable images, a shutter speed, an f number (aperture), exposure compensation, flash illumination, pink-eye effect mitigation, macro image sensing, a buzzer-set state, a timer battery level, a battery level, an error state, information of plural digit numbers, operation of communication I/F, and date and time.

Further, the display contents of the notification unit 54, displayed within the optical finder 104, include a focus state, an image sensing ready state, a camera shake warning, a flash charge state, a flash ready state, the shutter speed, the f number (aperture), and the exposure compensation.

Further, the display contents of the notification unit 54, displayed by LEDs and the like, include a focus state, an image sensing ready state, a camera shake warning, a flash charge state, a flash ready state, an operation of recording on a recording medium, a setting of macro image sensing operation, and a charged state of a secondary battery.

Furthermore, the display contents of the notification unit 54, displayed by lamps and the like, includes a self timer lamp. An AF auxiliary light may be used as the self timer lamp.

Reference numeral 56 denotes an electrically erasable and recordable nonvolatile memory such as an EEPROM.

Reference numeral 58 denotes an identification information holding unit which stores various identification information used for authentication performed before starting communication with the communication apparatus 300 via the communication unit 110 and antenna 112.

Reference numerals 60, 62, 64, 66, 68, 70 and 72 denote operation means for inputting various operation instructions to the system controller 50, comprising a single or plurality of combinations of switches, dials, touch panels, a device for pointing by line-of-sight detection, a voice recognition device, and the like.

Next, the operation means will be described in more detail.

Reference numeral 72 denotes a main switch for switching between power ON and power OFF.

Reference numeral 60 denotes a mode dial switch for selecting various function modes such as an automatic image sensing mode, a moving image sensing mode, a panoramic image sensing mode, a reproduction mode, a multi-image reproduction/deletion mode, and a PC connection mode.

Reference numeral 62 denotes a shutter switch SW1 which is turned ON by half stroke of a shutter button (not shown), to instruct start of the operations of the AF processing, the AE processing, the AWB processing, the EF processing and the like.

Reference numeral 64 denotes a shutter switch SW2 which is turned ON by full stroke of the shutter button (not shown), to instruct start of a series of operations of exposure processing to write a signal read from the image sensing device 14 into the memory 30 via the A/D converter 16 and the memory controller 22, development processing by using calculations by the image processor 20 and the memory controller 22, and recording processing to read the image data from the memory 30, compress the image data by the compression/expansion circuit 32, and write the compressed image data into the recording medium (not shown).

A single/sequential switch 66 switches between a single shot mode for recording a frame image and shifting to an idle state thereafter for each pressing of the shutter switch SW2 and a sequential mode for continuously recording frame images while the shutter switch SW2 is pressed.

A compression mode switch 68 selects a compression ratio for JPEG compression or a CCDRAW mode for directly digitizing the signals from the image sensing device 14 and recording the digital signals to a recording medium.

Reference numeral 70 denotes an operation unit comprising various buttons and touch panels including a menu button, a set button, a macro/non-macro selection button, a multi-image reproduction/repaging button, a flash setting button, a self-timer image sensing selection button, a forward (+) menu item selection button, a backward (−) menu item selection button, a forward (+) reproduction image search button, a backward (−) reproduction image search button, an image sensing quality selection button, an exposure correction button, a date/time set button, and a reproduction mode switch capable of setting one of various functional modes, such as a reproduction mode, a multi-image reproduction and erasing mode, and a PC connection mode. The operation unit 70 further comprises an AF mode switch for switching between an one-shot AF mode for starting an auto-focusing operation in response to each pressing of the shutter switch SW1 and, once a focused state is attained, keeping the focused state and a servo AF mode for repeatedly performing auto-focusing operation while the shutter switch SW1 is pressed, an image display ON/OFF switch for setting ON/OFF of the image display unit 28, and a quick review ON/OFF switch for setting a quick review function of automatically reproducing a recorded image on the image display unit 28 immediately after sensing the image. The plus (+) and minus (−) buttons may be realized by a dial, which may further increase operability of selecting desired number and function.

Reference numeral 80 denotes a power controller comprising a battery detection circuit, a DC-DC converter, a switch circuit to select the block to be energized and the like. The power controller 80 detects the attached/detached state of the battery, the battery type and the remaining battery power level, controls the DC-DC converter based on the results of detection and an instruction from the system controller 50, and supplies necessary voltages to the respective parts including the recording medium for the necessary period.

Reference numerals 82 and 84 denote connectors; and 86, the power source comprising a primary battery such as an alkaline battery or a lithium battery, a secondary battery such as an NiDd battery, an NiMH battery or an Li-ion battery, an AC adapter, and the like.

The barrier 102 covers the image sensing portion of the image sensing apparatus 100 including the lens 10, thus prevents dirt and breakage of the image sensing portion.

The optical finder 104 can be used for image sensing without the electronic finder function by the image display unit 28. In the optical finder 104, realized are some of the functions of the notification unit 54 including the indication of focus state, the camera shake warning, the flash charge state, the shutter speed, the f number (aperture), the exposure compensation and the like.

A communication circuit 110 has various short-distance high-speed data communication functions such as spread spectrum communication such as Bluetooth, and infrared communication such as IrDA.

Reference numeral 112 denotes an antenna for connecting the image sensing apparatus 100 with other devices by the communication unit 110.

<Description of Arrangement of Communication Apparatus 300>

Figure 3:
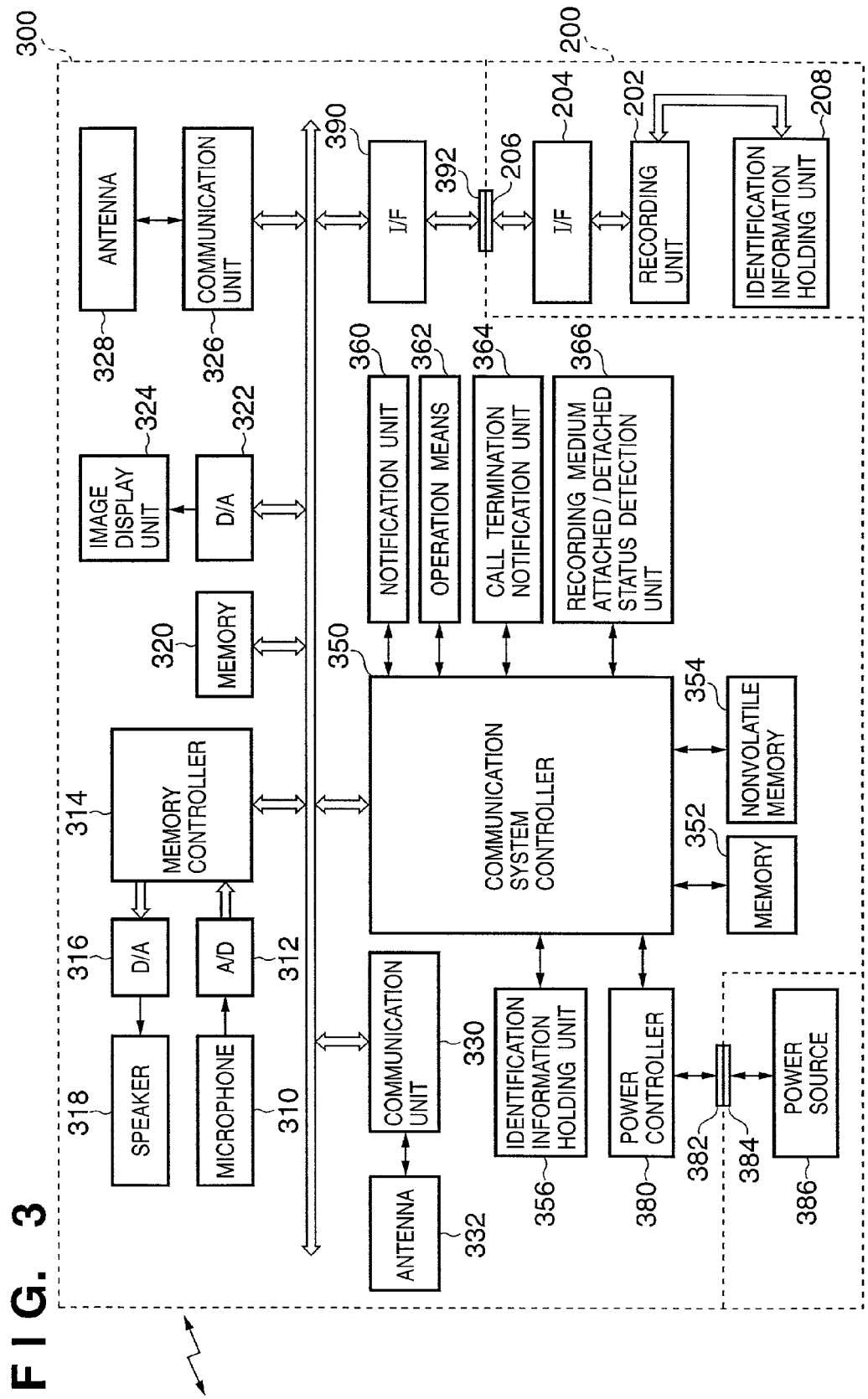
FIG. 3 is a block diagram showing the arrangement of a communication apparatus according to the embodiment of the present invention.

FIG. 3 is a block diagram showing the detailed arrangement of the communication apparatus 300 shown in FIG. 1.

Referring to FIG. 3, a microphone 310 converts sound into an electrical signal. An A/D converter 312 converts the analog output signal from the microphone 310 into a digital signal. Reference numeral 314 denotes memory controller. Output data from the A/D converter 312 is written into a memory 320 through the memory controller 314. Data read out from the memory 320 is input to a D/A converter 316. The D/A converter 316 converts a digital signal into an analog signal. A speaker 318 converts an electrical signal into an audio signal.

The memory 320 stores sound input from the microphone 310 and/or a still image or moving image transmitted from the image sensing apparatus 100. The memory 320 has a sufficient storage capacity for storing sound for a predetermined period and/or a predetermined number of still images or a moving image for a predetermined period.

A D/A converter 322 converts still image data or moving image data stored in the memory 320 into an analog signal. An image display unit 324 displays the output image signal from the D/A converter 322. The communication unit 326 has various long-distance radio communication functions such as TDMA, CDMA, and W-CDMA. The antenna 328 connects the communication apparatus 300 to another communication apparatus and/or communication base station through a channel by the communication unit 326.

The communication unit 330 has various short-distance high-speed data communication functions such as spread spectrum communication such as Bluetooth, and infrared communication such as IrDA. The antenna 332 connects the communication apparatus 300 to another device by the communication unit 330. The communication apparatus 300 has the two communication units 326 and 330. However, one of the communication units may suffice, or a single unit having both functions may be prepared. In the following description of the embodiment, the communication unit 330 is mainly used. This can also applies to the communication unit 326.

A communication system controller 350 controls the entire communication apparatus 300. A memory 352 stores constants, variables, and programs for operation of the communication system controller 350. Reference numeral 354 denotes an electrically erasable and recordable nonvolatile memory such as an EEPROM.

An identification information holding unit 356 stores various kinds of identification information used for authentication before communication with the image sensing apparatus 100 through the communication unit 330 and antenna 332.

Reference numeral 360 denotes a notification unit which notifies operating statuses, messages, and the like to the outside by using characters, images, sound, and the like, in correspondence with execution of program by the communication system controller 350. The notification unit 360 comprises one or more combinations of display devices including an LCD and an LED for visual notification and sound generating devices for audio notification. Especially, the display device or devices is/are provided in a single or plurality visually-recognizable positions around an operation unit 362 of the communication apparatus 300.

The operation means 362 for inputting various operation instructions to the communication system controller 350, comprising a single or plurality of combinations of switches, dials, touch panels, and a device for pointing by line-of-sight detection, a voice recognition device, and the like.

With the operation means 362, power-ON/OFF of the communication apparatus 300, execution (off-hook)/stop (on-hook) of speech communication, telephone number input, telephone number search, communication mode switching, and other various operation can be performed.

A call termination notification unit 364 can notify the user of the communication apparatus 300 of call termination from another communication apparatus or communication base station by sound such as a ringing tone, a voice message, or music and/or an image such as an icon, moving image, still image, or light, and/or vibration.

A recording medium attached/detached status detection unit 366 detects whether the recording medium 200 is attached to a connector 392.

Numeral 380 denotes a power controller comprising a battery detection circuit, a DC/DC converter, a switch circuit to select the block to be energized and the like. The power controller 380 detects the attached/detached status of the battery, the battery type and the remaining battery power level, controls the DC-DC converter based on the results of detection and an instruction from the communication system controller 350, and supplies necessary voltages to the respective parts including the recording medium for the necessary period.

Numerals 382 and 384 denote connectors; and 386, a power source means comprising a primary battery such as an alkaline battery or a lithium battery, a secondary battery such as an NiCd battery, an NiMH battery, an Li-ion battery, or Li polymer, an AC adapter, and the like.

Reference numeral 390 denotes an interface to a recording medium such as a memory card or hard disk; and 392, a connector for connecting the communication apparatus 300 to a recording medium such as a memory card or hard disk.

In this embodiment, the communication apparatus has one system of the interface and connector for attaching a recording medium. However, a single or plurality of combinations of interfaces and connectors may be prepared. Interfaces and connectors of different standards may be combined.

An interface and connector complying with the standard such as a PCMCIA card, CF (Compact Flash) card, MMC (Multi-Media Card), SD (Secure Digital) card can be used.

When the interface 390 and connector 392 complying with the standard such as a PCMCIA card or CF (Compact Flash) card are used, image data or management information attached to the image data can be transferred between the communication apparatus and another peripheral device such as a computer or printer by connecting various types of communication cards such as a LAN card, modem card, USB card, IEEE1394 card, P1284 card, SCSI card, or communication card for a PHS or the like.

The recording medium 200 comprises a memory card or hard disk. The recording medium 200 has a recording unit 202 formed from a semiconductor memory or magnetic disk, an interface 204 to the communication apparatus 300, a connector 206 connected to the communication apparatus 300, and an identification information holding unit 208.

<First Embodiment>

<Description of Operation of Image Sensing Apparatus 100>

In the first embodiment, operation of an image sensing apparatus 100 having the above arrangement will be described with reference to FIGS. 4 to 8.

Figure 4:
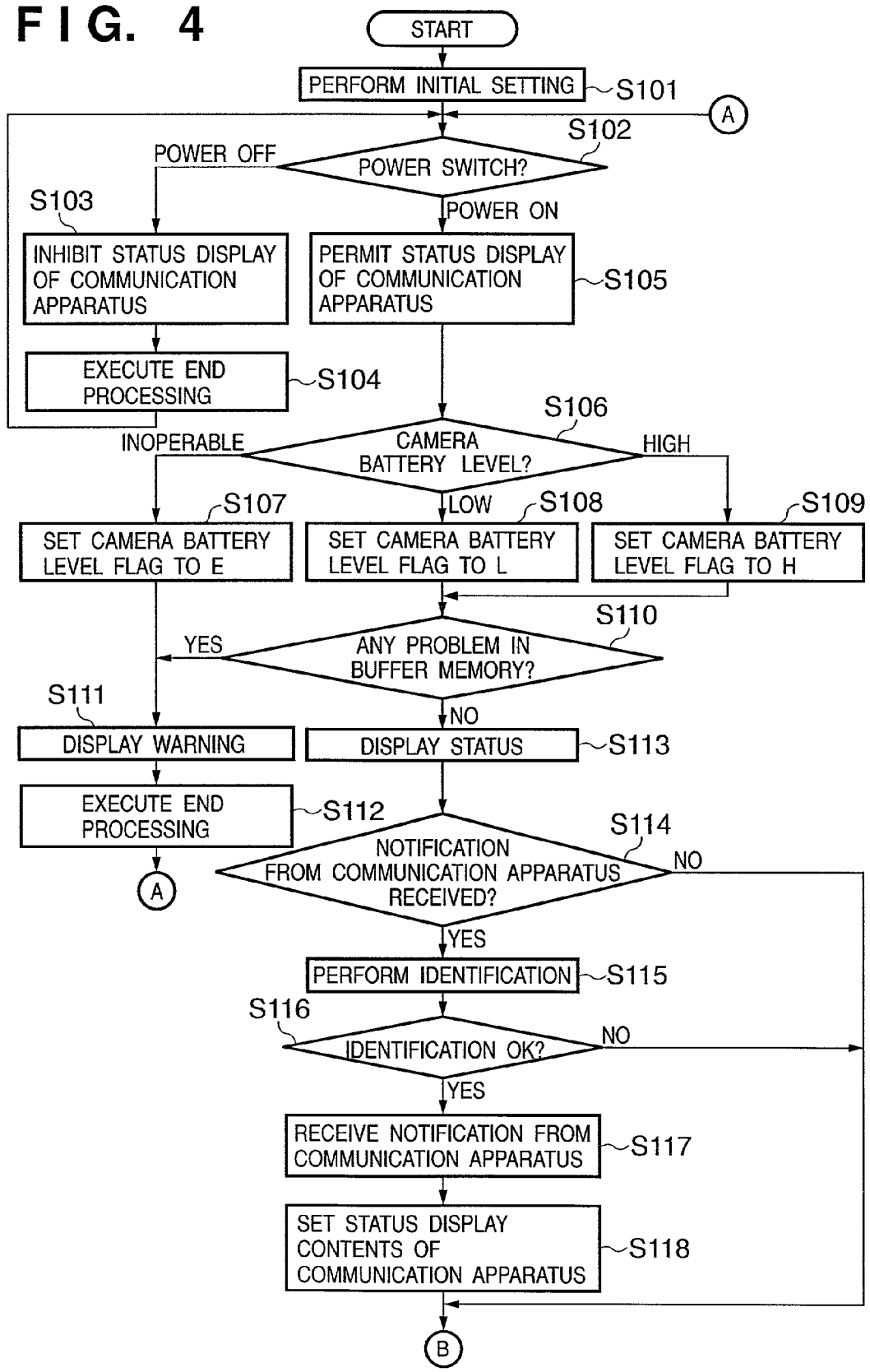
FIG. 4 is a flow chart showing the main routine of an image sensing apparatus according to the first embodiment of the present invention.
Figure 5:
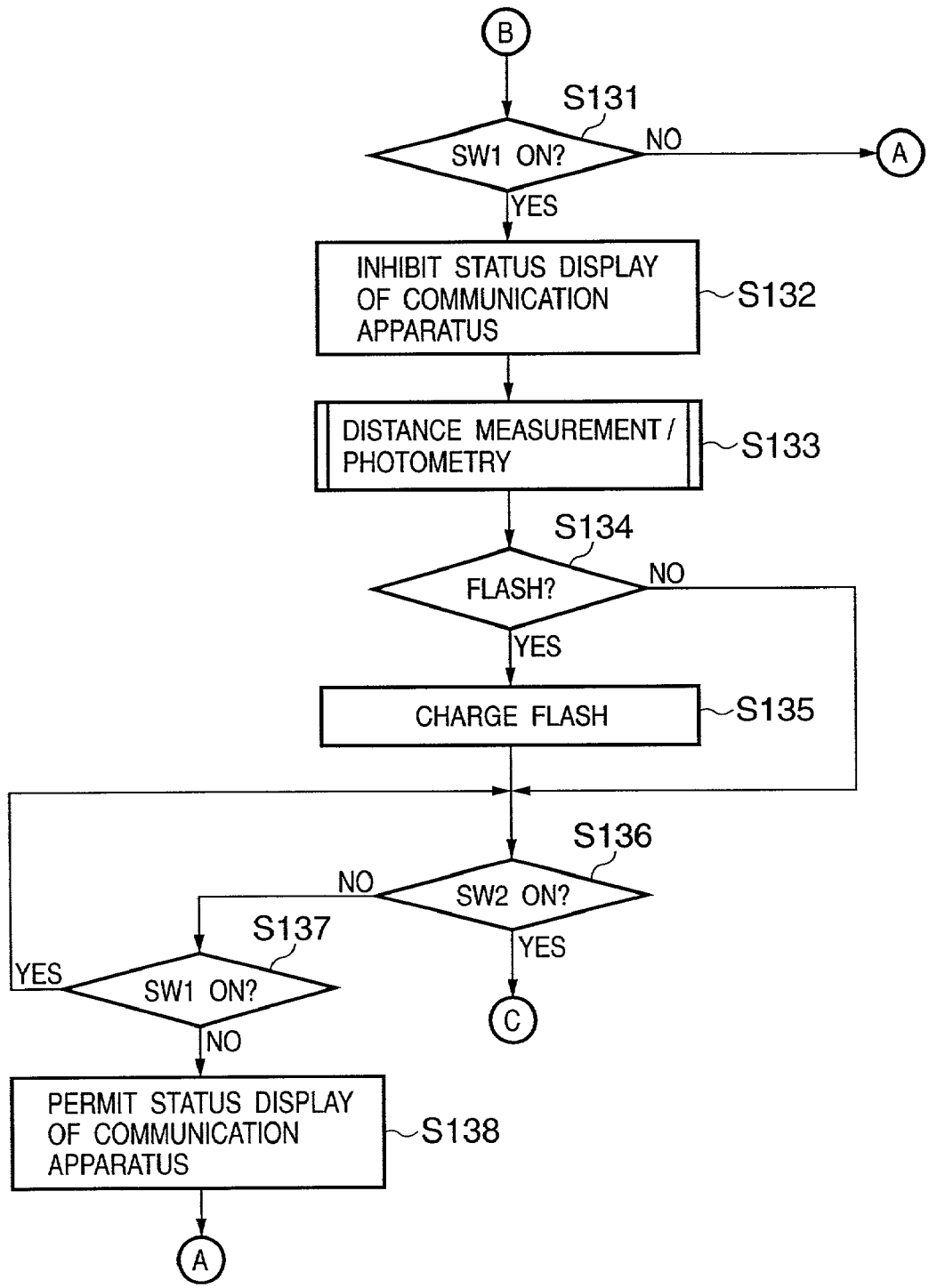
FIG. 5 is a flow chart showing the main routine of the image sensing apparatus according to the first embodiment of the present invention.
Figure 6:
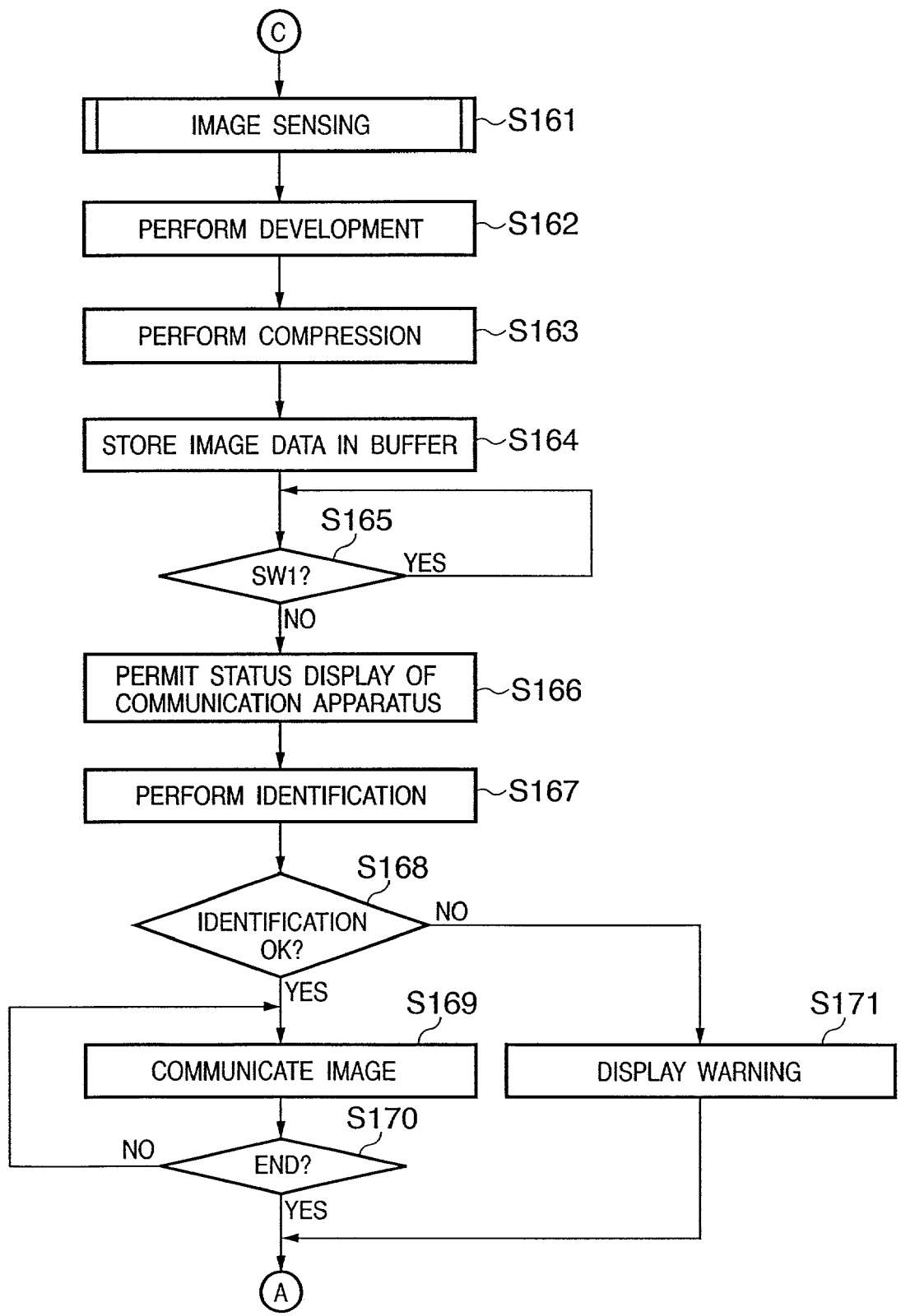
FIG. 6 is a flow chart showing the main routine of the image sensing apparatus according to the first embodiment of the present invention.

FIGS. 4 to 6 are flow charts showing the main routine of the image sensing apparatus 100 according to the first embodiment. The operation of the image sensing apparatus 100 will be described with reference to FIGS. 4 to 6.

Referring to FIG. 4, in step S101, when the image sensing apparatus is powered on by, e.g., exchanging the battery, a system controller 50 initializes flags, control variables, and the like and executes initialization processing of the respective parts of the image sensing apparatus 100. After initialization, the system controller 50 determines the state of a main switch 72 in step S102. If the main switch 72 is set in the power OFF state, setting is done to inhibit status display of a communication apparatus 300 in step S103, and the flow advances to step S104.

The status display of the communication apparatus 300 is executed by storing the status of the communication apparatus 300, which is received from a communication unit 330 of the communication apparatus 300 through an antenna 332, antenna 112, and communication unit 110, in the internal memory of the system controller 50 or a memory 52, and reading out the stored data and displaying it by a notification unit 54 and/or image display unit 28.

The system controller 50 executes predetermined end processing, e.g., changes the display of each display means to the end state, and if the image sensing apparatus has a protection means such as a barrier 102, closes it to protect the image sensing portion, records necessary parameters, set values, and set modes, including flags and control variables, in a nonvolatile memory 56, and stops unnecessary power supply to the respective parts of the image sensing apparatus 100, including the image display unit 28, by a power controller 80 (step S104). After that, the flow returns to step S102.

If it is determined in step S102 that the main switch 72 is set in the power ON state, the system controller 50 sets to allow the status display of the communication apparatus 300 (step S105) and the flow advances to step S106.

In step S106, the system controller 50 determines whether the remaining power level or operating situation of a power source 86 formed from a battery or the like by the power controller 80 has any problem for continuous operation of the image sensing apparatus 100.

If the remaining power level of the power source 86 has a problem for continuous operation of the image sensing apparatus 100, the flow advances to step S107. The system controller 50 sets a camera battery level flag to E (empty), which represents that the battery level has a problem for continuous operation of the image sensing apparatus 100, and the flow advances to step S111.

When the remaining power level of the power source 86 is less than a predetermined threshold value, the flow advances from step S106 to S108. The system controller 50 sets the camera battery level flag to L (low), which represents that the battery level is too low to continue the operation of the image sensing apparatus 100, and the flow advances to step S110.

When the remaining power level of the power source 86 is more than the predetermined threshold value, the flow advances to step S109. The system controller 50 sets the camera battery level flag to H (high), which represents that the battery level is sufficient to continue the operation of the image sensing apparatus 100, and the flow advances to step S110.

In step S110, the system controller 50 determines whether the operating status of the memory 30 serving as a buffer for obtained image data has any problem for operation of the image sensing apparatus 100 and, more particularly, image data storage/read operation for the memory 30. If NO in step S110, the flow advances to step S113. Otherwise, the flow advances to step S111.

In step S111, the system controller 50 performs predetermined warning by an image or sound using the notification unit 54 and/or image display unit 28. The system controller 50 executes predetermined end processing, e.g., changes the display of each display means to the end state, and if the image sensing apparatus has a protection means such as the barrier 102, closes it to protect the image sensing portion, records necessary parameters, set values, and set modes, including flags and control variables, in the nonvolatile memory 56, and stops unnecessary power supply to the respective parts of the image sensing apparatus 100, including the image display unit 28, by the power controller 80 (step S112). After that, the flow returns to step S102.

In step S113, the system controller 50 displays various set statuses of the image sensing apparatus 100, including the remaining battery level and the status of the memory 30, by an image or sound using the notification unit 54 and/or image display unit 28, and the flow advances to step S114.

The system controller 50 determines whether a notification is received from the communication apparatus 300 through the communication unit 330, antenna 332, antenna 112, and communication unit 110. If a notification is received (YES in step S114), the flow advances to step S115. If no notification is received (NO in step S114), the flow advances to step S131 in FIG. 5.

In step S115, the system controller 50 inquires of a communication system controller 350 about the contents of an identification information holding unit 356 of the communication apparatus 300 through the communication unit 110, antenna 112, antenna 332, and communication unit 330. If it is determined by checking the contents of the identification information holding unit 356 that communication with the communication apparatus 300 can be performed without any problem (YES in step S116), the flow advances to step S117. If it is determined by checking the contents of the identification information holding unit 356 that communication with the communication apparatus 300 cannot be performed due to a problem (NO in step S116), the flow advances to step S131 in FIG. 5.

The contents of the identification information holding unit 356 of the communication apparatus 300 may be checked using the identification information holding unit 58 of the image sensing apparatus 100.

Authentication between the image sensing apparatus 100 and the communication apparatus 300 can be done by checking the identification information.

In step S117, the system controller 50 receives the notification from the communication apparatus 300 through the communication unit 330, antenna 332, antenna 112, and communication unit 110 and stores the notification in the internal memory of the system controller 50 or the memory 52. The system controller 50 sets to display the received status display contents of the communication apparatus 300 by the notification unit 54 and/or image display unit 28 (step S118), and the flow advances to step S131 in FIG. 5.

As described above, when various kinds of warning information or pieces of information representing various statuses from the communication apparatus 300 are displayed by the notification unit 54 and/or image display unit 28 of the image sensing apparatus 100, the user can know the information of the communication apparatus 300 during use of the image sensing apparatus 100.

If the notification received from the communication apparatus 300 is a call start notification or call end notification, it is displayed by the notification unit 54 and/or image display unit 28 of the image sensing apparatus 100 whereby the user can know the call from another communication apparatus or communication base station to the communication apparatus 300 during use of the image sensing apparatus 100.

In step S131 of FIG. 5, the system controller 50 determines whether the shutter switch SW1 is pressed. If NO in step S131, the flow returns to step S101 in FIG. 4.

If the shutter switch SW1 is pressed (YES in step S131), the flow advances to step S132. The system controller 50 sets to inhibit the status display of the communication apparatus 300 by the notification unit 54 and/or image display unit 28, and then, the flow advances to step S133. With this operation, when the image sensing apparatus 100 is set in the image sensing preparation state, the display contents of the notification unit 54 and/or image display unit 28 of the image sensing apparatus 100 are changed to display information related to image sensing unique to the image sensing apparatus 100, so a display state convenient for image sensing operation can be provided to the user.

In step S133, the system controller 50 executes distance measurement processing to focus the image sensing lens 10 on an object to be sensed, executes photometry processing to determine the f number and shutter speed, and executes white balance processing to adjust the color temperature. In the photometry processing, flash illumination is also set, as needed.

In the distance measurement/photometry processing in step S133, whether AE control and/or AWB control can be executed is determined on the basis of the image sensing start flag and/or AE lock flag and/or white balance mode set flag, which are stored in the internal memory of the system controller 50 or the memory 52, and the respective processing operations are done in accordance with the determination results. The distance measurement/photometry processing in step S133 will be described later in more detail with reference to FIG. 7.

When the distance measurement/photometry processing in step S133 is ended, the system controller 50 determines the state of the flash flag stored in the internal memory of the system controller 50 or the memory 52 (step S134). If YES in step S134, the flash 48 is charged (step S135), and the flow advances to step S136. If NO in step S134, the flow advances to step S136 without any processing.

When the shutter switch SW2 is not pressed (NO in step S136), and the shutter switch SW1 is released (NO in step S137), the system controller 50 sets to allow the notification unit 54 and/or image display unit 28 to display the status of the communication apparatus 300 (step S138), and the flow returns to step S102 in FIG. 4.

With this operation, when the image sensing apparatus 100 ends the image sensing preparation state, the display contents of the notification unit 54 and/or image display unit 28 of the image sensing apparatus 100 can be changed from the state wherein pieces of information related to image sensing unique to the image sensing apparatus 100 are displayed to the state wherein the notification from the communication apparatus 300 is displayed or pieces of information related to image sensing unique to the image sensing apparatus 100 and the notification from the communication apparatus 300 are displayed. Since various kinds of warning information or pieces of information representing various statuses from the communication apparatus 300 are displayed by the notification unit 54 and/or image display unit 28 of the image sensing apparatus 100, the user can know the information of the communication apparatus 300 during use of the image sensing apparatus 100. In addition, since a call start notification or call end notification from the communication apparatus 300 is displayed by the notification unit 54 and/or image display unit 28 of the image sensing apparatus 100, the user can know the call from another communication apparatus or communication base station to the communication apparatus 300 during use of the image sensing apparatus 100.

If the shutter switch SW2 is pressed (YES in step S136), the flow advances to step S161 in FIG. 6.

In step S161, the system controller 50 executes image sensing processing comprising exposure processing of writing obtained image data in the memory 30 through an image sensing device 14, A/D converter 16, image processor 20, and memory controller 22 or from the A/D converter only through the memory controller 22. The image sensing processing in step S161 will be described later in more detail with reference to FIG. 8.

The system controller 50 executes development processing of reading out the image data from the memory 30 and processing the image data in various ways using the memory controller 22 and, the image processor 20, as needed (step S162), executes compression processing of compressing the image in accordance with the set mode using the compression/expansion circuit 32, as needed (step S163), and stores the image data that has undergone predetermined processing in the memory 30 (step S164).

In step S165, the system controller 50 determines the state of the shutter switch SW1. If the shutter switch SW1 is released, the system controller 50 sets to allow the notification unit 54 and/or image display unit 28 to display the status of the communication apparatus 300 (step S166), and the flow advances to step S167.

With this operation, when the image sensing apparatus 100 ends the image sensing preparation state, the display contents of the notification unit 54 and/or image display unit 28 of the image sensing apparatus 100 can be changed from the state wherein pieces of information related to image sensing unique to the image sensing apparatus 100 are displayed to the state wherein the notification from the communication apparatus 300 is displayed or pieces of information related to image sensing unique to the image sensing apparatus 100 and the notification from the communication apparatus 300 are displayed. Since various kinds of warning information or pieces of information representing various statuses from the communication apparatus 300 are displayed by the notification unit 54 and/or image display unit 28 of the image sensing apparatus 100, the user can know the information of the communication apparatus 300 during use of the image sensing apparatus 100. In addition, since a call start notification or call end notification from the communication apparatus 300 is displayed by the notification unit 54 and/or image display unit 28 of the image sensing apparatus 100, the user can know the call from another communication apparatus or communication base station to the communication apparatus 300 during use of the image sensing apparatus 100.

In step S167, the system controller 50 inquires of the communication system controller 350 about the contents of the identification information holding unit 356 of the communication apparatus 300 through the communication unit 110, antenna 112, antenna 332, and communication unit 330. If it is determined by checking the contents of the identification information holding unit 356 that communication with the communication apparatus 300 can be performed without any problem (YES in step S168), the flow advances to step S169.

If it is determined by checking the contents of the identification information holding unit 356 that communication with the communication apparatus 300 cannot be performed due to a problem (NO in step S168), the system controller 50 performs predetermined warning by an image or sound using the notification unit 54 and/or image display unit 28 (step S171), and the flow returns to step S102 in FIG. 4.

The contents of the identification information holding unit 356 of the communication apparatus 300 may be checked using the identification information holding unit 58 of the image sensing apparatus 100.

Authentication between the image sensing apparatus 100 and the communication apparatus 300 can be done by checking the identification information.

In step S169, the system controller 50 reads out, from the memory 30, the image data which has undergone predetermined image sensing processing, development processing, compression processing, and the like, and communicates the image to the communication apparatus 300 through the communication unit 110 and antenna 112.

When the image communication is ended (YES in step S170), the flow returns to step S102 in FIG. 4.

In step S169, the image data can be transmitted in accordance with an instruction from the operator of the image sensing apparatus 100 or a request from the communication apparatus 300.

The distance measurement/photometry processing in step S133 of FIG. 5 will be described next in detail with reference to the flow chart shown in FIG. 7.

Figure 7:
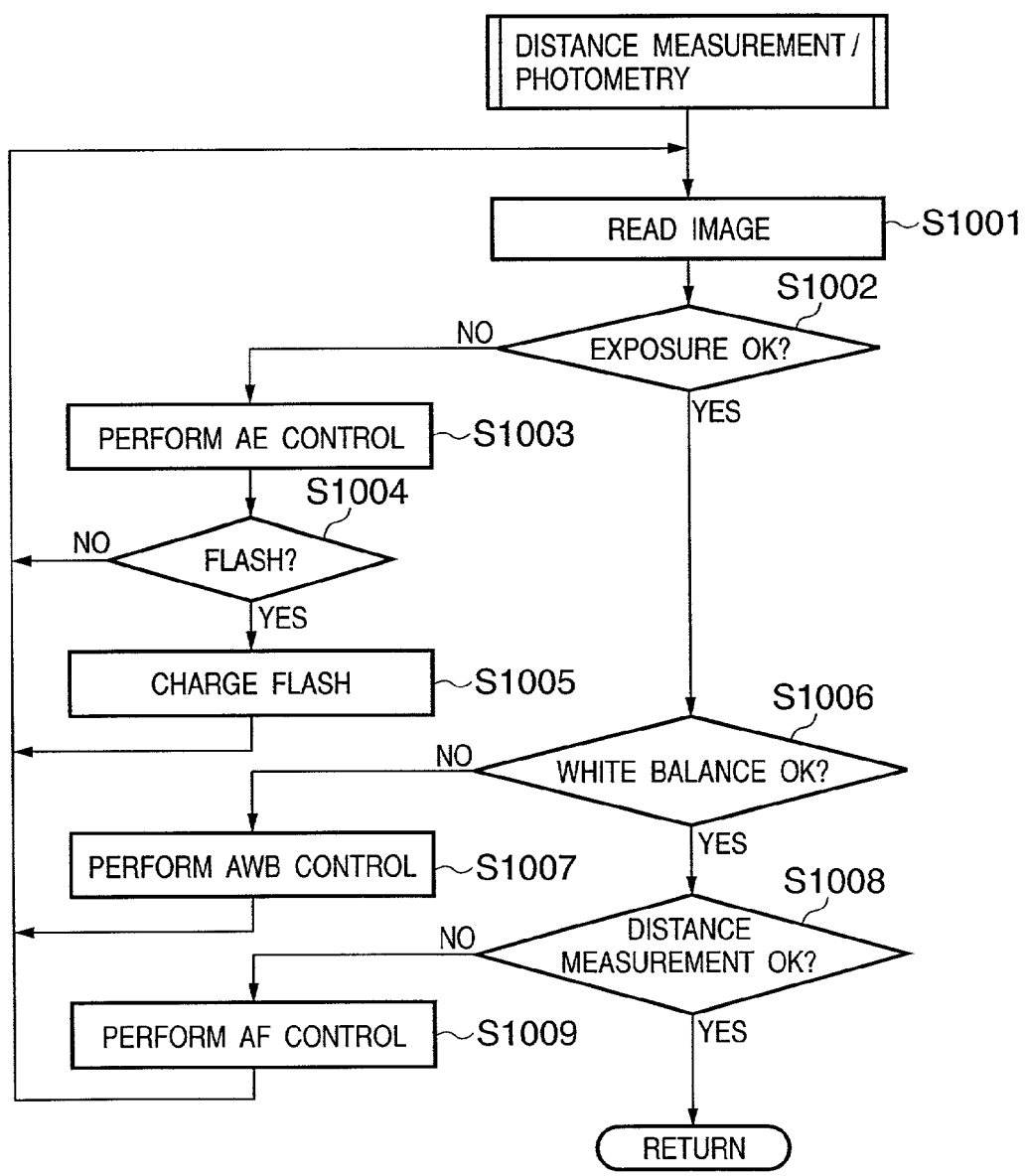
FIG. 7 is a flow chart showing the distance measurement/photometry routine of the image sensing apparatus according to the first embodiment of the present invention.

FIG. 7 shows a detailed flow chart of the distance measurement/photometry processing in step S133 of FIG. 5.

In step S1001, the system controller 50 reads a charge signal from the image sensing device 14 and sequentially reads obtained image data to the image processor 20 through the A/D converter 16. The image processor 20 performs predetermined calculations used for the TTL AE processing, EF processing, and AF processing using the sequentially read image data.

For the respective processing operations, a necessary number of necessary specific parts are extracted from the total number of sensed pixels and used for calculations. This makes it possible to execute optimum calculations for each mode such as the center-weighted mode, average mode, and evaluation mode for each of the TTL AE, EF, AWB, and AF processing operations.

Using the result of calculation by the image processor 20, the system controller 50 executes AE control using an exposure controller 40 in step S1003 until it is determined that the exposure (AE) is appropriate (i.e., until YES in step S1002).

Using the measurement data obtained by AE control in step S1003, the system controller 50 determines in step S1004 whether flash illumination is necessary. If YES in step S1004, the flash flag is set to charge the flash 48 in step S1005.

If it is determined that the exposure (AE) is appropriate (YES in step S1002), the measurement data and/or setting parameters are stored in the internal memory of the system controller 50 or the memory 52.

Using the result of calculation by the image processor 20 and the measurement data obtained by AE control, the system controller 50 executes AWB control using the image processor 20 by adjusting color processing parameters in step S1007 until it is determined that the white balance (AWB) is appropriate (i.e., until YES in step S1006).

If it is determined that the white balance (AWB) is appropriate (YES in step S1006), the measurement data and/or setting parameters are stored in the internal memory of the system controller 50 or the memory 52.

Using the measurement data obtained by AE control and AWB control, the system controller 50 executes AF control using a distance measurement controller 42 in step S1009 until it is determined that a focus state is obtained (AF) (i.e., until YES in step S1008).

If it is determined that the focus state is obtained (AF) (YES in step S1008), the measurement data and/or setting parameters are stored in the internal memory of the system controller 50 or the memory 52, and the distance measurement/photometry processing routine in step S133 of FIG. 5 is ended.

Figure 8:
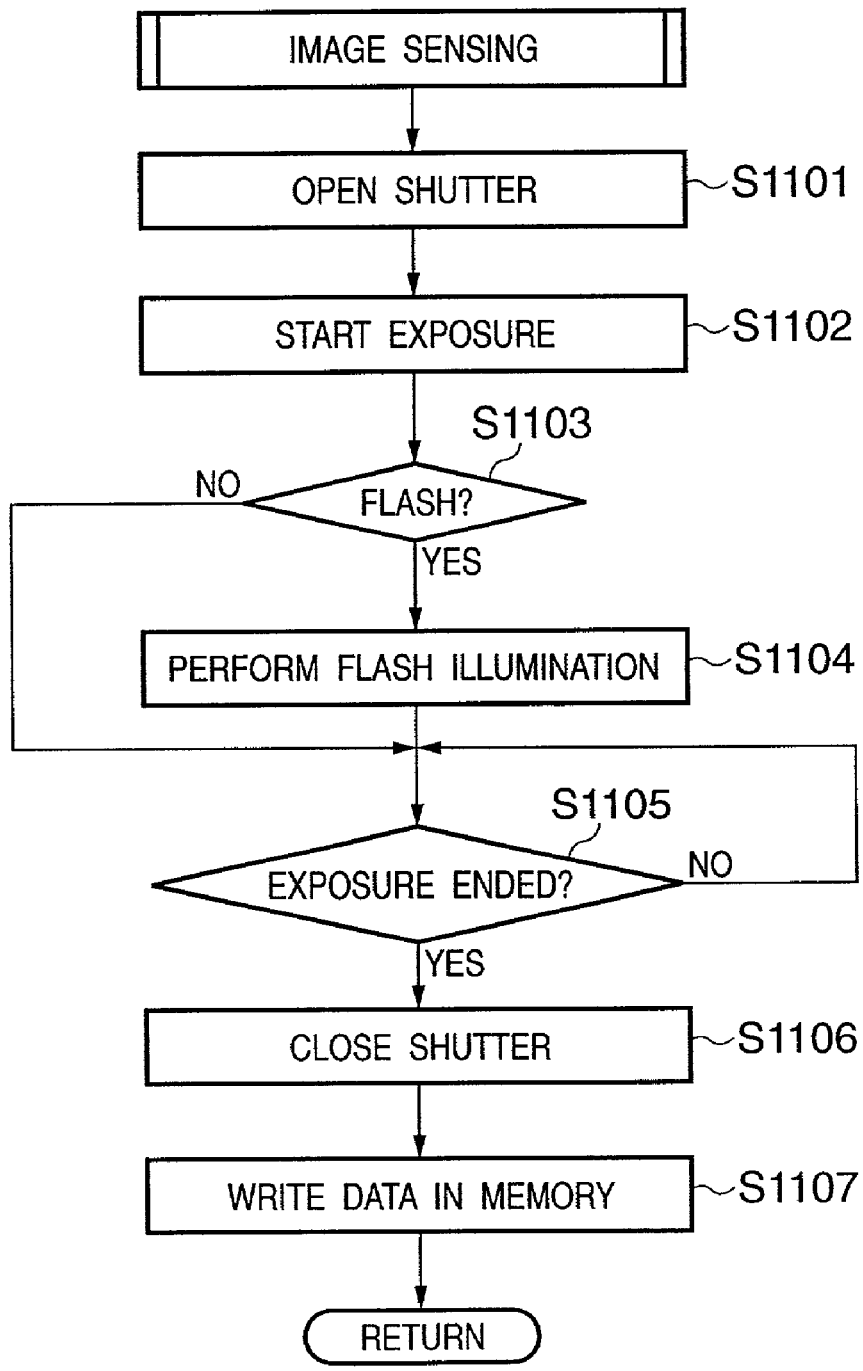
FIG. 8 is a flow chart showing the image sensing routine of the image sensing apparatus according to the first embodiment of the present invention.

The image sensing processing in step S161 of FIG. 6 will be described next in detail with reference to the flow chart shown in FIG. 8.

In step S1101, the system controller 50 causes the exposure controller 40 to open the shutter 12 having a diaphragm function in accordance with the f number on the basis of photometry data stored in the internal memory of the system controller 50 or the memory 52. In step S1102, exposure of the image sensing device 14 starts.

In step S1103, it is determined on the basis of the flash flag whether flash adjustment by the flash 48 is necessary. If YES in step S1103, the flash illumination is performed (step S1104).

In step S1105, the system controller 50 waits until exposure of the image sensing device 14 in accordance with the photometry data is ended. When the exposure is ended, the shutter 12 is closed, and a charge signal is read from the image sensing device 14 in step S1106. In step S1107, the obtained image data is written in the memory 30 through the A/D converter 16, image processor 20, and memory controller 22 or from the A/D converter 16 only through the memory controller 22.

When the series of operations are ended, the image sensing processing routine in step S161 of FIG. 6 is ended.

<Description of Operation of Communication Apparatus 300>

The operation of the communication apparatus 300 according to the first embodiment will be described next with reference to FIGS. 9 and 10.

Figure 9:
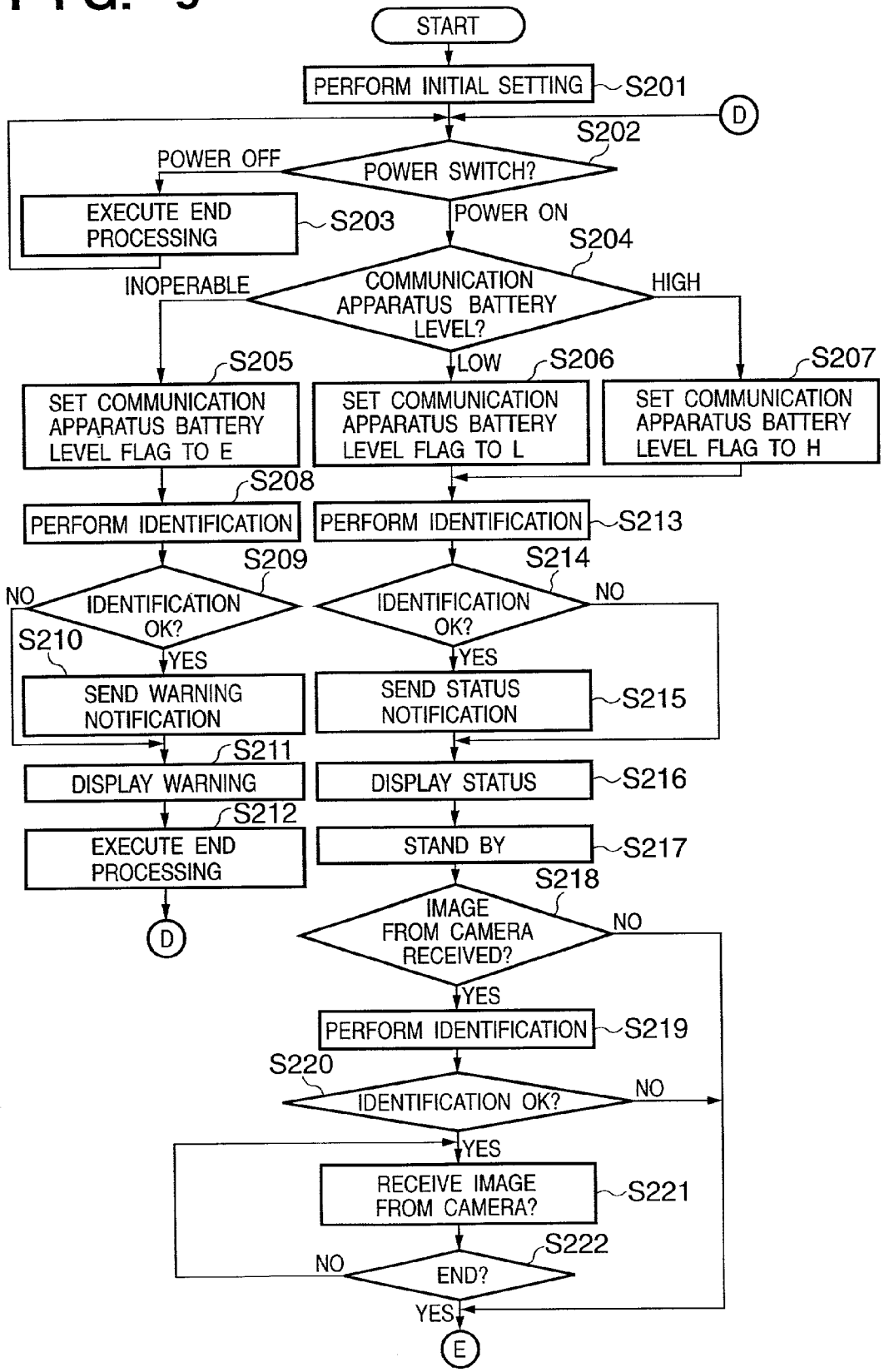
FIG. 9 is a flow chart showing the main routine of a communication apparatus according to the first embodiment of the present invention.
Figure 10:
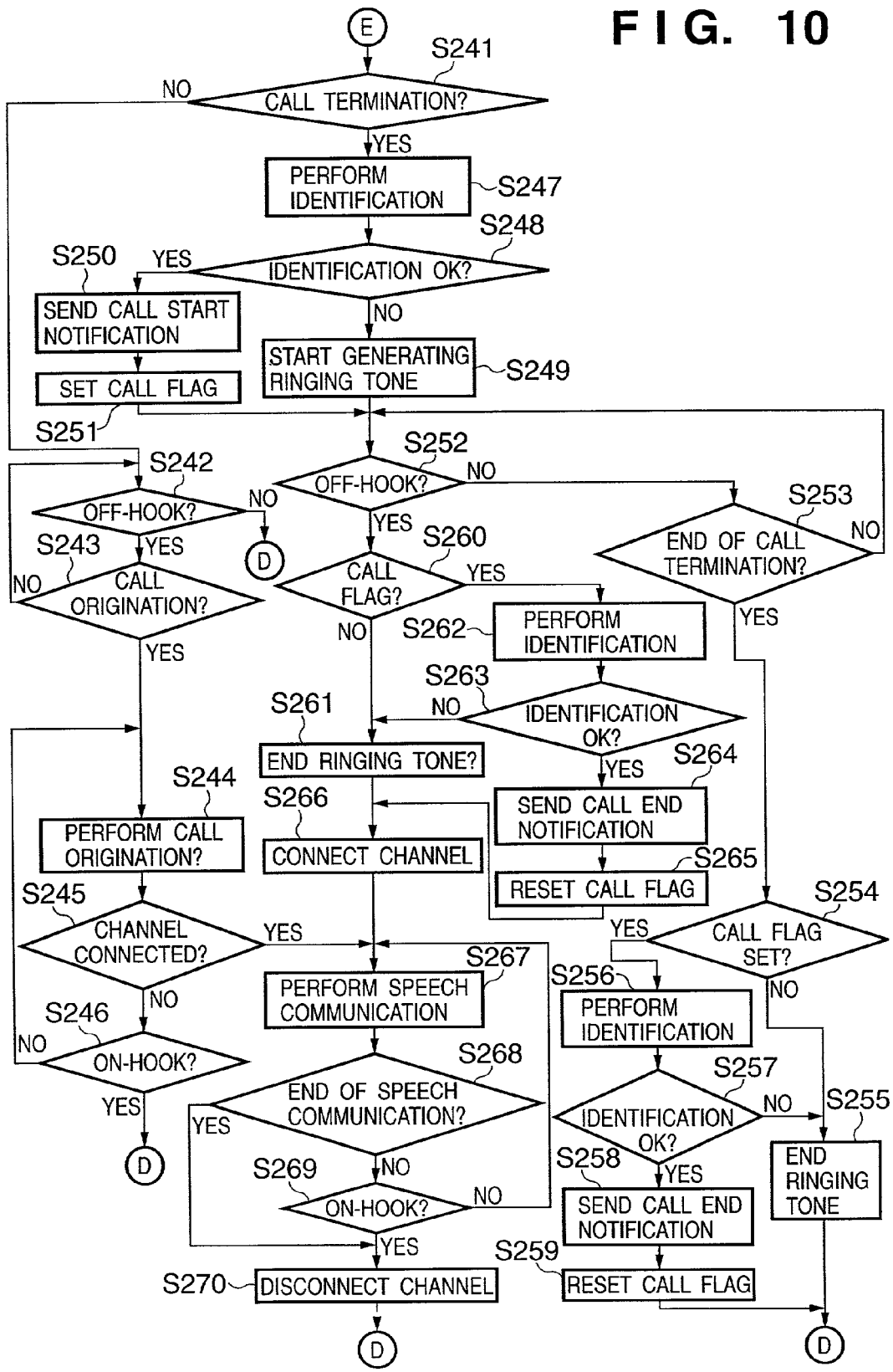
FIG. 10 is a flow chart showing the main routine of the communication apparatus according to the first embodiment of the present invention.

FIGS. 9 and 10 are flow charts showing the main routine of the communication apparatus 300 according to the first embodiment.

Referring to FIG. 9, in step S201, when the communication apparatus is powered on by, e.g., exchanging the battery, the communication system controller 350 initializes flags, control variables, and the like and, in step S202, determines the set state of a power switch included in the operation means 362. If the power switch is set in the power OFF state (NO in step S202), the communication system controller 350 executes predetermined end processing, e.g., changes the display of each display means to the end state, records necessary parameters, set values, and set modes, including flags and control variables, in the nonvolatile memory 354, and stops unnecessary power supply to the respective parts of the communication apparatus 300, including the image display unit 324, by a power controller 380 (step S203). After that, the flow returns to step S202.

If the power switch included in the operation means 362 is set in the power ON state (YES in step S202), the flow advances to step S204. The communication system controller 350 determines whether the remaining power level or operating situation, by the power controller 380, of a power source 386 formed from a battery or the like has any problem for operation of the communication apparatus 300.

If the remaining power level or operating situation of the power source 386 has a problem for operation of the communication apparatus 300, the communication system controller 350 sets a portable telephone battery level flag to E (empty), which represents that the battery level has a problem for continuous operation of the communication apparatus 300 (step S205), and the flow advances to step S208.

In step S208, the communication system controller 350 inquires of the system controller 50 about the contents of the identification information holding unit 58 of the image sensing apparatus 100 through the communication unit 330, antenna 332, antenna 112, and communication unit 110. If it is determined by checking the contents of the identification information holding unit 58 that communication with the image sensing apparatus 100 can be performed without any problem (YES in step S209), the flow advances to step S210.

If it is determined by checking the contents of the identification information holding unit 58 that communication with the image sensing apparatus 100 cannot be performed due to a problem (NO in step S209), the flow advances to step S211.

The contents of the identification information holding unit 58 of the image sensing apparatus 100 may be checked using the identification information holding unit 356 of the communication apparatus 300.

Authentication between the image sensing apparatus 100 and the communication apparatus 300 can be done by checking the identification information.

In step S210, the communication system controller 350 sends a predetermined warning notification representing various emergency statuses of the communication apparatus 300 to the image sensing apparatus 100 through the communication unit 330 and antenna 332, and the flow advances to step S211.

The communication system controller 350 performs predetermined warning by an image or sound using the notification unit 360, and then executes predetermined end processing, e.g., changes the display of each display means to the end state, records necessary parameters, set values, and set modes, including flags and control variables, in the nonvolatile memory 354, and stops unnecessary power supply to the respective parts of the communication apparatus 300, including the image display unit 324, by the power controller 380 (step S212). After that, the flow returns to step S202.

With this processing, even in a use situation wherein, for example, the communication apparatus 300 is put into a bag, and an image is to be sensed using the image sensing apparatus 100, the user of the image sensing system can be quickly warned by notifying the image sensing apparatus 100 of the status of the communication apparatus 300. As a result, a convenient system can be provided.

When the remaining power level of the power source 386 is less than a predetermined threshold value, the flow advances from step S204 to S206. The communication system controller 350 sets the portable telephone battery level flag to L (low), which represents that the battery level is too low to continue the operation of the communication apparatus 300, and the flow advances to step S213.

When the remaining power level of the power source 386 is more than the predetermined threshold value, the flow advances to step S207. The communication system controller 350 sets the portable telephone battery level flag to H (high), which represents that the battery level is sufficient to continue the operation of the communication apparatus 300, and the flow advances to step S213.

In step S213, the communication system controller 350 inquires of the system controller 50 about the contents of the identification information holding unit 58 of the image sensing apparatus 100 through the communication unit 330, antenna 332, antenna 112, and communication unit 110. If it is determined by checking the contents of the identification information holding unit 58 that communication with the image sensing apparatus 100 can be performed without any problem (YES in step S214), the flow advances to step S215. If it is determined by checking the contents of the identification information holding unit 58 that communication with the image sensing apparatus 100 cannot be performed due to a problem (NO in step S214), the flow advances to step S216.

The contents of the identification information holding unit 58 of the image sensing apparatus 100 may be checked using the identification information holding unit 356 of the communication apparatus 300.

Authentication between the image sensing apparatus 100 and the communication apparatus 300 can be done by checking the identification information.

In step S215, the communication system controller 350 transmits predetermined status notifications representing various statuses of the communication apparatus 300 to the image sensing apparatus 100 through the communication unit 330 and antenna 332. The predetermined status notifications include a radio wave intensity notification, incommunicable zone notification, and remaining battery level notification. In addition, a communication disabled status or a status which degrades the communication state is transmitted.

With this processing, even in a use situation wherein, for example, the communication apparatus 300 is put into a bag, and an image is to be sensed using the image sensing apparatus 100, the user of the image sensing system can be quickly notified of the status by notifying the image sensing apparatus 100 of the status of the communication apparatus 300. As a result, a convenient system can be provided.

After that, the communication system controller 350 displays various set statuses of the communication apparatus 300, including the remaining battery level, by an image or sound using the display means 360 (step S216), and then is set in the standby state to wait for call termination from another communication apparatus or communication base station (step S217).

In step S218, the communication system controller 350 determines whether image data is received from the image sensing apparatus 100 through the communication unit 110, antenna 112, antenna 332, and communication unit 330. If YES in step S218, the flow advances to step S219. If NO in step S218, the flow advances to step S241 in FIG. 10.

In step S219, the communication system controller 350 inquires of the system controller 50 about the contents of the identification information holding unit 58 of the image sensing apparatus 100 through the communication unit 330, antenna 332, antenna 112, and communication unit 110. If it is determined by checking the contents of the identification information holding unit 58 that communication with the image sensing apparatus 100 can be performed without any problem (YES in step S220), the flow advances to step S221.

If it is determined by checking the contents of the identification information holding unit 58 that communication with the image sensing apparatus 100 cannot be performed due to a problem (NO in step S220), the flow advances to step S241 in FIG. 10.

The contents of the identification information holding unit 58 of the image sensing apparatus 100 may be checked using the identification information holding unit 356 of the communication apparatus 300.

Authentication between the image sensing apparatus 100 and the communication apparatus 300 can be done by checking the identification information.

In step S221, the communication system controller 350 sequentially stores, in a memory 320, the image data received from the image sensing apparatus 100 through the communication unit 110, antenna 112, antenna 332, and communication unit 330, sequentially reads out the stored image data, and records the image data in a recording unit 202 of a recording medium 200 through an interface 390, connector 392, connector 206, and interface 204.

The image data stored in the memory 320 can also be displayed on the image display unit 324 through a D/A converter 322. In this case, the received image data is displayed on the image display unit 324 after predetermined interpolation or thinning and predetermined color processing are executed by the memory controller 314 in accordance with the specifications of the image display unit 324. When the series of operations are ended (YES in step S222), the flow advances to step S241 in FIG. 10.

In step S241, the communication system controller 350 determines whether call termination from another communication apparatus or communication base station is detected through an antenna 328 and communication unit 326. If no call termination from another communication apparatus or communication base station is detected (NO in step S241), the flow advances to step S242. If call termination from another communication apparatus or communication base station is detected (YES in step S241), the flow advances to step S247.

In step S242, the communication system controller 350 determines whether the off-hook (speech communication start) switch included in the operation means 362 is set. If the off-hook switch is not set (NO in step S242), the flow returns to step S202 in FIG. 9.

When the off-hook (speech communication start) switch included in the operation means 362 is set (YES in step S242), and call origination is set by the operation means 362 (YES in step S243), the communication system controller 350 executes call origination to another communication apparatus or communication base station in accordance with the set telephone number (step S244).

While the channel to another communication apparatus or communication base station is not being connected (NO in step S245), until the on-hook (speech communication cancel) switch included in the operation means 362 is set (i.e., until YES in step S246), the communication system controller 350 returns to step S244 to repeat the series of processing operations.

When the channel to another communication apparatus or communication base station is connected (YES in step S245), the flow advances to step S267.

When call termination is detected in step S241, the flow advances to step S247, and the communication system controller 350 inquires of the system controller 50 about the contents of the identification information holding unit 58 of the image sensing apparatus 100 through the communication unit 330, antenna 332, antenna 112, and communication unit 110. If it is determined by checking the contents of the identification information holding unit 58 that communication with the image sensing apparatus 100 cannot be performed due to a problem (NO in step S248), the flow advances to step S249.

If it is determined by checking the contents of the identification information holding unit 58 in step S247 that communication with the image sensing apparatus 100 can be performed without any problem (YES in step S248), the flow advances to step S250.

The contents of the identification information holding unit 58 of the image sensing apparatus 100 may be checked using the identification information holding unit 356 of the communication apparatus 300.

Authentication between the image sensing apparatus 100 and the communication apparatus 300 can be done by checking the identification information.

In step S249, the communication system controller 350 starts notifying the user of the communication apparatus 300 of call termination using a ringing tone, vibration, or the like by a call termination notification unit 364.

In step S250, the communication system controller 350 notifies the image sensing apparatus 100 of the start of a call through the communication unit 330 and antenna 332 and simultaneously sets the call flag (step S251), and the flow advances to step S252. The call flag is stored in a predetermined area of the internal memory of the communication system controller 350 and/or the memory 352.

When the image sensing apparatus 100 is notified of the call termination at the communication apparatus 300, the user can know the call termination at the communication apparatus 300 even during use of the image sensing apparatus 100.

If the off-hook (speech communication start) switch included in the operation means 362 is not set (NO in step S252), the communication system controller 350 determines whether the call termination from another communication apparatus or communication base station is ended (step S253). If YES in step S253, the flow advances to step S254. If the call termination is not ended (NO in step S253), the flow returns to step S252.

In step S254, the communication system controller 350 determines the state of the call flag stored in a predetermined area of the internal memory of the communication system controller 350 and/or the memory 352. If the call flag is set, the flow advances to step S256. If the call flag is not set, the flow advances to step S255.

In step S256, the communication system controller 350 inquires of the system controller 50 about the contents of the identification information holding unit 58 of the image sensing apparatus 100 through the communication unit 330, antenna 332, antenna 112, and communication unit 110. If it is determined by checking the contents of the identification information holding unit 58 that communication with the image sensing apparatus 100 can be performed without any problem (YES in step S257), the flow advances to step S258.

If it is determined by checking the contents of the identification information holding unit 58 that communication with the image sensing apparatus 100 cannot be performed due to a problem (NO in step S257), the flow advances to step S255.

The contents of the identification information holding unit 58 of the image sensing apparatus 100 may be checked using the identification information holding unit 356 of the communication apparatus 300.

Authentication between the image sensing apparatus 100 and the communication apparatus 300 can be done by checking the identification information.

In step S255, the communication system controller 350 ends call termination notification to the user of the communication apparatus 300 using a ringing tone, vibration, or the like by the call termination notification unit 364, and the flow returns to step S202 in FIG. 9.

In step S258, the communication system controller 350 sends a call end notification to the image sensing apparatus 100 through the communication unit 330 and antenna 332 and cancels the call flag (step S259), and the flow returns to step S202 in FIG. 9.

If it is determined in step S252 that the off-hook (speech communication start) switch included in the operation means 362 is set, the flow advances to step S260. The communication system controller 350 determines the state of the call flag stored in a predetermined area of the internal memory of the communication system controller 350 and/or the memory 352. If the call flag is set, the flow advances to step S262. If the call flag is not set, the flow advances to step S261.

In step S262, the communication system controller 350 inquires of the system controller 50 about the contents of the identification information holding unit 58 of the image sensing apparatus 100 through the communication unit 330, antenna 332, antenna 112, and communication unit 110. If it is determined by checking the contents of the identification information holding unit 58 that communication with the image sensing apparatus 100 can be performed without any problem (YES in step S263), the flow advances to step S264.

If it is determined by checking the contents of the identification information holding unit 58 that communication with the image sensing apparatus 100 cannot be performed due to a problem (NO in step S263), the flow advances to step S261.

The contents of the identification information holding unit 58 of the image sensing apparatus 100 may be checked using the identification information holding unit 356 of the communication apparatus 300.

Authentication between the image sensing apparatus 100 and the communication apparatus 300 can be done by checking the identification information.

In step S261, the communication system controller 350 ends call termination notification to the user of the communication apparatus 300 using a ringing tone, vibration, or the like by the call termination notification unit 364, and the flow advances to step S266.

In step S264, the communication system controller 350 sends a call end notification to the image sensing apparatus 100 through the communication unit 330 and antenna 332 and cancels the call flag (step S265), and the flow advances to step S266.

The call flag is stored in a predetermined area of the internal memory of the communication system controller 350 and/or the memory 352.

In step S266, the communication system controller 350 connects a channel to another communication apparatus directly or through the communication base station, which has made a call to the communication apparatus 300, through the antenna 328 and communication unit 326, and performs speech communication operation with another communication apparatus directly or through the communication base station (step S267).

In the speech communication operation, sound data received from another communication apparatus directly or through the communication base station through the antenna 328 and communication unit 326 is stored in the memory 320. The sound data read out from the memory 320 is subjected to predetermined decoding processing or sound processing by the memory controller 314. The sound data can be converted into a sound signal and output from the speaker 318 through the D/A converter 316.

In addition, generated sound is subjected to predetermined sound processing or encoding by the memory controller 314 through the microphone 310 and A/D converter 312 and stored in the memory 320. The sound data read out from the memory 320 can be transmitted to another communication apparatus directly or through the communication base station through the communication unit 326 and antenna 328.

When speech communication with another communication apparatus directly or through the communication base station is ended (YES in step S268), or even if the speech communication is not ended (NO in step S268), when the on-hook (speech communication cancel) switch included in the operation means 362 is set (YES in step S269), the communication system controller 350 disconnects the channel to another communication apparatus directly or through the communication base station, with which the speech communication is executed (step S270), and the flow returns to step S202 in FIG. 9.

As described above, according to the first embodiment, the communication apparatus 300 notifies the image sensing apparatus 100 of the status of the communication apparatus 300, and the image sensing apparatus 100 determines the operating status of itself. Hence, the status of the communication apparatus 300 can be displayed on the image sensing apparatus 100 in accordance with the determination result.

In addition, the communication apparatus 300 notifies the image sensing apparatus 100 of various statuses of the communication apparatus 300, including the remaining battery level, and the image sensing apparatus 100 determines the status of the image sensing preparation operation and/or image sensing operation of the image sensing apparatus 100. Hence, various statuses of the communication apparatus 300, including the remaining battery level, can be displayed on the image sensing apparatus 100 in accordance with the determination result.

The communication apparatus 300 notifies the image sensing apparatus 100 of the call termination status of the communication apparatus 300, and the image sensing apparatus 100 determines the status of the image sensing preparation operation and/or image sensing operation of the image sensing apparatus 100. Hence, the call termination at the communication apparatus 300 can be displayed on the image sensing apparatus 100 in accordance with the determination result.

According to the above arrangement, the user can know the operating status of the communication apparatus such as a portable telephone on the image sensing apparatus such as an electronic camera.

Additionally, since display of the operating status of the communication apparatus on the image sensing apparatus is stopped or infrequently done in accordance with the operating status of the image sensing apparatus, the convenience can be improved.

Furthermore, since call termination information at the communication apparatus is displayed on the image sensing apparatus, the user can know the call termination at the communication apparatus during use of the image sensing apparatus.

<Second Embodiment>

In the first embodiment, the status notification of the communication apparatus 300 is transmitted to the image sensing apparatus 100 regardless of the operation state of the image sensing apparatus 100, and whether or not to display the transmitted status is determined by the image sensing apparatus 100. In the second embodiment, the image sensing apparatus 100 sends a notification, to the communication apparatus 300, to permit or inhibit sending the status notification of the communication apparatus 300 in accordance with the operation state of the image sensing apparatus.

<Description of Operation of Image Sensing Apparatus 100>

Figure 11:
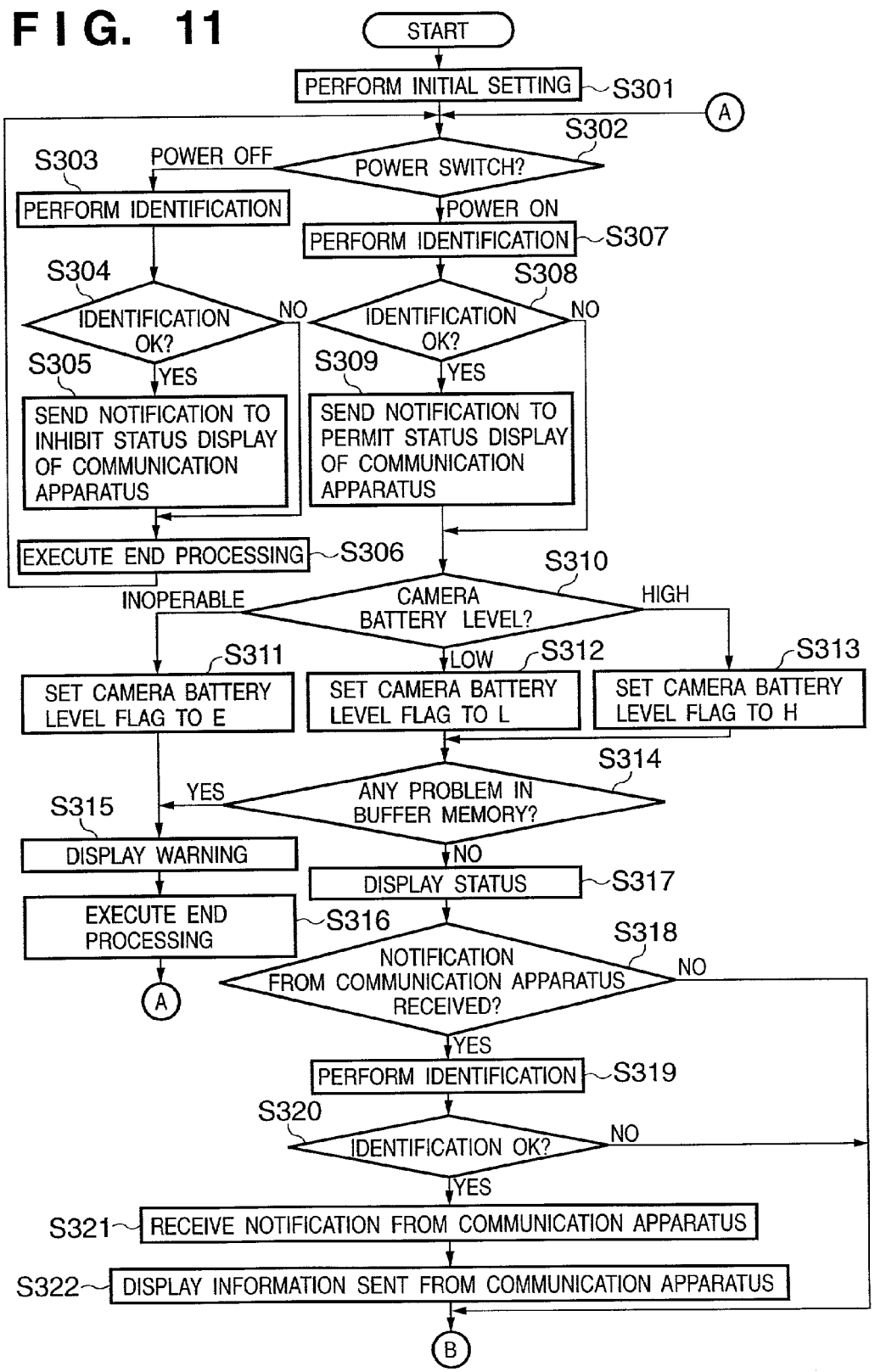
FIG. 11 is a flow chart showing the main routine of an image sensing apparatus according to the second embodiment of the present invention.
Figure 12:
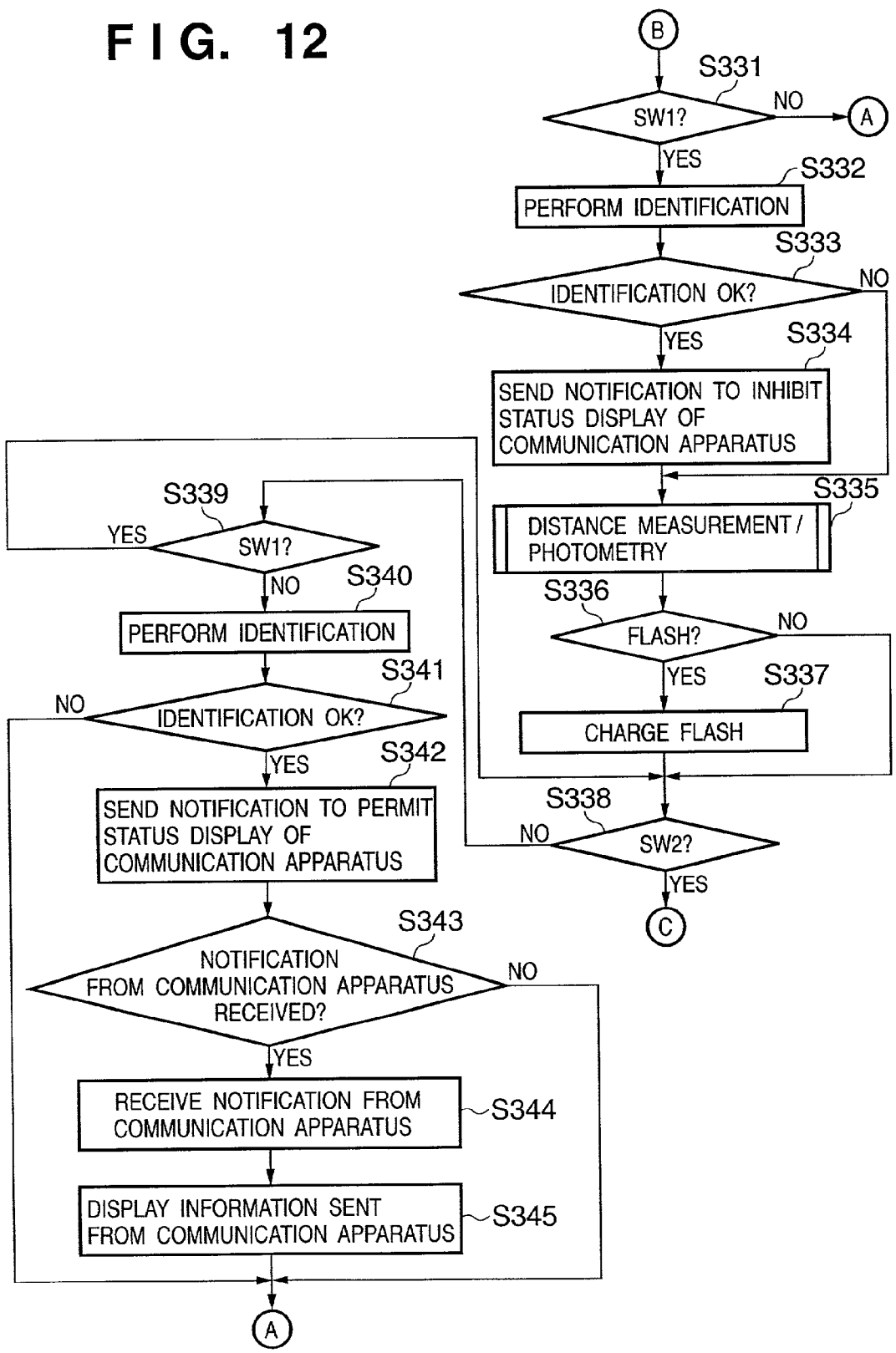
FIG. 12 is a flow chart showing the main routine of the image sensing apparatus according to the second embodiment of the present invention.
Figure 13:
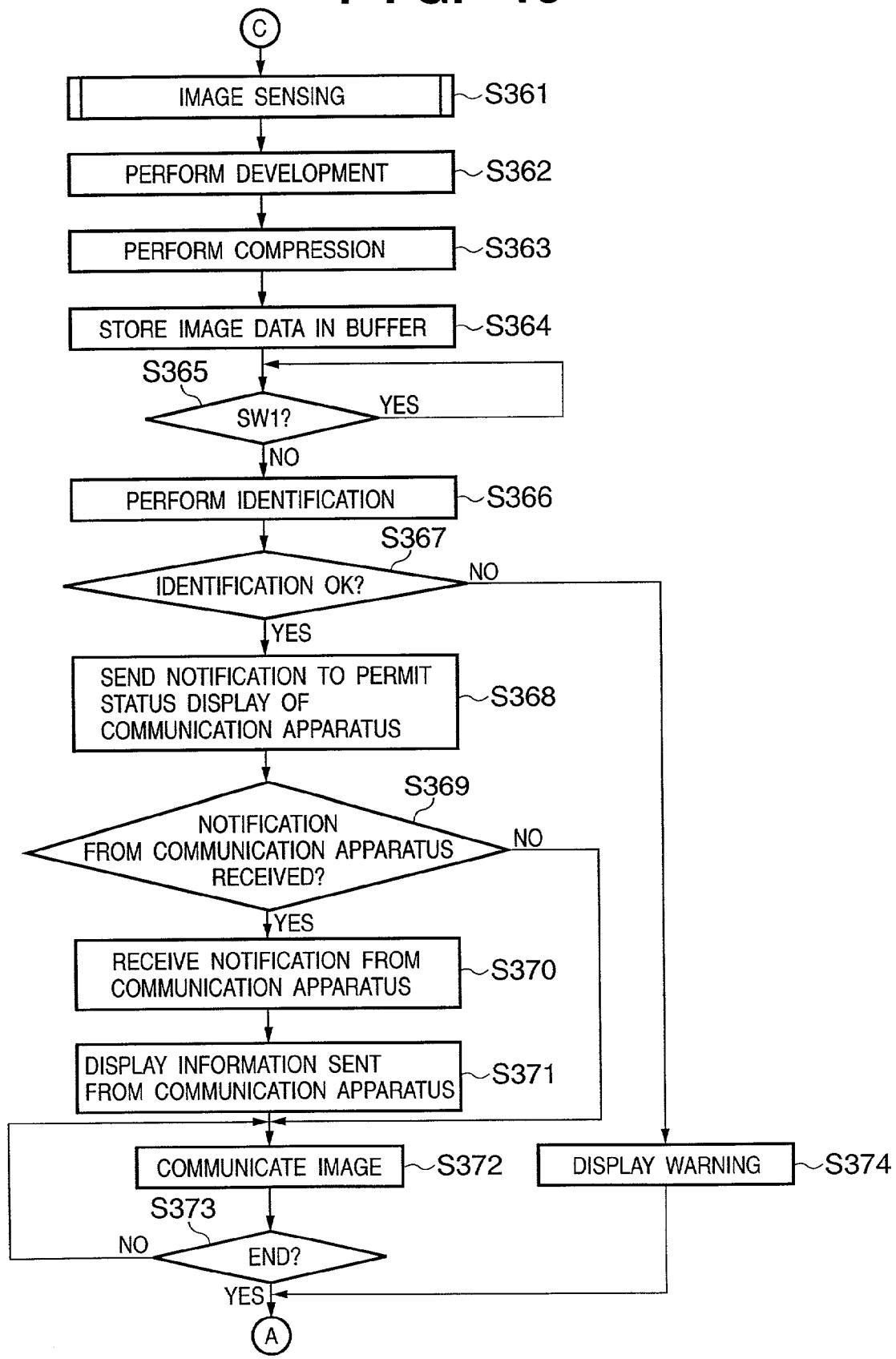
FIG. 13 is a flow chart showing the main routine of the image sensing apparatus according to the second embodiment of the present invention.

The operation of the image sensing apparatus 100 according to the second embodiment will be described next with reference to FIGS. 11 to 13. FIGS. 11 to 13 are flow charts showing the main routine of the image sensing apparatus 100 according to the second embodiment.

Referring to FIG. 11, in step S301, when the image sensing apparatus is powered on by, e.g., exchanging the battery, a system controller 50 initializes flags, control variables, and the like and executes initialization processing of the respective parts of the image sensing apparatus 100. After initialization, the system controller 50 determines the state of a main switch 72 in step S302. If the main switch 72 is set in the power OFF state, the flow advances to step S303. The system controller 50 inquires of a communication system controller 350 about the contents of an identification information holding unit 356 of the communication apparatus 300 through a communication unit 110, antenna 112, antenna 332, and communication unit 330.

If it is determined by checking the contents of the identification information holding unit 356 that communication with the communication apparatus 300 can be performed without any problem (YES in step S304), the flow advances to step S305. If it is determined by checking the contents of the identification information holding unit 356 that communication with the communication apparatus 300 cannot be performed due to a problem (NO in step S304), the flow directly advances to step S306.

The contents of the identification information holding unit 356 of the communication apparatus 300 may be checked using an identification information holding unit 58 of the image sensing apparatus 100.

Authentication between the image sensing apparatus 100 and the communication apparatus 300 can be done by checking the identification information.

In step S305, the system controller 50 sends to the communication apparatus 300 a notification to inhibit the image sensing apparatus 100 from displaying the status of the communication apparatus 300, through the communication unit 110, antenna 112, antenna 332, and communication unit 330, and the flow advances to step S306. The communication apparatus 300 that has received the notification stops transmitting its status to the image sensing apparatus 100, as will be described later.

The status display of the communication apparatus 300 is executed by storing the status of the communication apparatus 300, which is received from the communication unit 330 of the communication apparatus 300 through the antenna 332, antenna 112, and communication unit 110, in the internal memory of the system controller 50 or a memory 52, and reading out the stored data and displaying it by a notification unit 54 and/or image display unit 28.

The system controller 50 executes predetermined end processing, e.g., changes the display of each display means to the end state, and if the image sensing apparatus has a protection means such as a barrier 102, closes it to protect the image sensing portion, records necessary parameters, set values, and set modes, including flags and control variables, in a nonvolatile memory 56, and stops unnecessary power supply to the respective parts of the image sensing apparatus 100, including the image display unit 28, by a power controller 80 (step S306). After that, the flow returns to step S302.

If it is determined in step S302 that the main switch 72 is set in the power ON state, the flow advances to step S307 to inquire of the communication system controller 350 about the contents of the identification information holding unit 356 of the communication apparatus 300 through the communication unit 110, antenna 112, antenna 332, and communication unit 330.

If it is determined by checking the contents of the identification information holding unit 356 that communication with the communication apparatus 300 can be performed without any problem (YES in step S308), the flow advances to step S309. If it is determined by checking the contents of the identification information holding unit 356 that communication with the communication apparatus 300 cannot be performed due to a problem (NO in step S308), the flow directly advances to step S310.

The contents of the identification information holding unit 356 of the communication apparatus 300 may be checked using an identification information holding unit 58 of the image sensing apparatus 100.

Authentication between the image sensing apparatus 100 and the communication apparatus 300 can be done by checking the identification information.

In step S309, the system controller 50 sends to the communication apparatus 300 a notification to permit the image sensing apparatus 100 to display the status of the communication apparatus 300, through the communication unit 110, antenna 112, antenna 332, and communication unit 330, and the flow advances to step S310. The communication apparatus 300 that has received the notification transmits its status to the image sensing apparatus 100, as will be described later.

In step S310, the system controller 50 determines whether the remaining power level or operating situation of a power source 86 formed from a battery or the like by the power controller 80 has any problem for continuous operation of the image sensing apparatus 100.

If the remaining power level of the power source 86 has a problem for continuous operation of the image sensing apparatus 100, the flow advances to step S311. The system controller 50 sets a camera battery level flag to E (empty), which represents that the battery level has a problem for continuous operation of the image sensing apparatus 100, and the flow advances to step S315.

When the remaining power level of the power source 86 is less than a predetermined threshold value, the flow advances from step S310 to S312. The system controller 50 sets the camera battery level flag to L (low), which represents that the battery level is too low to continue the operation of the image sensing apparatus 100, and the flow advances to step S314.

When the remaining power level of the power source 86 is more than the predetermined threshold value, the flow advances to step S313. The system controller 50 sets the camera battery level flag to H (high), which represents that the battery level is sufficient to continue the operation of the image sensing apparatus 100, and the flow advances to step S314.

In step S314, the system controller 50 determines whether the operating status of the memory 30 serving as a buffer for obtained image data has any problem for operation of the image sensing apparatus 100 and, more particularly, image data storage/read operation for the memory 30. If NO in step S314, the flow advances to step S317. Otherwise, the flow advances to step S315.

In step S315, the system controller 50 performs predetermined warning by an image or sound using the notification unit 54 and/or image display unit 28. The system controller 50 executes predetermined end processing, e.g., changes the display of each display means to the end state, and if the image sensing apparatus has a protection means such as the barrier 102, closes it to protect the image sensing portion, records necessary parameters, set values, and set modes, including flags and control variables, in the nonvolatile memory 56, and stops unnecessary power supply to the respective parts of the image sensing apparatus 100, including the image display unit 28, by the power controller 80 (step S316). After that, the flow returns to step S302.

In step S317, the system controller 50 displays various set statuses of the image sensing apparatus 100, including the remaining battery level and the status of the memory 30, by an image or sound using the notification unit 54 and/or image display unit 28, and the flow advances to step S318.

The system controller 50 determines whether a notification is received from the communication apparatus 300 through the communication unit 330, antenna 332, antenna 112, and communication unit 110. If a notification is received (YES in step S318), the flow advances to step S319. If no notification is received (NO in step S318), the flow advances to step S331 in FIG. 12.

In step S319, the system controller 50 inquires of a communication system controller 350 about the contents of the identification information holding unit 356 of the communication apparatus 300 through the communication unit 110, antenna 112, antenna 332, and communication unit 330.

If it is determined by checking the contents of the identification information holding unit 356 that communication with the communication apparatus 300 can be performed without any problem (YES in step S320), the flow advances to step S321. If it is determined by checking the contents of the identification information holding unit 356 that communication with the communication apparatus 300 cannot be performed due to a problem (NO in step S320), the flow advances to step S331 in FIG. 12.

The contents of the identification information holding unit 356 of the communication apparatus 300 may be checked using the identification information holding unit 58 of the image sensing apparatus 100.

Authentication between the image sensing apparatus 100 and the communication apparatus 300 can be done by checking the identification information.

In step S321, the system controller 50 receives a notification from the communication apparatus 300 through the communication unit 330, antenna 332, antenna 112, and communication unit 110 and stores the notification in the internal memory of the system controller 50 or the memory 52. The system controller 50 sets to display the received status display contents of the communication apparatus 300 by the notification unit 54 and/or image display unit 28 (step S322), and the flow advances to step S331 in FIG. 12.

As described above, when various kinds of warning information or pieces of information representing various statuses from the communication apparatus 300 are displayed by the notification unit 54 and/or image display unit 28 of the image sensing apparatus 100, the user can know the information of the communication apparatus 300 during use of the image sensing apparatus 100.

If the notification received from the communication apparatus 300 is a call start notification or call end notification, it is displayed by the notification unit 54 and/or image display unit 28 of the image sensing apparatus 100 whereby the user can know the call from another communication apparatus or communication base station to the communication apparatus 300 during use of the image sensing apparatus 100.

In step S331 of FIG. 12, the system controller 50 determines whether a shutter switch SW1 is pressed. If NO in step S331, the flow returns to step S302 in FIG. 11.

If the shutter switch SW1 is pressed (YES in step S331), the flow advances to step S332. The system controller 50 inquires of the communication system controller 350 about the contents of the identification information holding unit 356 of the communication apparatus 300 through the communication unit 110, antenna 112, antenna 332, and communication unit 330.

If it is determined by checking the contents of the identification information holding unit 356 that communication with the communication apparatus 300 can be performed without any problem (YES in step S333), the flow advances to step S334. If it is determined by checking the contents of the identification information holding unit 356 that communication with the communication apparatus 300 cannot be performed due to a problem (NO in step S333), the flow advances to step S335.

The contents of the identification information holding unit 356 of the communication apparatus 300 may be checked using the identification information holding unit 58 of the image sensing apparatus 100.

Authentication between the image sensing apparatus 100 and the communication apparatus 300 can be done by checking the identification information.

In step S334, the system controller 50 sends to the communication apparatus 300 a notification to inhibit the image sensing apparatus 100 from displaying the status of the communication apparatus 300, through the communication unit 110, antenna 112, antenna 332, and communication unit 330, and the flow advances to step S335. The communication apparatus 300 stops transmitting its status to the image sensing apparatus 100 in accordance with the notification. With this operation, when the image sensing apparatus 100 is set in the image sensing preparation state, the display contents of the notification unit 54 and/or image display unit 28 of the image sensing apparatus 100 are changed to display information related to image sensing unique to the image sensing apparatus 100, so a display state convenient for image sensing operation can be provided to the user.

In step S335, the system controller 50 executes distance measurement processing to focus the image sensing lens 10 on an object to be sensed, executes photometry processing to determine the f number and shutter speed, and executes white balance processing to adjust the color temperature. In the photometry processing, flash illumination is also set, as needed.

In the distance measurement/photometry processing in step S335, whether AE control and/or AWB control can be executed is determined on the basis of the image sensing start flag and/or AE lock flag and/or white balance mode set flag, which are stored in the internal memory of the system controller 50 or the memory 52, and the respective processing operations are done in accordance with the determination results. The distance measurement/photometry processing in step S335 is the same as in the first embodiment described with reference to FIG. 7, and a detailed description thereof will be omitted.

When the distance measurement/photometry processing in step S335 is ended, the system controller 50 determines the state of the flash flag stored in the internal memory of the system controller 50 or the memory 52 (step S336). If YES in step S336, a flash 48 is charged (step S337), and the flow advances to step S338. If NO in step S336, the flow advances to step S338 without any processing.

When a shutter switch SW2 is not pressed (NO in step S338), and the shutter switch SW1 is released (NO in step S339), the system controller 50 inquires of the communication system controller 350 about the contents of the identification information holding unit 356 of the communication apparatus 300 through the communication unit 110, antenna 112, antenna 332, and communication unit 330 (step S340).

If it is determined by checking the contents of the identification information holding unit 356 that communication with the communication apparatus 300 can be performed without any problem (YES in step S341), the flow advances to step S342. If it is determined by checking the contents of the identification information holding unit 356 that communication with the communication apparatus 300 cannot be performed due to a problem (NO in step S341), the flow returns to step S302 in FIG. 11.

The contents of the identification information holding unit 356 of the communication apparatus 300 may be checked using the identification information holding unit 58 of the image sensing apparatus 100.

Authentication between the image sensing apparatus 100 and the communication apparatus 300 can be done by checking the identification information.

The system controller 50 sends to the communication apparatus 300 a notification to permit the notification unit 54 and/or image display unit 28 of the image sensing apparatus 100 to display the status of the communication apparatus 300, through the communication unit 110, antenna 112, antenna 332, and communication unit 330, and the flow advances to step S343. The communication apparatus 300 that has received the notification can transmit its status to the image sensing apparatus 100, as will be described later.

With this operation, when the image sensing apparatus 100 ends the image sensing preparation state, the display contents of the notification unit 54 and/or image display unit 28 of the image sensing apparatus 100 can be changed from the state wherein pieces of information related to image sensing unique to the image sensing apparatus 100 are displayed to the state wherein the notification from the communication apparatus 300 is displayed or pieces of information related to image sensing unique to the image sensing apparatus 100 and the notification from the communication apparatus 300 are displayed.

The system controller 50 determines whether a notification is received from the communication apparatus 300 through the communication unit 330, antenna 332, antenna 112, and communication unit 110. If a notification is received (YES in step S343), the flow advances to step S344. If no notification is received (NO in step S343), the flow returns to step S302 in FIG. 11.

The system controller 50 receives the notification from the communication apparatus 300 through the communication unit 330, antenna 332, antenna 112, and communication unit 110 and stores the notification in the internal memory of the system controller 50 or the memory 52 (step S344).

The system controller 50 sets to display the received status display contents of the communication apparatus 300 by the notification unit 54 and/or image display unit 28 (step S345), and the flow returns to step S302 in FIG. 11.

Since various kinds of warning information or pieces of information representing various statuses from the communication apparatus 300 are displayed by the notification unit 54 and/or image display unit 28 of the image sensing apparatus 100, the user can know the information of the communication apparatus 300 during use of the image sensing apparatus 100.

In addition, since a call start notification or call end notification from the communication apparatus 300 is displayed by the notification unit 54 and/or image display unit 28 of the image sensing apparatus 100, the user can know the call from another communication apparatus or communication base station to the communication apparatus 300 during use of the image sensing apparatus 100.

If the shutter switch SW2 is pressed (YES in step S338), the flow advances to step S361 in FIG. 13.

In step S361, the system controller 50 executes image sensing processing comprising exposure processing of writing obtained image data in the memory 30 through an image sensing device 14, A/D converter 16, image processor 20, and memory controller 22 or from the A/D converter only through the memory controller 22. The image sensing processing in step S361 is the same as in the first embodiment described with reference to FIG. 8, and a detailed description thereof will be omitted.

The system controller 50 executes development processing of reading out the image data from the memory 30 and processing the image data in various ways using the memory controller 22 and, the image processor 20, as needed (step S362), executes compression processing of compressing the image in accordance with the set mode using the compression/expansion circuit 32, as needed (step S363), and stores the image data that has undergone predetermined processing in the memory 30 (step S364).

In step S365, the system controller 50 determines the state of the shutter switch SW1. If the shutter switch SW1 is released, the system controller 50 inquires of the communication system controller 350 about the contents of the identification information holding unit 356 of the communication apparatus 300 through the communication unit 110, antenna 112, antenna 332, and communication unit 330 (Step S366).

If it is determined by checking the contents of the identification information holding unit 356 that communication with the communication apparatus 300 can be performed without any problem (YES in step S367), the flow advances to step S368. If it is determined by checking the contents of the identification information holding unit 356 that communication with the communication apparatus 300 cannot be performed due to a problem (NO in step S367), the system controller 50 performs predetermined warning by an image or sound using the notification unit 54 and/or image display unit 28 (step S374), and the flow returns to step S302 in FIG. 11.

The contents of the identification information holding unit 356 of the communication apparatus 300 may be checked using the identification information holding unit 58 of the image sensing apparatus 100.

Authentication between the image sensing apparatus 100 and the communication apparatus 300 can be done by checking the identification information.

In step S368, the system controller 50 sends to the communication apparatus 300 a notification to permit the notification unit 54 and/or image display unit 28 of the image sensing apparatus 100 to display the status of the communication apparatus 300, through the communication unit 110, antenna 112, antenna 332, and communication unit 330, and the flow advances to step S369.

With this operation, when the image sensing apparatus 100 ends the image sensing preparation state, the display contents of the notification unit 54 and/or image display unit 28 of the image sensing apparatus 100 can be changed from the state wherein pieces of information related to image sensing unique to the image sensing apparatus 100 are displayed to the state wherein the notification from the communication apparatus 300 is displayed or pieces of information related to image sensing unique to the image sensing apparatus 100 and the notification from the communication apparatus 300 are displayed.

The system controller 50 determines whether a notification is received from the communication apparatus 300 through the communication unit 330, antenna 332, antenna 112, and communication unit 110. If a notification is received (YES in step S369), the flow advances to step S370. If no notification is received (NO in step S369), the flow advances to step S372.

The system controller 50 receives the notification from the communication apparatus 300 through the communication unit 330, antenna 332, antenna 112, and communication unit 110 and stores the notification in the internal memory of the system controller 50 or the memory 52 (step S370).

The system controller 50 sets to display the received status display contents of the communication apparatus 300 by the notification unit 54 and/or image display unit 28 (step S371), and the flow advances to step S372.

Since various kinds of warning information or pieces of information representing various statuses from the communication apparatus 300 are displayed by the notification unit 54 and/or image display unit 28 of the image sensing apparatus 100, the user can know the information of the communication apparatus 300 during use of the image sensing apparatus 100.

In addition, since a call start notification or call end notification from the communication apparatus 300 is displayed by the notification unit 54 and/or image display unit 28 of the image sensing apparatus 100, the user can know the call from another communication apparatus or communication base station to the communication apparatus 300 during use of the image sensing apparatus 100.

In step S372, the system controller 50 reads out, from the memory 30, the image data which has undergone predetermined image sensing processing, development processing, compression processing, and the like, and communicates the image to the communication apparatus 300 through the communication unit 110 and antenna 112.

When the image communication is ended (YES in step S373), the flow returns to step S302 in FIG. 11.

In step S372, the image data can be transmitted in accordance with an instruction from the operator of the image sensing apparatus 100 or a request from the communication apparatus 300.

<Description of Operation of Communication Apparatus 300>

The operation of the communication apparatus 300 according to the second embodiment will be described next with reference to FIGS. 14 and 15.

Figure 14:
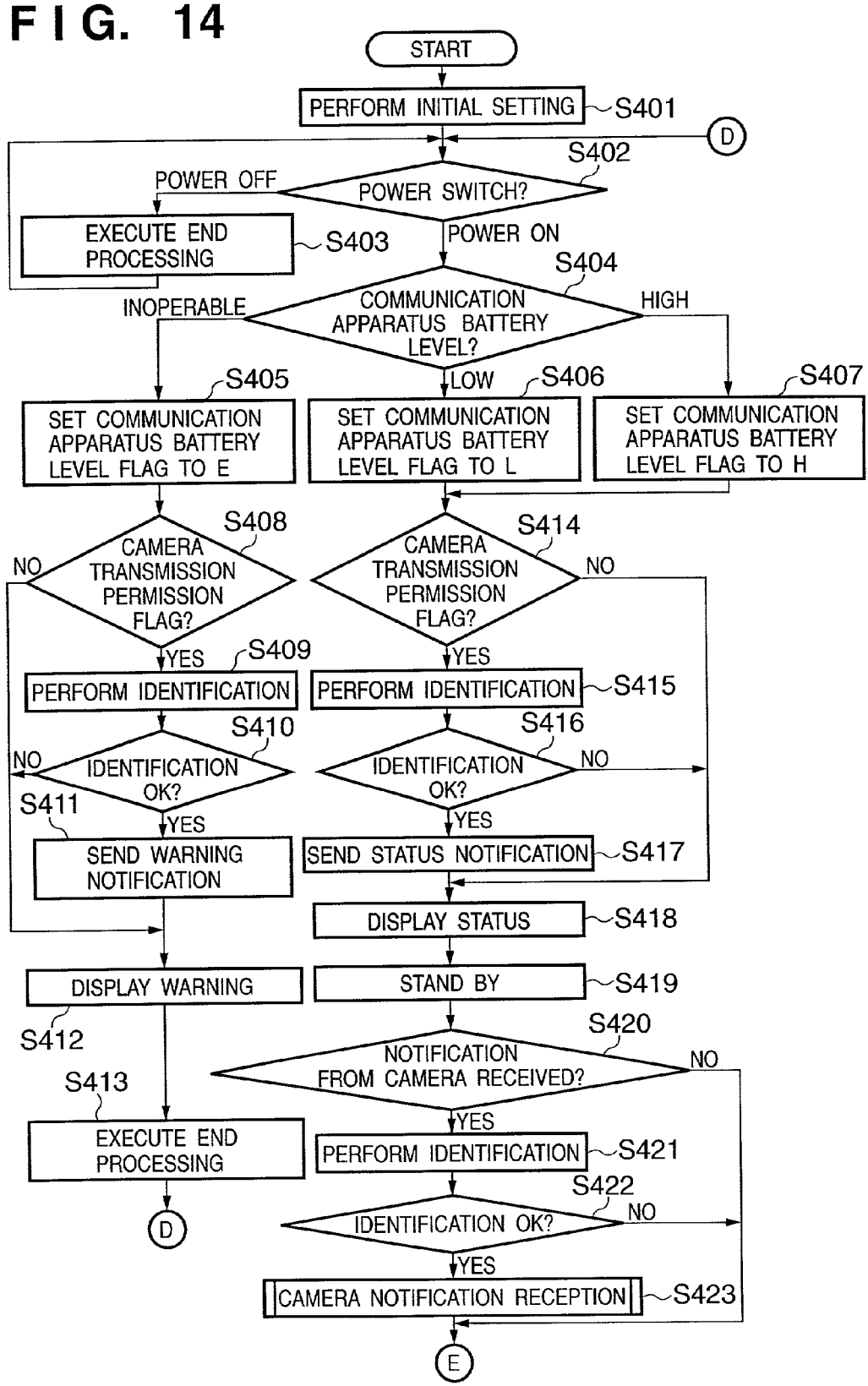
FIG. 14 is a flow chart showing the main routine of a communication apparatus according to the second embodiment of the present invention.
Figure 15:
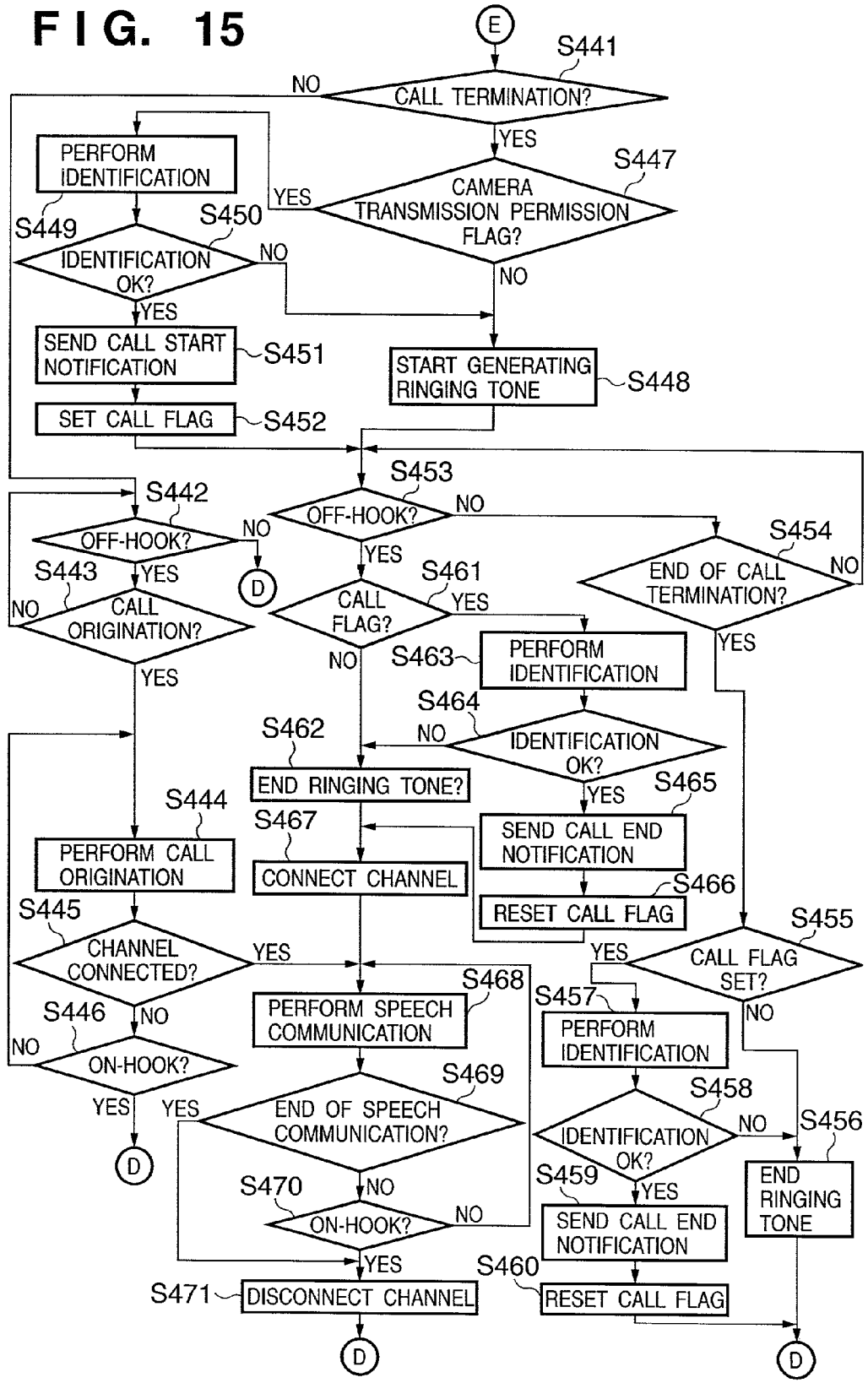
FIG. 15 is a flow chart showing the main routine of the communication apparatus according to the second embodiment of the present invention.

FIGS. 14 and 15 are flow charts showing the main routine of the communication apparatus 300 according to the second embodiment.

Referring to FIG. 14, in step S401, when the communication apparatus is powered on by, e.g., exchanging the battery, the communication system controller 350 initializes flags, control variables, and the like and, in step S402, determines the set state of a power switch included in an operation means 362. If the power switch is set in the power OFF state (NO in step S402), the communication system controller 350 executes predetermined end processing, e.g., changes the display of each display means to the end state, records necessary parameters, set values, and set modes, including flags and control variables, in a nonvolatile memory 354, and stops unnecessary power supply to the respective parts of the communication apparatus 300, including the image display unit 324, by a power controller 380 (step S403). After that, the flow returns to step S402.

If the power switch included in the operation means 362 is set in the power ON state (YES in step S402), the flow advances to step S404. The communication system controller 350 determines whether the remaining power level or operating situation of a power source 386 formed from a battery or the like by the power controller 380 has any problem for operation of the communication apparatus 300.

If the remaining power level or operating situation of the power source 386 has a problem for operation of the communication apparatus 300, the communication system controller 350 sets a portable telephone battery level flag to E (empty), which represents that the battery level has a problem for continuous operation of the communication apparatus 300 (step S405), and the flow advances to step S408.

In step S408, the communication system controller 350 determines the state of a camera transmission permission flag stored in a predetermined area of the internal memory of the communication system controller 350 and/or the memory 352. If the camera transmission permission flag is set (YES in step S408), the flow advances to step S409. If the camera transmission permission flag is not set (NO in step S408), the flow advances to step S412.

In step S409, the communication system controller 350 inquires of the system controller 50 about the contents of the identification information holding unit 58 of the image sensing apparatus 100 through the communication unit 330, antenna 332, antenna 112, and communication unit 110. If it is determined by checking the contents of the identification information holding unit 58 that communication with the image sensing apparatus 100 can be performed without any problem (YES in step S410), the flow advances to step S411. If it is determined by checking the contents of the identification information holding unit 58 that communication with the image sensing apparatus 100 cannot be performed due to a problem (NO in step S410), the flow advances to step S412.

The contents of the identification information holding unit 58 of the image sensing apparatus 100 may be checked using the identification information holding unit 356 of the communication apparatus 300.

Authentication between the image sensing apparatus 100 and the communication apparatus 300 can be done by checking the identification information.

In step S411, the communication system controller 350 sends a predetermined warning notification representing various emergency statuses of the communication apparatus 300, including that the remaining battery level of the communication apparatus 300 is zero, to the image sensing apparatus 100 through the communication unit 330 and antenna 332, and the flow advances to step S412.

The communication system controller 350 performs predetermined warning by an image or sound using a display means 360 (step S412), and then executes predetermined end processing, e.g., changes the display of each display means to the end state, records necessary parameters, set values, and set modes, including flags and control variables, in the nonvolatile memory 354, and stops unnecessary power supply to the respective parts of the communication apparatus 300, including the image display unit 324, by the power controller 380 (step S413). After that, the flow returns to step S402.

When the remaining power level of the power source 386 is less than a predetermined threshold value, the flow advances from step S404 to S406. The communication system controller 350 sets the portable telephone battery level flag to L (low), which represents that the battery level is too low to continue the operation of the communication apparatus 300, and the flow advances to step S414.

When the remaining power level of the power source 386 is more than the predetermined threshold value, the flow advances to step S407. The communication system controller 350 sets the portable telephone battery level flag to H (high), which represents that the battery level is sufficient to continue the operation of the communication apparatus 300, and the flow advances to step S414.

In step S414, the communication system controller 350 determines the state of the camera transmission permission flag stored in a predetermined area of the internal memory of the communication system controller 350 and/or the memory 352. If the notification sent in step S309 has been received and the camera transmission permission flag is set, the flow advances to step S415. If the camera transmission permission flag is not set, the flow advances to step S418.

In step S415, the communication system controller 350 inquires of the system controller 50 about the contents of the identification information holding unit 58 of the image sensing apparatus 100 through the communication unit 330, antenna 332, antenna 112, and communication unit 110. If it is determined by checking the contents of the identification information holding unit 58 that communication with the image sensing apparatus 100 can be performed without any problem (YES in step S416), the flow advances to step S417. If it is determined by checking the contents of the identification information holding unit 58 that communication with the image sensing apparatus 100 cannot be performed due to a problem (NO in step S416), the flow advances to step S418.

The contents of the identification information holding unit 58 of the image sensing apparatus 100 may be checked using the identification information holding unit 356 of the communication apparatus 300.

Authentication between the image sensing apparatus 100 and the communication apparatus 300 can be done by checking the identification information.

In step S417, the communication system controller 350 transmits predetermined status notifications representing various statuses of the communication apparatus 300 to the image sensing apparatus 100 through the communication unit 330 and antenna 332, and the flow advances to step S418.

The predetermined status notifications include a radio wave intensity notification, incommunicable zone notification, and remaining battery level notification. In addition, a communication disabled status or a status which degrades the communication state is transmitted.

With this processing, even in a use situation wherein, for example, the communication apparatus 300 is put into a bag, and an image is to be sensed using the image sensing apparatus 100, the user of the image sensing system can be quickly notified of the status by notifying the image sensing apparatus 100 of the status of the communication apparatus 300. As a result, a convenient system can be provided.

After that, the communication system controller 350 displays various set statuses of the communication apparatus 300, including the remaining battery level, by an image or sound using the display means 360 (step S418), and then is set in the standby state to wait for call termination from another communication apparatus or communication base station (step S419).

In step S420, the communication system controller 350 determines whether image data is received from the image sensing apparatus 100 through the communication unit 110, antenna 112, antenna 332, and communication unit 330. If YES in step S420, the flow advances to step S421. If NO in step S420, the flow advances to step S441 in FIG. 15.

In step S421, the communication system controller 350 inquires of the system controller 50 about the contents of the identification information holding unit 58 of the image sensing apparatus 100 through the communication unit 330, antenna 332, antenna 112, and communication unit 110. If it is determined by checking the contents of the identification information holding unit 58 that communication with the image sensing apparatus 100 can be performed without any problem (YES in step S422), the flow advances to step S423.

If it is determined by checking the contents of the identification information holding unit 58 that communication with the image sensing apparatus 100 cannot be performed due to a problem (NO in step S422), the flow advances to step S441 in FIG. 15.

The contents of the identification information holding unit 58 of the image sensing apparatus 100 may be checked using the identification information holding unit 356 of the communication apparatus 300.

Authentication between the image sensing apparatus 100 and the communication apparatus 300 can be done by checking the identification information.

In step S423, the communication system controller 350 executes camera notification reception processing of receiving a notification from the image sensing apparatus 100 through the communication unit 110, antenna 112, antenna 332, and communication unit 330. The camera notification reception processing in step S423 will be described later in detail with reference to FIG. 16.

When the camera notification reception processing in step S423 is ended, the flow advances to step S441 in FIG. 15.

In step S441, the communication system controller 350 determines whether call termination from another communication apparatus or communication base station is detected through an antenna 328 and communication unit 326. If no call termination from another communication apparatus or communication base station is detected (NO in step S441), the flow advances to step S442. If call termination from another communication apparatus or communication base station is detected (YES in step S441), the flow advances to step S447.

In step S442, the communication system controller 350 determines whether the off-hook (speech communication start) switch included in the operation means 362 is set. If the off-hook switch is not set (NO in step S442), the flow returns to step S402 in FIG. 14.

When the off-hook (speech communication start) switch included in the operation means 362 is set (YES in step S442), and call origination is set by the operation means 362 (YES in step S443), the communication system controller 350 executes call origination to another communication apparatus or communication base station in accordance with the set telephone number (step S444).

While the channel to another communication apparatus or communication base station is not being connected (NO in step S445), until the on-hook (speech communication cancel) switch included in the operation means 362 is set (i.e., until YES in step S446), the communication system controller 350 returns to step S444 to repeat the series of processing operations.

When the channel to another communication apparatus or communication base station is connected (YES in step S445), the flow advances to step S468.

When call termination is detected in step S441, the flow advances to step S447, and the communication system controller 350 determines the state of the camera transmission permission flag stored in a predetermined area of the internal memory of the communication system controller 350 and/or the memory 352. If the camera transmission permission flag is set, the flow advances to step S449. If the camera transmission permission flag is not set, the flow advances to step S448.

In step S449, the communication system controller 350 inquires of the system controller 50 about the contents of the identification information holding unit 58 of the image sensing apparatus 100 through the communication unit 330, antenna 332, antenna 112, and communication unit 110. If it is determined by checking the contents of the identification information holding unit 58 that communication with the image sensing apparatus 100 can be performed without any problem (YES in step S450), the flow advances to step S451. If it is determined that communication cannot be performed due to a problem (NO in step S450), the flow advances to step S448.

The contents of the identification information holding unit 58 of the image sensing apparatus 100 may be checked using the identification information holding unit 356 of the communication apparatus 300.

Authentication between the image sensing apparatus 100 and the communication apparatus 300 can be done by checking the identification information.

In step S451, the communication system controller 350 notifies the image sensing apparatus 100 of the start of a call through the communication unit 330 and antenna 332 and simultaneously sets the call flag in step S452, and the flow advances to step S453.

The call flag is stored in a predetermined area of the internal memory of the communication system controller 350 and/or the memory 352.

When the image sensing apparatus 100 is notified of the call termination at the communication apparatus 300, the user can know the call termination at the communication apparatus 300 even during use of the image sensing apparatus 100.

In step S448, the communication system controller 350 starts notifying the user of the communication apparatus 300 of the call termination using a ringing tone, vibration, or the like by a call termination notification unit 364, and the flow advances to step S453.

The operation in steps S453 to S471 is the same as that in steps S252 to S270 in FIG. 10 of the first embodiment, and a detailed description thereof will be omitted.

Figure 16:
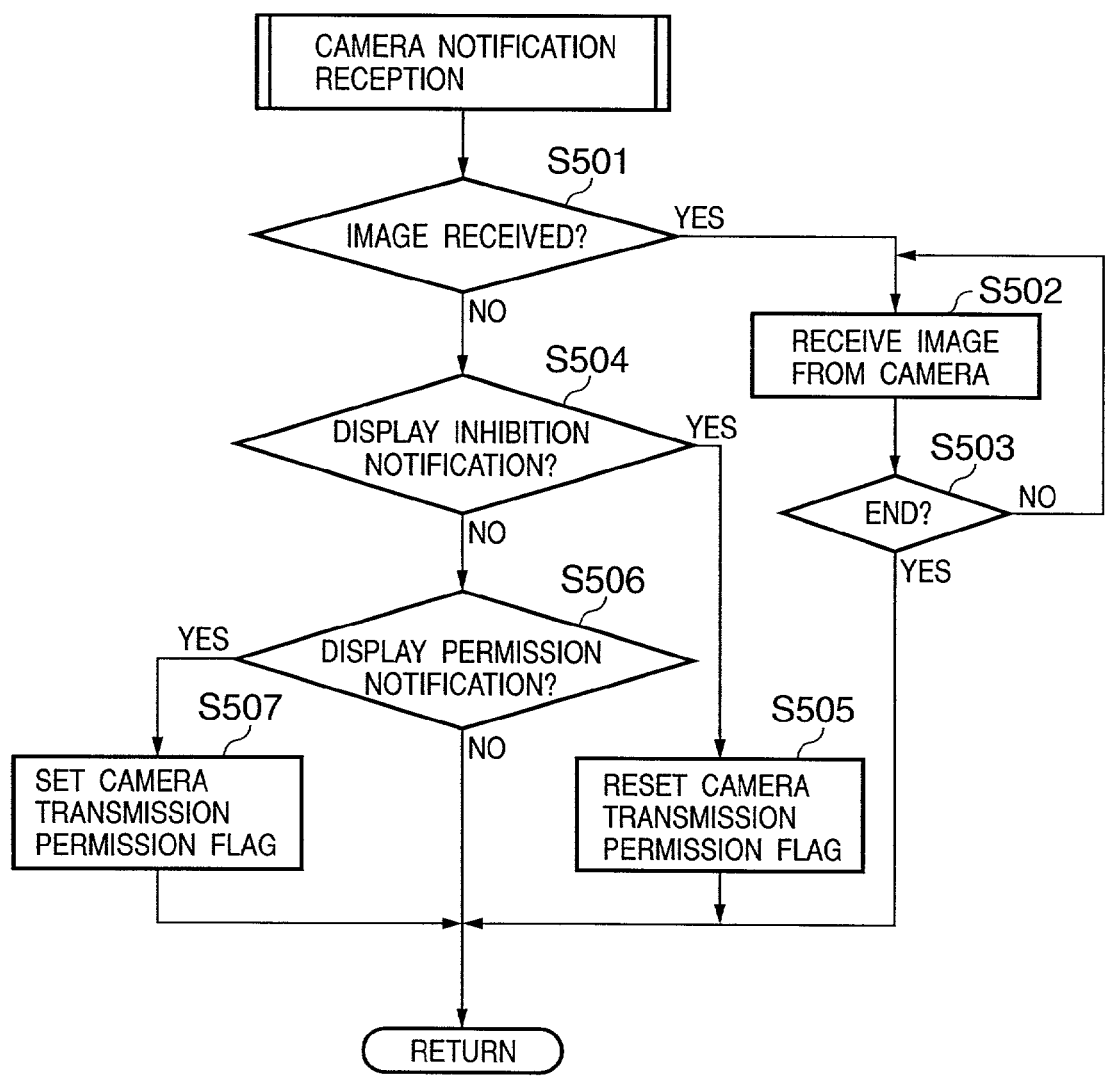
FIG. 16 is a flow chart showing the camera notification reception processing routine of the communication apparatus according to the second embodiment of the present invention.

The camera notification reception processing in step S423 of FIG. 14 will be described next in detail with reference to the flow chart shown in FIG. 16.

In step S501, the communication system controller 350 determines whether image data is received from the image sensing apparatus 100 through the communication unit 110, antenna 112, antenna 332, and communication unit 330. If image data is received (YES in step S501), the flow advances to step S502. If no image data is received (NO in step S501), the flow advances to step S504.

The communication system controller 350 sequentially stores, in a memory 320, the image data received from the image sensing apparatus 100 through the communication unit 110, antenna 112, antenna 332, and communication unit 330, sequentially reads out the stored image data, and records the image data in a recording unit 202 of a recording medium 200 through an interface 390, connector 392, connector 206, and interface 204 (step S502).

The image data stored in the memory 320 can also be displayed on the image display unit 324 through a D/A converter 322. In this case, the received image data is displayed on the image display unit 324 after predetermined interpolation or thinning and predetermined color processing are executed by a memory controller 314 in accordance with the specifications of the image display unit 324.

When image data reception is ended (YES in step S503), the camera notification reception processing routine is ended.

If no image data is received (NO in step S501), the communication system controller 350 determines in step S504 whether a display inhibition notification is received from the image sensing apparatus 100 through the communication unit 110, antenna 112, antenna 332, and communication unit 330. If the display inhibition notification is received (YES in step S504), the camera transmission permission flag is canceled (step S505), and the camera notification reception processing routine is ended.

If no display inhibition notification is received in step S504, the communication system controller 350 determines in step S506 whether a display permission notification is received from the image sensing apparatus 100 through the communication unit 110, antenna 112, antenna 332, and communication unit 330. If the display permission notification is received (YES in step S506), the camera transmission permission flag is set (step S507). If no display permission notification is received (NO in step S506), the camera notification reception processing routine is ended without any processing.

In this way, the enable/disable states of various notifications from the communication apparatus 300 to the image sensing apparatus 100, including the warning notification, status notification, call start notification, and call end notification, can be set in accordance with the display permission notification or display inhibition notification from the image sensing apparatus 100.

As described above, according to the second embodiment, the image sensing apparatus 100 notifies the communication apparatus 300 of the status of the image sensing apparatus 100, and the communication apparatus 300 determines the received status of the image sensing apparatus 100 and notifies the image sensing apparatus 100 of the status of the communication apparatus 300 in accordance with the determination result. Hence, the image sensing apparatus 100 can display the status of the communication apparatus 300 in accordance with the status of the image sensing apparatus 100.

The image sensing apparatus 100 notifies the communication apparatus 300 of the status of the image sensing preparation operation and/or image sensing operation of the image sensing apparatus 100, and the communication apparatus 300 determines the received status of the image sensing apparatus 100 and notifies the image sensing apparatus 100 of various statuses of the communication apparatus 300, including the remaining battery level, in accordance with the determination result. Hence, the image sensing apparatus 100 can display the status of the communication apparatus 300 in accordance with the status of the image sensing apparatus 100.

The image sensing apparatus 100 notifies the communication apparatus 300 of the status of the image sensing preparation operation and/or image sensing operation of the image sensing apparatus 100, and the communication apparatus 300 determines the received status of the image sensing apparatus 100 and notifies the image sensing apparatus 100 of the call termination status of the communication apparatus 300 in accordance with the determination result. Hence, the call termination at the communication apparatus 300 can be displayed on the image sensing apparatus 100.

Figure 17A:
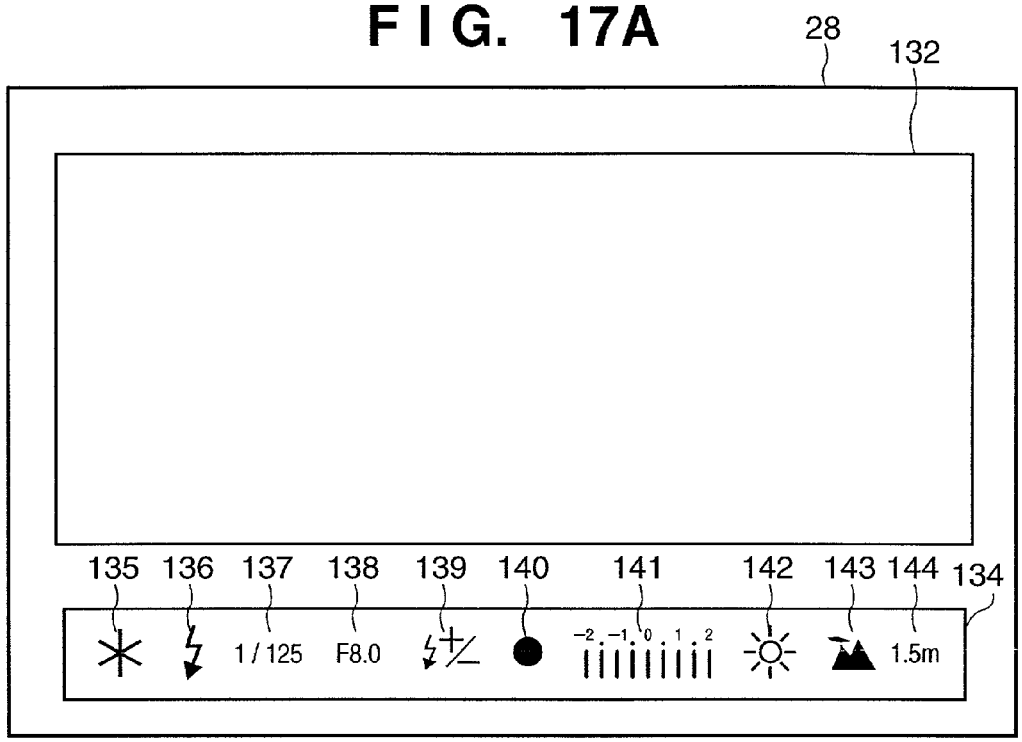
FIGS. 17A and 17B are views showing display examples on an image display unit of the image sensing apparatus according to the present invention.
Figure 17B:
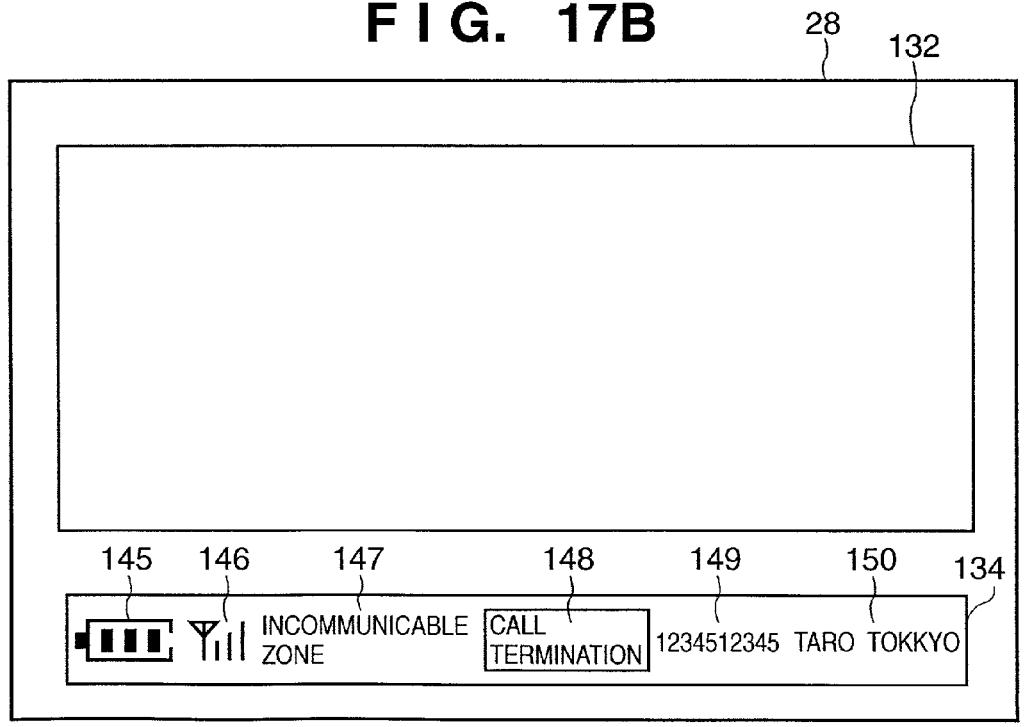

FIGS. 17A and 17B are views showing display examples on the image display unit 28 of the image sensing apparatus 100 according to the present invention.

FIG. 17A shows an example of the display window in the image sensing preparation state and/or image sensing state (i.e., step S132 in FIG. 5 to step S166 in FIG. 6, steps S334 to S342 in FIG. 12, and steps S361 to S368 in FIG. 13) on the image display unit 28 of the image sensing apparatus 100 according to the embodiments of the present invention.

Referring to FIG. 17A, reference numeral 132 denotes an image sensing finder image area; and 134, display area for an image sensing mode and various image sensing parameters of the image sensing apparatus 100.

Reference numeral 135 denotes AE (Auto Exposure) lock; 136, flash image sensing; 137, a shutter speed (TV value); 138, an f number (AV value); 139, flash adjustment; 140, AF (Auto Focus); 141, exposure compensation and flash correction; 142, AWB (Auto White Balance) and manual WB; 143, an image sensing mode; and 144, distance measurement information.

FIG. 17B shows an example of the display window in the status display state of the communication apparatus 300 (i.e., steps S105 in FIG. 4 to step S132 in FIG. 5, from step S166 in FIG. 6, step S309 in FIG. 11 to step S334 in FIG. 12, steps S342 to S345 in FIG. 12, and from step S368 in FIG. 13) on the image display unit 28 of the image sensing apparatus 100 according to the embodiments of the present invention.

Referring to FIG. 17B, reference numeral 145 denotes a battery level of the communication apparatus 300; 146, a radio wave intensity of the communication apparatus 300; 147, an incommunicable state of the communication apparatus 300; 148, call termination at the communication apparatus 300; 149, a telephone number or address of the caller of the communication apparatus 300; and 150, a caller name of the communication apparatus 300.

In the above description of the first and second embodiments, the image sensing apparatus 100 is notified of various statuses of the communication apparatus 300, and various statuses of the communication apparatus 300 are displayed on the image sensing apparatus 100 in accordance with the operation of the release switches SW1 and/or SW2 of the image sensing apparatus 100. However, the notification and display may be done in accordance with various operation modes of the image sensing apparatus 100.

For example, the image sensing apparatus 100 may be notified of various statuses of the communication apparatus 300, and various statuses of the communication apparatus 300 may be displayed on the image sensing apparatus 100 in accordance with the power ON/OFF state, image sensing mode or reproduction mode, image sensing state or instantaneous image reproduction state, or the level of power saving mode.

Alternatively, the image sensing apparatus 100 may be notified of various statuses of the communication apparatus 300, and various statuses of the communication apparatus 300 may be displayed on the image sensing apparatus 100 in accordance with the operation or status transition such as the image sensing mode, photometry mode, single shot/sequential image sensing/self image sensing mode, auto focus mode, distance measurement point selection, the number of recorded images, the number of recordable images, shutter speed setting, f number setting, exposure compensation, flash illumination, remaining battery level detection, error state detection, or communication.

In addition, the frequency of warning notification and/or status notification from the communication apparatus 300 to the image sensing apparatus 100 may be changed in accordance with the operation of the release switches SW1 and/or SW2 of the image sensing apparatus 100.

For example, when the image sensing apparatus 100 is in the image sensing preparation state and/or image sensing state, the warning notification and/or status notification from the communication apparatus 300 to the image sensing apparatus 100 may be sent at low frequency. If the image sensing apparatus 100 is not in the image sensing preparation state and/or image sensing state, the warning notification and/or status notification from the communication apparatus 300 to the image sensing apparatus 100 may be often sent.

When the image sensing apparatus 100 must execute image processing, load on CPU for various calculations becomes large. The above arrangement prevents the load on the CPU from becoming too large.

When the warning notification and/or status notification from the communication apparatus 300 to the image sensing apparatus 100 is performed after mutual authentication using the identification information holding unit 58 of the image sensing apparatus 100 and the identification information holding unit 356 of the communication apparatus 300, any notification error to another device or notification reception error from another device can be prevented.

As described in the first and second embodiments, not only the remaining battery level of the communication apparatus 300 but also the radio wave intensity or incommunicable zone state, for example, of the communication apparatus 300 can be sent by the status notification from the communication apparatus 300 to the image sensing apparatus 100.

Not only the remaining battery level of the communication apparatus 300 but also the radio wave intensity or incommunicable zone state, for example, of the communication apparatus 300 can be sent by the warning notification from the communication apparatus 300 to the image sensing apparatus 100.

In the above description, the communication apparatus 300 is configured as connectable to the detachable recording medium 200. However, the image sensing apparatus 100 may have a configuration to connect to the detachable recording medium 200.

Further, it is also possible to configure both of the image sensing apparatus 100 and communication apparatus 300 to be connectable to the detachable recording medium 200.

The recording medium 200 may be not only a memory card such as a PCMCIA card, CF (Compact Flash) card, or MMC (Multi-Media Card), or SD (Secure Digital) card, or a hard disk, but also a micro DAT, a magnetooptical disk, an optical disk such as a CD-R or CD-WR, or a phase change optical disk such as a DVD.

The recording medium 200 may be a composite medium of a memory card and hard disk. Also, the composite medium may be partially detachable.

In the description of the first and second embodiments, the recording medium 200 is separated from the communication apparatus 300 and can be arbitrarily connected. However, the recording medium 200 may be kept fixed in the communication apparatus 300.

Further, the communication apparatus 300 may be configured so as to connect a single or an arbitrary number of recording media 200.

<Third Embodiment>

<Description of Operation of Image Sensing Apparatus 100>

Next, the third embodiment of the present invention will be described.

Figure 18:
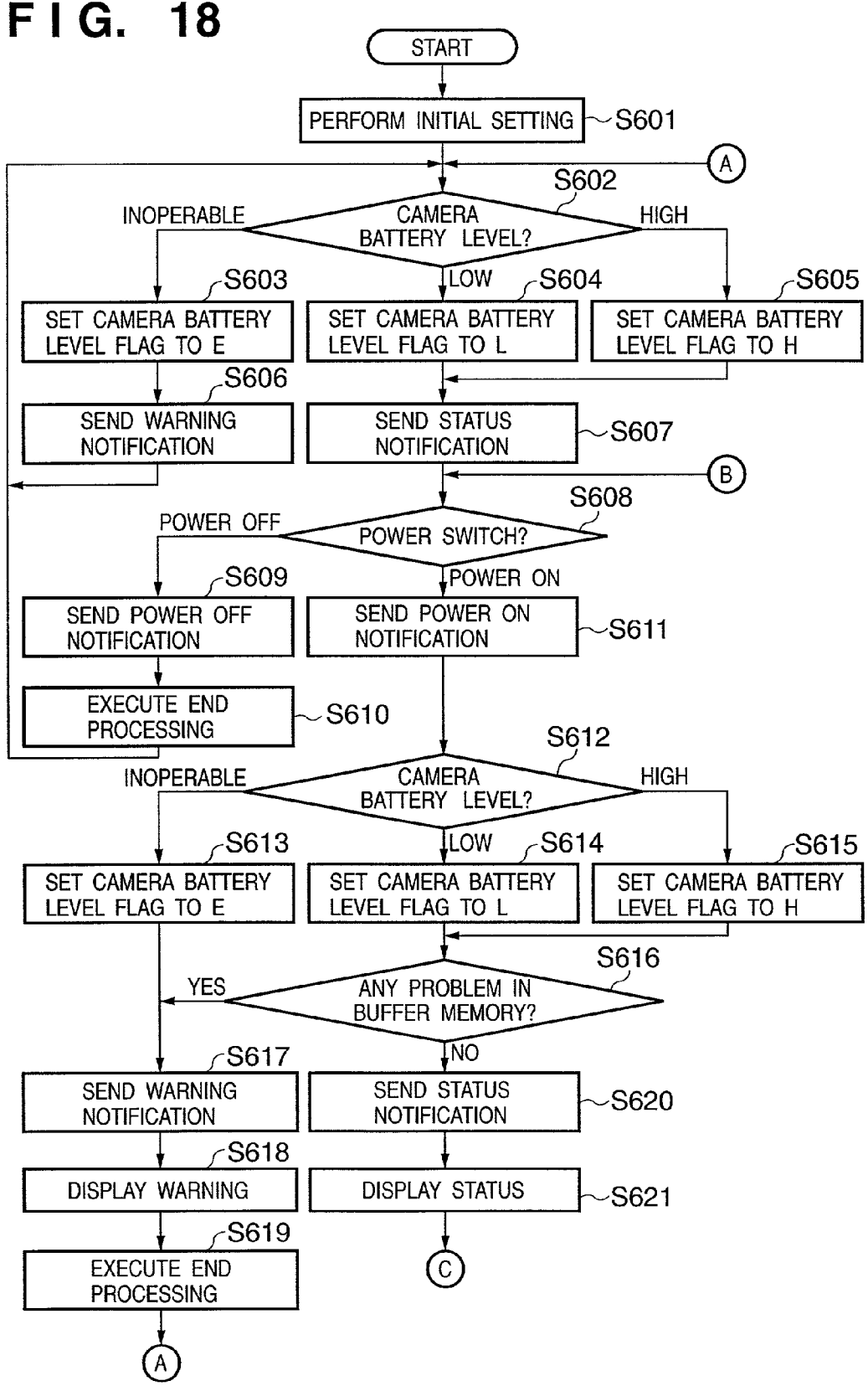
FIG. 18 is a flow chart showing the main routine of an image sensing apparatus according to the third embodiment of the present invention.
Figure 19:
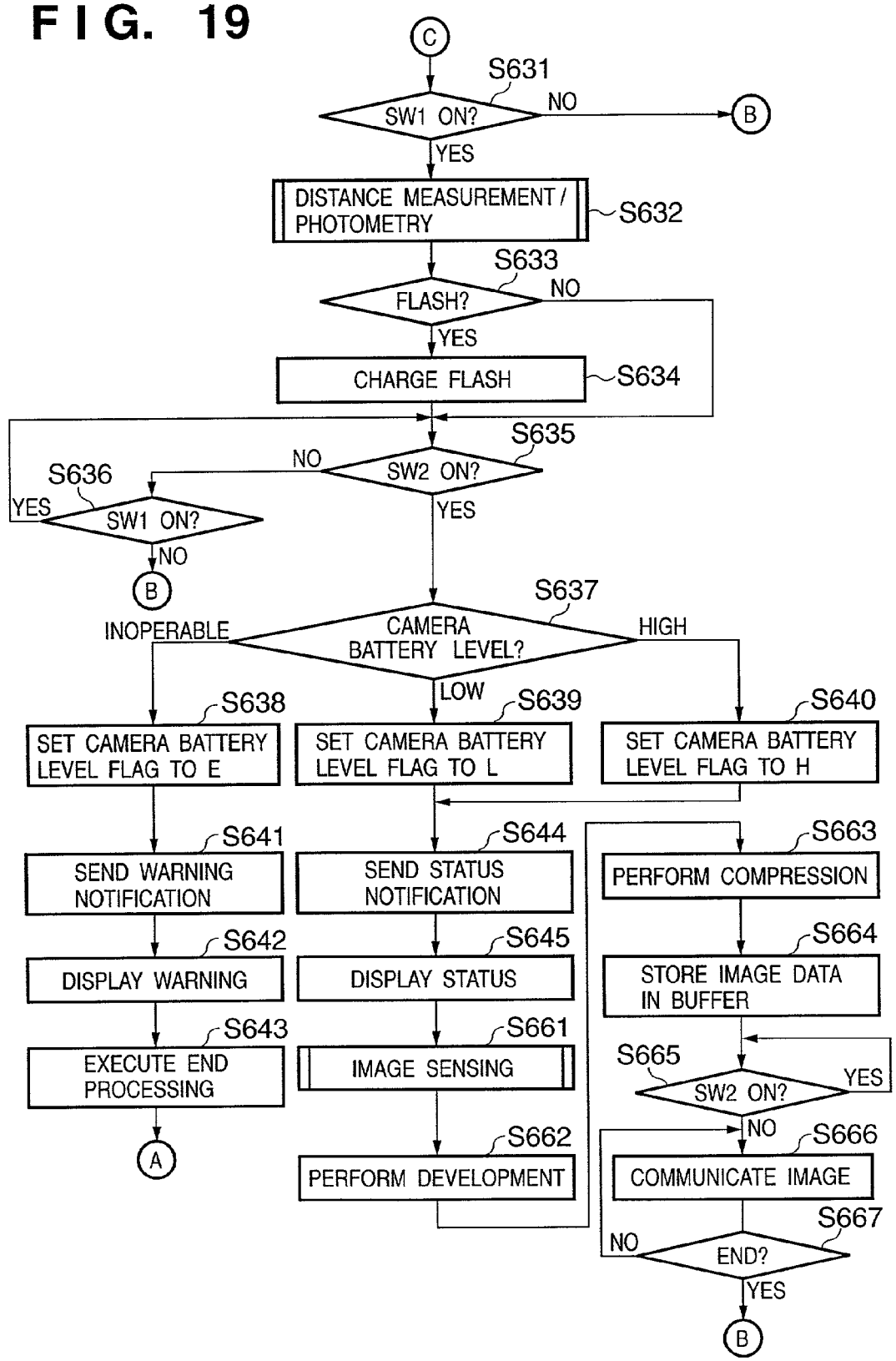
FIG. 19 is a flow chart showing the main routine of the image sensing apparatus according to the third embodiment of the present invention.

FIGS. 18 and 19 are flow charts showing the main routine of the image sensing apparatus 100 according to the third embodiment. The operation of the image sensing apparatus 100 will be described with reference to FIGS. 18 and 19.

Referring to FIG. 18, in step S601, when the image sensing apparatus is powered on by, e.g., exchanging the battery, a system controller 50 initializes flags, control variables, and the like and executes initialization processing of the respective parts of the image sensing apparatus 100. After initialization, the system controller 50 determines whether the remaining power level or operating situation, by the power controller 80, of the power source 86 formed from a battery or the like has any problem for continuous operation of the image sensing apparatus 100 (step S602).

If the remaining power level of the power source 86 has a problem for continuous operation of the image sensing apparatus 100, the flow advances to step S603. The system controller 50 sets a camera battery level flag to E (empty), which represents that the battery level has a problem for continuous operation of the image sensing apparatus 100, and the flow advances to step S606. In step S606, the system controller 50 sends a predetermined warning to the communication apparatus 300 through the communication unit 110 and antenna 112, and the flow returns to step S602.

When the remaining power level of the power source 86 is less than a predetermined threshold value, the flow advances from step S602 to S604. The system controller 50 sets the camera battery level flag to L (low), which represents that the battery level is too low to continue the operation of the image sensing apparatus 100, and the flow advances to step S607.

When the remaining power level of the power source 86 is more than the predetermined threshold value, the flow advances to step S605. The system controller 50 sets the camera battery level flag to H (high), which represents that the battery level is sufficient to continue the operation of the image sensing apparatus 100, and the flow advances to step S607. In step S607, the system controller 50 sends predetermined status notifications representing various set statuses of the image sensing apparatus 100 to the communication apparatus 300 through the communication unit 110 and antenna 112, and the flow advances to step S608.

The predetermined status notifications sent in step S607 include notifications of single shot/sequential image sensing, a self timer, an image compression ratio, the number of recording pixels, the number of sensed images, the number of recordable images, a shutter speed, an f number, exposure compensation, flash illumination, pink-eye effect mitigation, macro image sensing, a buzzer-set state, a timer battery level, a battery level, an error state, operation of communication I/F, and date and time. With the status notifications, the state of the camera battery level flag set in step S604 or S605 is also sent.

In this way, the notification of the operating status of the image sensing function, such as the image sensing mode, photometry mode, single shot/sequential image sensing/self image sensing mode, auto focus mode, distance measurement point selection, the number of recorded images, the number of recordable images, shutter speed setting, f number setting, exposure compensation, flash illumination, remaining battery level detection, error state detection, or communication, can be sent.

In step S608, the system controller 50 determines the state of the main switch 72. If the main switch 72 is set in the power OFF state, the system controller 50 notifies the communication apparatus 300 through the communication unit 110 and antenna 112 that the image sensing apparatus 100 is set in the power OFF state (step S609). Simultaneously, the system controller 50 executes predetermined end processing, e.g., changes the display of each display means to the end state, and if the image sensing apparatus has a protection means such as the barrier 102, closes it to protect the image sensing portion, records necessary parameters, set values, and set modes, including flags and control variables, in a nonvolatile memory 56, and stops unnecessary power supply to the respective parts of the image sensing apparatus 100, including an image display unit 28, by the power controller 80 (step S610). After that, the flow returns to step S602.

If the main switch 72 is set in the power ON state in step S608, the system controller 50 notifies the communication apparatus 300 through the communication unit 110 and antenna 112 that the image sensing apparatus 100 is set in the power ON state (step S611), and the flow advances to step S612.

The system controller 50 determines whether the remaining power level or operating situation of the power source 86 formed from a battery or the like has any problem for continuous operation of the image sensing apparatus 100 usings the power controller 80 (step S612).

If the remaining power level of the power source 86 has a problem for continuous operation of the image sensing apparatus 100, the flow advances to step S613. The system controller 50 sets the camera battery level flag to E, which represents that the battery level has a problem for continuous operation of the image sensing apparatus 100, and the flow advances to step S617.

When the remaining power level of the power source 86 is less than a predetermined threshold value, the flow advances to step S614. The system controller 50 sets the camera battery level flag to L, which represents that the battery level is too low to continue the operation of the image sensing apparatus 100, and the flow advances to step S616.

When the remaining power level of the power source 86 is more than the predetermined threshold value, the flow advances to step S615. The system controller 50 sets the camera battery level flag to H, which represents that the battery level is sufficient to continue the operation of the image sensing apparatus 100, and the flow advances to step S616.

In step S616, the system controller 50 determines whether the operating status of the memory 30 serving as a buffer for obtained image data has any problem for operation of the image sensing apparatus 100 and, more particularly, image data storage/read operation for the memory 30. If NO in step S616, the flow advances to step S620. Otherwise, the flow advances to step S617.

In step S617, the system controller 50 sends a predetermined warning notification to the communication apparatus 300 through the communication unit 110 and antenna 112, and in step S618, displays a predetermined warning by an image or sound using the notification unit 54 and/or image display unit 28. The system controller 50 executes predetermined end processing, e.g., changes the display of each display means to the end state, and if the image sensing apparatus has a protection means such as the barrier 102, closes it to protect the image sensing portion, records necessary parameters, set values, and set modes, including flags and control variables, in the nonvolatile memory 56, and stops unnecessary power supply to the respective parts of the image sensing apparatus 100, including the image display unit 28, by the power controller 80 (step S619). After that, the flow returns to step S602.

If the memory 30 has no problem (NO in step S616), the system controller 50 sends a predetermined status notification representing various set statuses of the image sensing apparatus 100 to the communication apparatus 300 through the communication unit 110 and antenna 112 (step S620), and also displays various set statuses of the image sensing apparatus 100, including the remaining battery level and the status of the memory 30, by an image or sound using the notification unit 54 and/or image display unit 28 (step S621), and the flow advances to step S631 in FIG. 19.

The predetermined status notifications sent in step S620 include notifications of single shot/sequential image sensing, a self timer, an image compression ratio, the number of recording pixels, the number of sensed images, the number of recordable images, a shutter speed, an f number, exposure compensation, flash illumination, pink-eye effect mitigation, macro image sensing, a buzzer-set state, a timer battery level, a battery level, an error state, operation of communication I/F, and date and time. With the status notifications, the state of the camera battery level flag set in step S614 or S615 is also sent.

In this way, the notification of the operating status of the image sensing function, such as the image sensing mode, photometry mode, single shot/sequential image sensing/self image sensing mode, auto focus mode, distance measurement point selection, the number of recorded images, the number of recordable images, shutter speed setting, f number setting, exposure compensation, flash illumination, remaining battery level detection, error state detection, or communication, can be sent.

In step S631 of FIG. 19, the system controller 50 determines whether a shutter switch SW1 is pressed. If NO in step S631, the flow returns to step S608 in FIG. 18.

If the shutter switch SW1 is pressed (YES in step S631), the flow advances to step S632. The system controller 50 executes distance measurement processing to focus the image sensing lens 10 on an object to be sensed, executes photometry processing to determine the f number and shutter speed, and executes white balance processing to adjust the color temperature. In the photometry processing, flash illumination is also set, as needed.

In the distance measurement/photometry processing in step S632, whether AE control and/or AWB control can be executed is determined on the basis of the image sensing start flag and/or AE lock flag and/or white balance mode set flag, which are stored in the internal memory of the system controller 50 or a memory 52, and the respective processing operations are done in accordance with the determination results. The distance measurement/photometry processing in step S632 is the same as in the first embodiment described with reference to FIG. 7, and a detailed description thereof will be omitted.

When the distance measurement/photometry processing in step S632 is ended, the system controller 50 determines the state of the flash flag stored in the internal memory of the system controller 50 or the memory 52 (step S633). If YES in step S633, a flash 48 is charged (step S634), and the flow advances to step S635. If NO in step S633, the flow advances to step S635 without any processing.

When a shutter switch SW2 is not pressed (NO in step S635), and the shutter switch SW1 is released (NO in step S636), the system controller 50 returns to step S608.

If the shutter switch SW2 is pressed (YES in step S635), the system controller 50 determines in step S637 whether the remaining power level or operating situation, by the power controller 80, of the power source 86 formed from a battery or the like has any problem for operation of the image sensing apparatus 100.

If the remaining power level of the power source 86 has a problem for continuous operation of the image sensing apparatus 100, the flow advances to step S638. The system controller 50 sets the camera battery level flag to E, which represents that the battery level has a problem for continuous operation of the image sensing apparatus 100, and the flow advances to step S641.

In step S641, the system controller 50 sends a predetermined warning notification to the communication apparatus 300 through the communication unit 110 and antenna 112, and in step S642, displays a predetermined warning by an image or sound using the notification unit 54 and/or image display unit 28. The system controller 50 executes predetermined end processing, e.g., changes the display of each display means to the end state, and if the image sensing apparatus has a protection means such as the barrier 102, closes it to protect the image sensing portion, records necessary parameters, set values, and set modes, including flags and control variables, in the nonvolatile memory 56, and stops unnecessary power supply to the respective parts of the image sensing apparatus 100, including the image display unit 28, by the power controller 80 (step S643). After that, the flow returns to step S602 in FIG. 18.

When the remaining power level of the power source 86 is less than a predetermined threshold value, the flow advances from step S637 to S639. The system controller 50 sets the camera battery level flag to L, which represents that the battery level is too low to continue the operation of the image sensing apparatus 100, and the flow advances to step S644.

When the remaining power level of the power source 86 is more than the predetermined threshold value, the system controller 50 sets the camera battery level flag to H, which represents that the battery level is sufficient to continue the operation of the image sensing apparatus 100, in step S640, and the flow advances to step S644.

In step S644, the system controller 50 sends a predetermined status notification representing various set statuses of the image sensing apparatus 100 to the communication apparatus 300 through the communication unit 110 and antenna 112, and in step S645, displays various set statuses of the image sensing apparatus 100, including the remaining battery level and the status of the memory 30, by an image or sound using the notification unit 54 and/or image display unit 28, and the flow advances to step S661.

The predetermined status notifications include notifications of single shot/sequential image sensing, a self timer, an image compression ratio, the number of recording pixels, the number of sensed images, the number of recordable images, a shutter speed, an f number, exposure compensation, flash illumination, pink-eye effect mitigation, macro image sensing, a buzzer-set state, a timer battery level, a battery level, an error state, operation of communication I/F, and date and time. With the status notifications, the state of the camera battery level flag set in step S639 or S640 is also sent.

In this way, the notification of the operating status of the image sensing function, such as the image sensing mode, photometry mode, single shot/sequential image sensing/self image sensing mode, auto focus mode, distance measurement point selection, the number of recorded images, the number of recordable images, shutter speed setting, f number setting, exposure compensation, flash illumination, remaining battery level detection, error state detection, or communication, can be sent.

In step S661, the system controller 50 executes image sensing processing comprising exposure processing of writing obtained image data in the memory 30 through an image sensing device 14, A/D converter 16, image processor 20, and memory controller 22 or from the A/D converter only through the memory controller 22. The image sensing processing in step S661 is the same as in the first embodiment described with reference to FIG. 8, and a detailed description thereof will be omitted.

The system controller 50 executes development processing of reading out the image data from the memory 30 and processing the image data in various ways using the memory controller 22 and, the image processor 20, as needed (step S662), executes compression processing of compressing the image in accordance with the set mode using the compression/expansion circuit 32, as needed (step S663), and stores the image data that has undergone predetermined processing in the memory 30 (step S664).

In step S665, the system controller 50 determines the state of the shutter switch SW2. If the shutter switch SW2 is released, the system controller 50 reads out the image data which is subjected to predetermined processing and stored in the memory 30, and communicates the image to the communication apparatus 300 through the communication unit 110 and antenna 112 (step S666). When the image communication is ended (YES in step S667), the flow returns to step S608 in FIG. 18.

<Description of Operation of Communication Apparatus 300>

The operation of the communication apparatus 300 according to the third embodiment will be described next.

Figure 20:
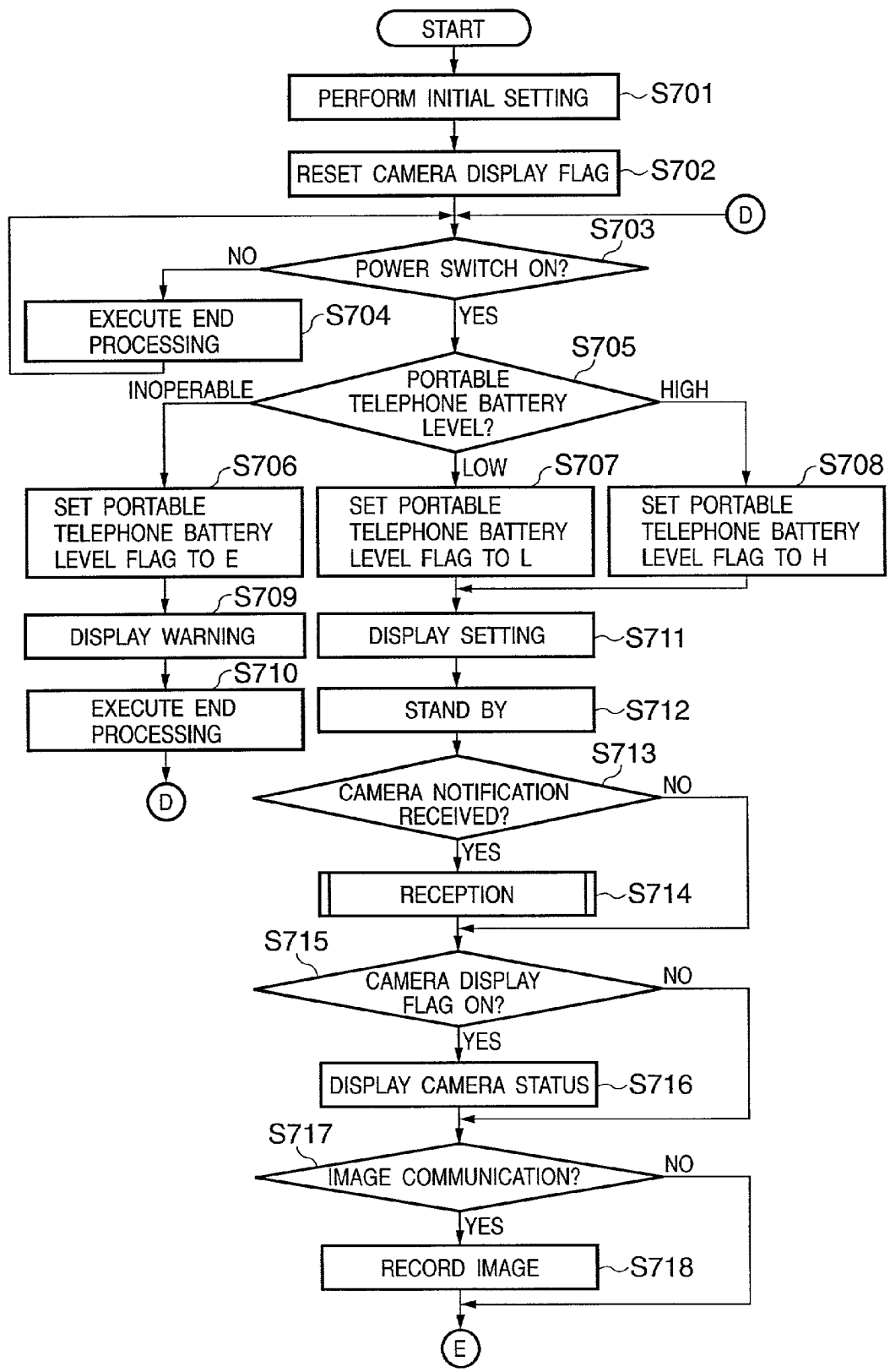
FIG. 20 is a flow chart showing the main routine of a communication apparatus according to the third embodiment of the present invention.
Figure 21:
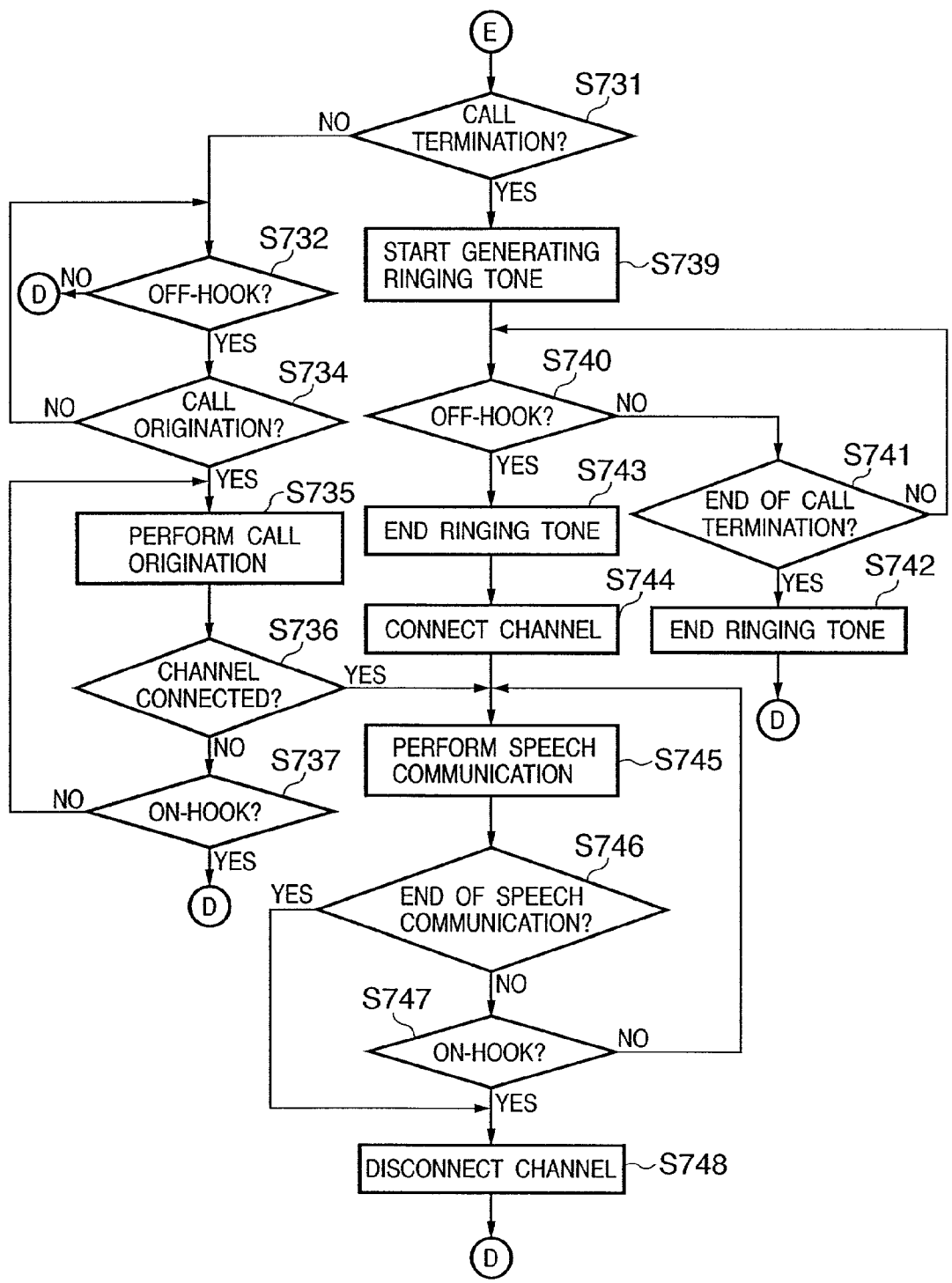
FIG. 21 is a flow chart showing the main routine of the communication apparatus according to the third embodiment of the present invention.

FIGS. 20 and 21 are flow charts showing the main routine of the communication apparatus 300 according to the third embodiment. The operation of the communication apparatus 300 will be described with reference to FIGS. 20 and 21.

Referring to FIG. 20, in step S701, when the communication apparatus is powered on by, e.g., exchanging the battery, the communication system controller 350 initializes flags, control variables, and the like and, in step S702, cancels the camera display flag. The set state of the camera display flag is stored in the internal memory of the communication system controller 350 and/or the memory 352.

The communication system controller 350 determines the set state of a power switch included in the operation means 362. If the power switch is set in the power OFF state (NO in step S703), the communication system controller 350 executes predetermined end processing, e.g., changes the display of each display means to the end state, records necessary parameters, set values, and set modes, including flags and control variables, in the nonvolatile memory 354, and stops unnecessary power supply to the respective parts of the communication apparatus 300, including the image display unit 324, by a power controller 380 (step S704). After that, the flow returns to step S703.

If the power switch included in the operation means 362 is set in the power ON state (YES in step S703), the flow advances to step S705. The communication system controller 350 determines whether the remaining power level or operating situation, by the power controller 380, of a power source 386 formed from a battery or the like has any problem for operation of the communication apparatus 300.

If the remaining power level or operating situation of the power source 386 has a problem for operation of the communication apparatus 300, the communication system controller 350 sets a portable telephone battery level flag to E (empty), which represents that the battery level has a problem for continuous operation of the communication apparatus 300 (step S706), and the flow advances to step S709.

In step S709, the communication system controller 350 performs predetermined warning by an image or sound using the notification unit 360, and then executes predetermined end processing, e.g., changes the display of each display means to the end state, records necessary parameters, set values, and set modes, including flags and control variables, in the nonvolatile memory 354, and stops unnecessary power supply to the respective parts of the communication apparatus 300, including the image display unit 324, by the power controller 380 (step S710). After that, the flow returns to step S703.

When the remaining power level of the power source 386 is less than a predetermined threshold value, the flow advances from step S705, to S707. The communication system controller 350 sets the portable telephone battery level flag to L (low), which represents that the battery level is too low to continue the operation of the communication apparatus 300, and the flow advances to step S711.

When the remaining power level of the power source 386 is more than the predetermined threshold value, the flow advances to step S708. The communication system controller 350 sets the portable telephone battery level flag to H (high), which represents that the battery level is sufficient to continue the operation of the communication apparatus 300, and the flow advances to step S711.

In step S711, the communication system controller 350 displays various set statuses of the communication apparatus 300, including the remaining battery level, by an image or sound using the notification unit 360, and then is set in the standby state to wait for call termination from another communication apparatus or communication base station (step S712).

In step S713, the communication system controller 350 determines whether a notification such as a command or data is received from the image sensing apparatus 100 through the communication unit 110, antenna 112, antenna 332, and communication unit 330. If no notification such as a command or data is received from the image sensing apparatus 100 (NO in step S713), the flow advances to step S715. If a notification such as a command or data is received from the image sensing apparatus 100 (YES in step S713), the communication system controller 350 executes reception processing including predetermined processing according to the notification contents from the image sensing apparatus 100 (step S714), and the flow advances to step S715.

The reception processing in step S714 will be described later in detail with reference to FIG. 22.

In step S715, the communication system controller 350 determines the set state of the camera display flag stored in the internal memory of the communication system controller 350 and/or the memory 320 and/or the memory 352. If the camera display flag is not set (NO in step S715), the flow advances to step S717. If the camera display flag is set (YES in step S715), the communication system controller 350 reads out, from the memory 320 and/or the memory 352, various kinds of information representing the statuses of the image sensing apparatus 100 and displays the information by an image and/or sound using the notification unit 360 (step S716), and the flow advances to step S717.

Various kinds of information representing the statuses of the image sensing apparatus 100 include pieces of information of single shot/sequential image sensing, a self timer, an image compression ratio, the number of recording pixels, the number of sensed images, the number of recordable images, a shutter speed, an f number, exposure compensation, flash illumination, pink-eye effect mitigation, macro image sensing, a buzzer-set state, a timer battery level, a battery level, an error state, operation of communication I/F, and date and time.

In this way, the notification of the operating status of the image sensing function, such as the image sensing mode, photometry mode, single shot/sequential image sensing/self image sensing mode, auto focus mode, distance measurement point selection, the number of recorded images, the number of recordable images, shutter speed setting, f number setting, exposure compensation, flash illumination, remaining battery level detection, error state detection, or communication, can be sent.

In addition to the above information, various kinds of information representing the statuses of the image sensing apparatus 100 may be displayed using the image display unit 324.

In step S717, the communication system controller 350 determines whether image communication from the image sensing apparatus 100 is performed through the communication unit 110, antenna 112, antenna 332, and communication unit 330. If no image communication from the image sensing apparatus 100 is performed (NO in step S717), the flow advances to step S731 in FIG. 21. If image communication from the image sensing apparatus 100 is performed (YES in step S717), the communication system controller 350 sequentially stores, in the memory 320, the image data received from the image sensing apparatus 100 through the communication unit 110, antenna 112, antenna 332, and communication unit 330, sequentially reads out the stored image data, and records the image data in the recording unit 202 of a recording medium 200 through the interface 390, connector 392, connector 206, and interface 204 (step S718).

The image data stored in the memory 320 can also be displayed on the image display unit 324 through a D/A converter 322. In this case, the received image data is displayed on the image display unit 324 after predetermined interpolation or thinning and predetermined color processing are executed by the memory controller 314 in accordance with the specifications of the image display unit 324. When the series of recording operations are ended, the flow advances to step S731 in FIG. 21.

In step S731, the communication system controller 350 determines whether call termination from another communication apparatus or communication base station is detected through an antenna 328 and communication unit 326. If no call termination from another communication apparatus or communication base station is detected (NO in step S731), the flow advances to step S732. If call termination from another communication apparatus or communication base station is detected (YES in step S731), the flow advances to step S739.

In step S732, the communication system controller 350 determines whether the off-hook (speech communication start) switch included in the operation means 362 is set. If the off-hook switch is not set (NO in step S732), the flow returns to step S703 in FIG. 20.

When the off-hook (speech communication start) switch included in the operation means 362 is set (YES in step S732), and call origination is set by the operation means 362 (YES in step S734), the communication system controller 350 executes call origination to another communication apparatus or communication base station in accordance with the set telephone number (step S735).

While the channel to another communication apparatus or communication base station is not being connected (NO in step S736), until the on-hook (speech communication cancel) switch included in the operation means 362 is set (i.e., until YES in step S737), the communication system controller 350 returns to step S735 to repeat the series of processing operations.

When the channel to another communication apparatus or communication base station is connected (YES in step S736), the flow advances to step S745.

When call termination is detected in step S731, the communication system controller 350 starts notifying the user of the communication apparatus 300 of call termination using a ringing tone, vibration, or the like by a call termination notification unit 364.

If the off-hook (speech communication start) switch included in the operation means 362 is not set (NO in step S740), the communication system controller 350 determines whether the call termination from another communication apparatus or communication base station is ended (step S741). If YES in step S741, the communication system controller 350 ends call termination notification to the user of the communication apparatus 300 using a ringing tone, vibration, or the like by the call termination notification unit 364 (step S742), and the flow returns to step S703 in FIG. 20. If the call termination is not ended (NO in step S741), the flow returns to step S740.

If the off-hook (speech communication start) switch included in the operation means 362 is set (YES in step S740), the communication system controller 350 ends call termination notification to the user of the communication apparatus 300 using a ringing tone, vibration, or the like by the call termination notification unit 364 (step S743), connects a channel to another communication apparatus directly or through the communication base station, which has made a call to the communication apparatus 300, through the antenna 328 and communication unit 326 (step S744), and performs speech communication operation with another communication apparatus directly or through the communication base station (step S745).

In the speech communication operation, sound data received from another communication apparatus directly or through the communication base station through the antenna 328 and communication unit 326 is stored in the memory 320. The sound data read out from the memory 320 is subjected to predetermined decoding processing or sound processing by the memory controller 314. The sound data can be converted into a sound signal and output from the speaker 318 through the D/A converter 316.

In addition, generated sound is subjected to predetermined sound processing or encoding by the memory controller 314 through the microphone 310 and A/D converter 312 and stored in the memory 320. The sound data read out from the memory 320 can be transmitted to another communication apparatus directly or through the communication base station through the communication unit 326 and antenna 328.

When speech communication with another communication apparatus directly or through the communication base station is ended (YES in step S746), or even if the speech communication is not ended (NO in step S746), when the on-hook (speech communication cancel) switch included in the operation means 362 is set (YES in step S747), the communication system controller 350 disconnects the channel to another communication apparatus directly or through the communication base station, with which the speech communication is executed (step S748), and the flow returns to step S703 in FIG. 20.

The reception processing in step S714 of FIG. 20 will be described next with reference to the flow chart shown in FIG. 22.

In step S801, the communication system controller 350 inquires of the system controller 50 about the contents of the identification information holding unit 58 of the image sensing apparatus 100 through the communication unit 330, antenna 332, antenna 112, and communication unit 110. If it is determined by checking the contents of the identification information holding unit 58 that communication with the image sensing apparatus 100 can be performed without any problem (YES in step S801), the flow advances to step S803. The contents of the identification information holding unit 58 of the image sensing apparatus 100 may be checked using the information in the identification information holding unit 356 of the communication apparatus 300.

Authentication between the image sensing apparatus 100 and the communication apparatus 300 can be done by checking the identification information.

If it is determined by checking the contents of the identification information holding unit 58 that communication with the image sensing apparatus 100 cannot be performed due to a problem (NO in step S801), the communication system controller 350 cancels the camera display flag stored in a predetermined area of the internal memory of the communication system controller 350 and/or the memory 352 (step S802) and ends the reception processing routine without executing the reception processing for the notification from the image sensing apparatus 100.

In step S803, the communication system controller 350 determines whether the contents of the notification received from the image sensing apparatus 100 through the communication unit 110, antenna 112, antenna 332, and communication unit 330 represent a warning notification from the image sensing apparatus 100. If the contents of the received notification represent a warning notification from the image sensing apparatus 100 (YES in step S803), the communication system controller 350 sets and stores the warning display contents in a predetermined area of the internal memory of the communication system controller 350 and/or the memory 352 (step S804), sets and stores the camera display flag (step S805), and ends the reception processing routine S714.

In this way, the warning notification about the image sensing apparatus 100, which is transmitted from the image sensing apparatus 100, can be displayed by the notification unit 360 of the communication apparatus 300.

If it is determined that the contents of the received notification represent not a warning notification from the image sensing apparatus 100 (NO in step S803) but a status notification from the image sensing apparatus 100 (YES in step S806), the communication system controller 350 determines the contents of the status notification from the image sensing apparatus 100 (step S807).

If the contents of the status notification from the image sensing apparatus 100 are determined as other status notification, display according to the notification contents is set (step S808), and the reception processing routine S714 is ended.

Other status notifications include notifications of single shot/sequential image sensing, a self timer, an image compression ratio, the number of recording pixels, the number of sensed images, the number of recordable images, a shutter speed, an f number, exposure compensation, flash illumination, pink-eye effect mitigation, macro image sensing, a buzzer-set state, a timer battery level, an error state, operation of communication I/F, and date and time.

In this way, the notification of the operating status of the image sensing function, such as the image sensing mode, photometry mode, single shot/sequential image sensing/self image sensing mode, auto focus mode, distance measurement point selection, the number of recorded images, the number of recordable images, shutter speed setting, f number setting, exposure compensation, flash illumination, remaining battery level detection, error state detection, or communication, can be sent.

If the contents of the status notification from the image sensing apparatus 100 are determined in step S807 as a status notification related to the remaining battery level, in accordance with the received remaining battery level (step S809), the communication system controller 350 sets the camera battery level indication to H, which represents that the battery level is sufficient to continue the operation of the image sensing apparatus 100 (step S810), or to L, which represents that the battery level is too low to continue the operation of the image sensing apparatus 100 (step S811), and the reception processing routine is ended.

In this way, the notification unit 360 of the communication apparatus 300 can be set to display the remaining battery level status of the image sensing apparatus 100, which is sent from the image sensing apparatus 100.

If the contents of the received notification are determined not as a status notification from the image sensing apparatus 100 (NO in step S806) but a power ON notification from the image sensing apparatus 100 (YES in step S812), the communication system controller 350 cancels the camera display flag stored in a predetermined area of the internal memory of the communication system controller 350 and/or the memory 352 (step S813), and the reception processing routine is ended.

If the contents of the received notification are determined not as a power ON notification from the image sensing apparatus 100 (NO in step S812) but a power OFF notification from the image sensing apparatus 100 (YES in step S814), the communication system controller 350 sets the camera display flag stored in a predetermined area of the internal memory of the communication system controller 350 and/or the memory 352 (step S815), and the reception processing routine is ended.

As described above, the remaining battery level status of the image sensing apparatus 100, which is set in step S810 or S811, is not displayed by the notification unit 360 of the communication apparatus 300 when a notification representing that the image sensing apparatus 100 is powered on is received, or can be displayed by the notification unit 360 of the communication apparatus 300 when a notification representing that the image sensing apparatus 100 is powered off is received.

With this arrangement, when the image sensing apparatus 100 is in the power OFF state and is not used, the remaining battery level status of the image sensing apparatus 100 can be displayed on the communication apparatus 300.

As described above, according to the third embodiment, the image sensing apparatus 100 notifies the communication apparatus 300 of the status of the image sensing apparatus 100, and the communication apparatus 300 determines the received status of the image sensing apparatus 100. The status of the image sensing apparatus 100 can be displayed on the communication apparatus 300 in accordance with the determination result.

The image sensing apparatus 100 notifies the communication apparatus 300 of various statuses of the image sensing apparatus 100, including the power ON/OFF status and remaining battery level status, and the communication apparatus 300 determines the received power ON/OFF status of the image sensing apparatus 100. Various statuses of the image sensing apparatus 100, including the remaining battery level status, can be displayed on the communication apparatus 300 in accordance with the determination result.

When it is determined that the image sensing apparatus 100 is in the power OFF state, various statuses of the image sensing apparatus 100, including the remaining battery level status, can be displayed on the communication apparatus 300.

<Fourth Embodiment>

The fourth embodiment of the present invention will be described next.

<Description of Operation of Image Sensing Apparatus 100>

Figure 23:
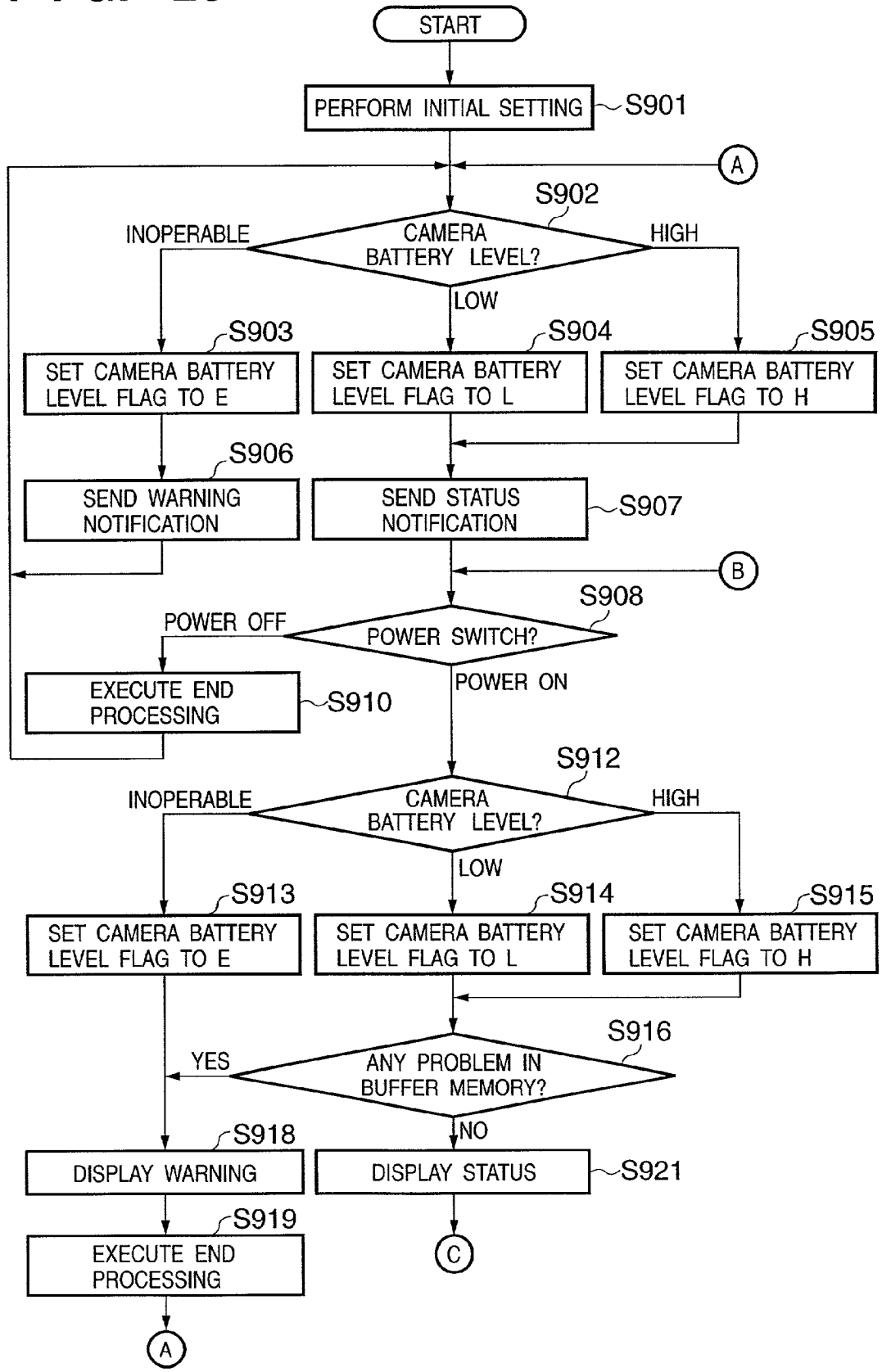
FIG. 23 is a flow chart showing the main routine of an image sensing apparatus according to the fourth embodiment of the present invention.
Figure 24:
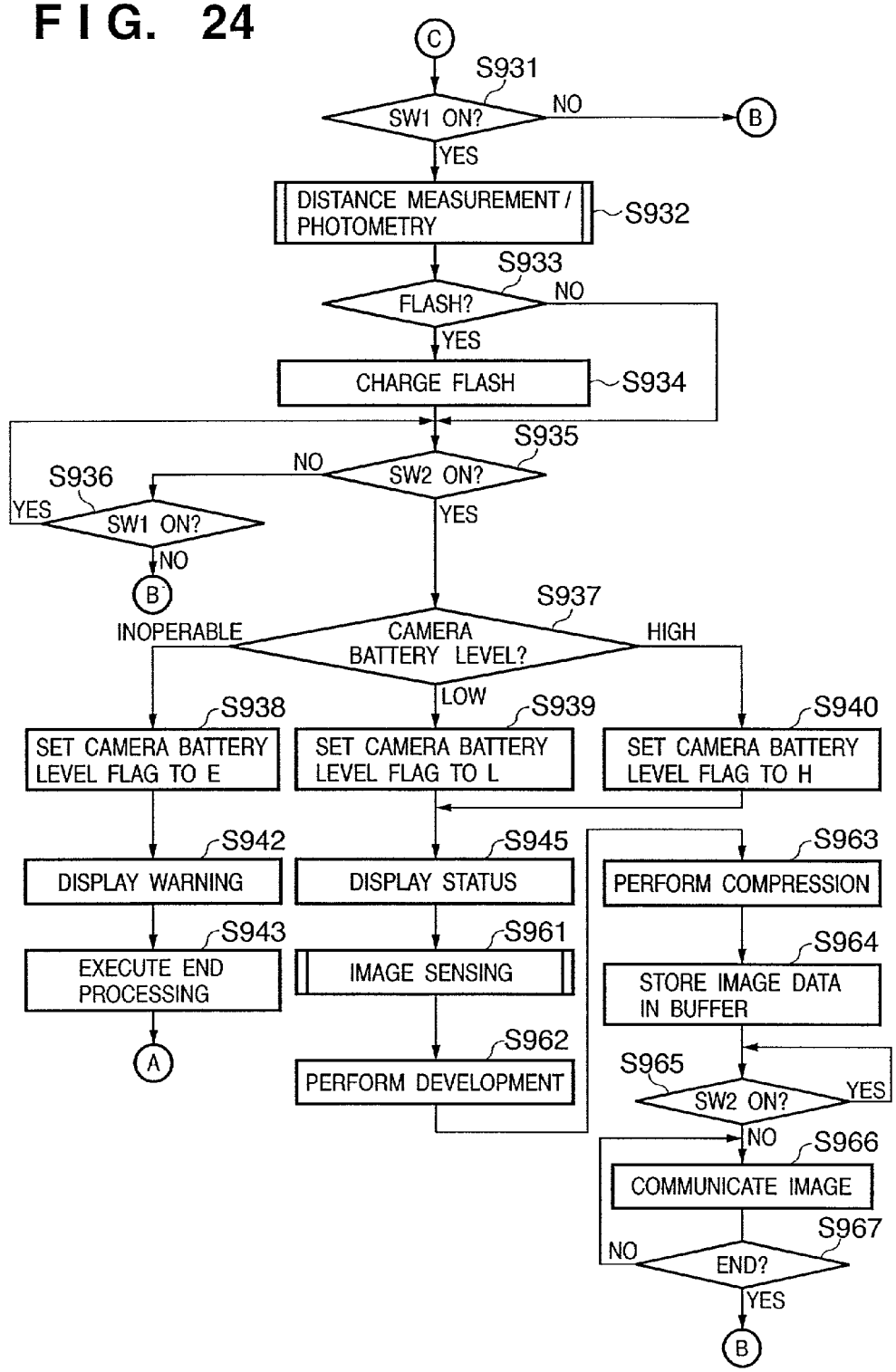
FIG. 24 is a flow chart showing the main routine of the image sensing apparatus according to the fourth embodiment of the present invention.

The operation of an image sensing apparatus 100 according to the fourth embodiment will be described with reference to FIGS. 23 and 24. FIGS. 23 and 24 are flow charts showing the main routine of the image sensing apparatus 100 according to the fourth embodiment.

Processing in steps S901 to S908 of FIG. 23 is the same as that in steps S601 to S608 of FIG. 18 of the third embodiment, and a detailed description thereof will be omitted.

When it is determined in step S908 that a main switch 72 is set in the power OFF state, the flow advances to step S910 to execute predetermined end processing, e.g., change the display of each display means to the end state, and if the lens unit 10 has a barrier serving as a protection means, close it to protect the image sensing portion, record necessary parameters, set values, and set modes, including flags and control variables, in the nonvolatile memory 56, and stop unnecessary power supply to the respective parts of the image sensing apparatus 100, including the image display unit 28, by the power controller 80, and the flow returns to step S902. In the fourth embodiment, the end processing is executed without notifying a communication apparatus 300 that the image sensing apparatus 100 is set in the power OFF state, unlike the third embodiment.

When the main switch 72 is set in the power ON state (YES in step S908), the system controller 50 determines whether the remaining power level or operating situation, by the power controller 80, of the power source 86 formed from a battery or the like has any problem for continuous operation of the image sensing apparatus 100 (step S912). In the fourth embodiment, the next processing is executed without notifying the communication apparatus 300 that the image sensing apparatus 100 is set in the power ON state, unlike the third embodiment.

If the remaining power level of the power source 86 has a problem for continuous operation of the image sensing apparatus 100, the flow advances to step S913. The system controller 50 sets a camera battery level flag to E, which represents that the battery level has a problem for continuous operation of the image sensing apparatus 100, and the flow advances to step S918.

When the remaining power level of the power source 86 is less than a predetermined threshold value, the flow advances to step S914. The system controller 50 sets the camera battery level flag to L, which represents that the battery level is too low to continue the operation of the image sensing apparatus 100, and the flow advances to step S916.

When the remaining power level of the power source 86 is more than the predetermined threshold value, the flow advances to step S915. The system controller 50 sets the camera battery level flag to H, which represents that the battery level is sufficient to continue the operation of the image sensing apparatus 100, and the flow advances to step S916.

In step S916, the system controller 50 determines whether the operating status of the memory 30 serving as a buffer for obtained image data has any problem for operation of the image sensing apparatus 100 and, more particularly, image data storage/read operation for the memory 30. If NO in step S916, the flow advances to step S921. Otherwise, the flow advances to step S918.

In step S918, the system controller 50 displays a predetermined warning by an image or sound using the notification unit 54 and/or image display unit 28. The system controller 50 executes predetermined end processing, e.g., changes the display of each display means to the end state, and if the image sensing apparatus has a protection means such as the barrier 102, closes it to protect the image sensing portion, records necessary parameters, set values, and set modes, including flags and control variables, in the nonvolatile memory 56, and stops unnecessary power supply to the respective parts of the image sensing apparatus 100, including the image display unit 28, by the power controller 80 (step S919). After that, the flow returns to step S902. In the fourth embodiment, the image sensing apparatus 100 executes the next processing without notifying the communication apparatus 300 that the memory has a problem, unlike the third embodiment.

If the memory 30 has no problem, (NO in step S916), the system controller 50 displays various set statuses of the image sensing apparatus 100, including the remaining battery level and the status of the memory 30, by an image or sound using the notification unit 54 and/or image display unit 28 and/or image display unit 28 (step S921), and the flow advances to step S931 in FIG. 24. In the fourth embodiment, the image sensing apparatus 100 executes the next processing without notifying the communication apparatus 300 of various set statuses, unlike the third embodiment.

Processing in steps S931 to S940 of FIG. 24 is the same as that in steps S631 to S640 of the third embodiment described with reference to FIG. 19, and a detailed description thereof will be omitted.

In step S938, the system controller 50 sets the camera battery level flag to E, which represents that the battery level has a problem for continuous operation of the image sensing apparatus 100. After that, in step S942, the system controller 50 displays a predetermined warning by an image or sound using the notification unit 54 and/or image display unit 28. The system controller 50 executes predetermined end processing, e.g., changes the display of each display means to the end state, and if the image sensing apparatus has a protection means such as the barrier 102, closes it to protect the image sensing portion, records necessary parameters, set values, and set modes, including flags and control variables, in the nonvolatile memory 56, and stops unnecessary power supply to the respective parts of the image sensing apparatus 100, including the image display unit 28, by the power controller 80 (step S943), and the flow returns to step S902 in FIG. 23. In the fourth embodiment, the image sensing apparatus 100 executes the next processing without sending a warning notification to the communication apparatus 300, unlike the third embodiment.

The system controller 50 sets the camera battery level flag to L, which represents that the battery level is too low to continue the operation of the image sensing apparatus 100 in step S939, or to H, which represents that the battery level is sufficient to continue the operation of the image sensing apparatus 100 in step S940. After that, in step S945, the system controller 50 displays various set statuses of the image sensing apparatus 100, including the remaining battery level and the status of the memory 30, by an image or sound using the notification unit 54 and/or image display unit 28, and the flow advances to step S961. In the fourth embodiment, the image sensing apparatus 100 executes the next processing without notifying the communication apparatus 300 of various set statuses, unlike the third embodiment.

Processing from step S961 is the same as that from step S661 in FIG. 19 described in the third embodiment, and a detailed description thereof will be omitted.

For distance measurement/photometry processing in step S932, the operation shown in FIG. 7 is performed. For image sensing processing in step S961, the operation shown in FIG. 8 is performed.

<Description of Operation of Communication Apparatus 300>

The operation of the communication apparatus 300 according to the fourth embodiment will be described next with reference to FIGS. 25 to 27.

Figure 25:
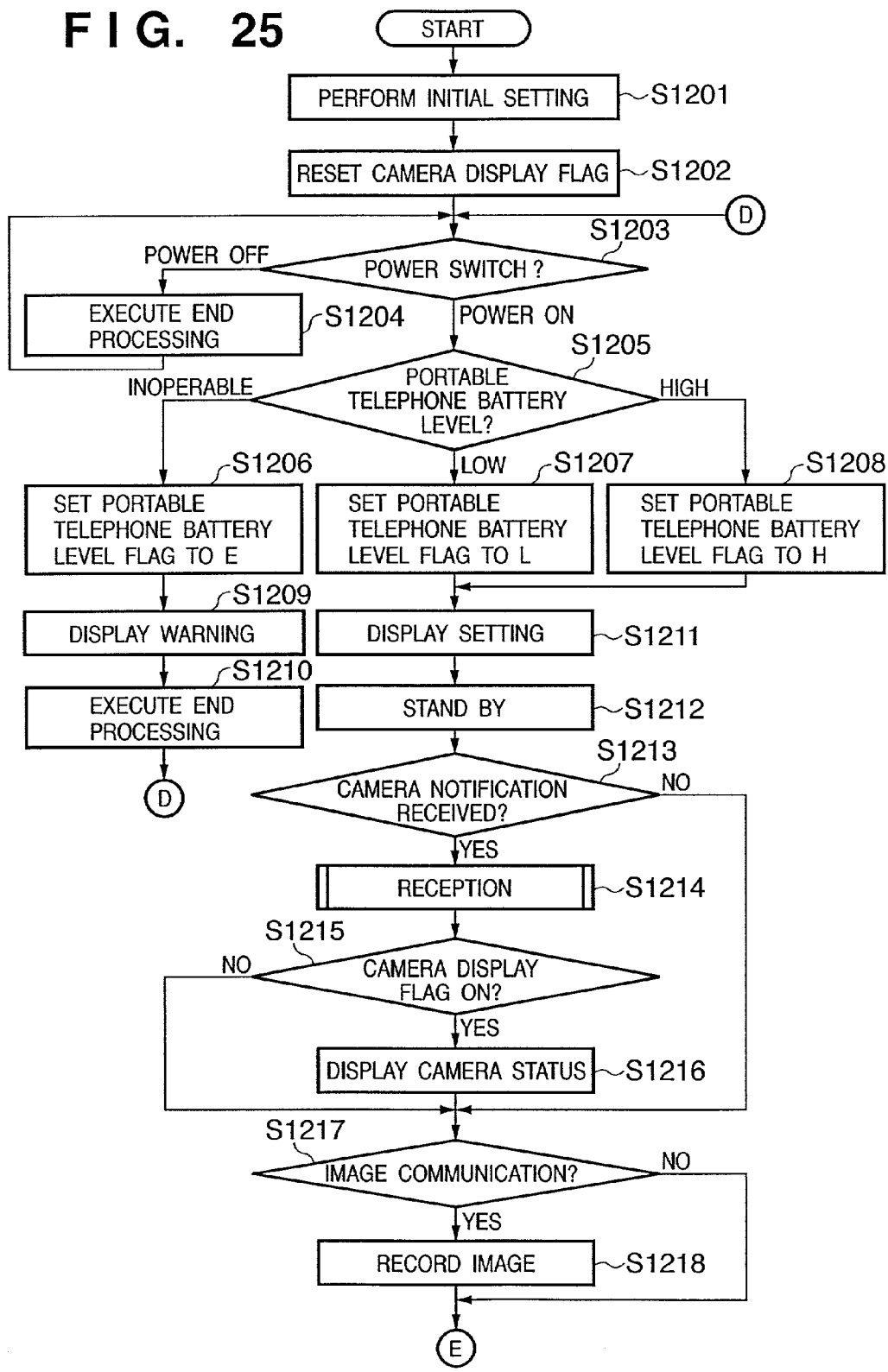
FIG. 25 is a flow chart showing the main routine of a communication apparatus according to the fourth embodiment of the present invention.
Figure 26:
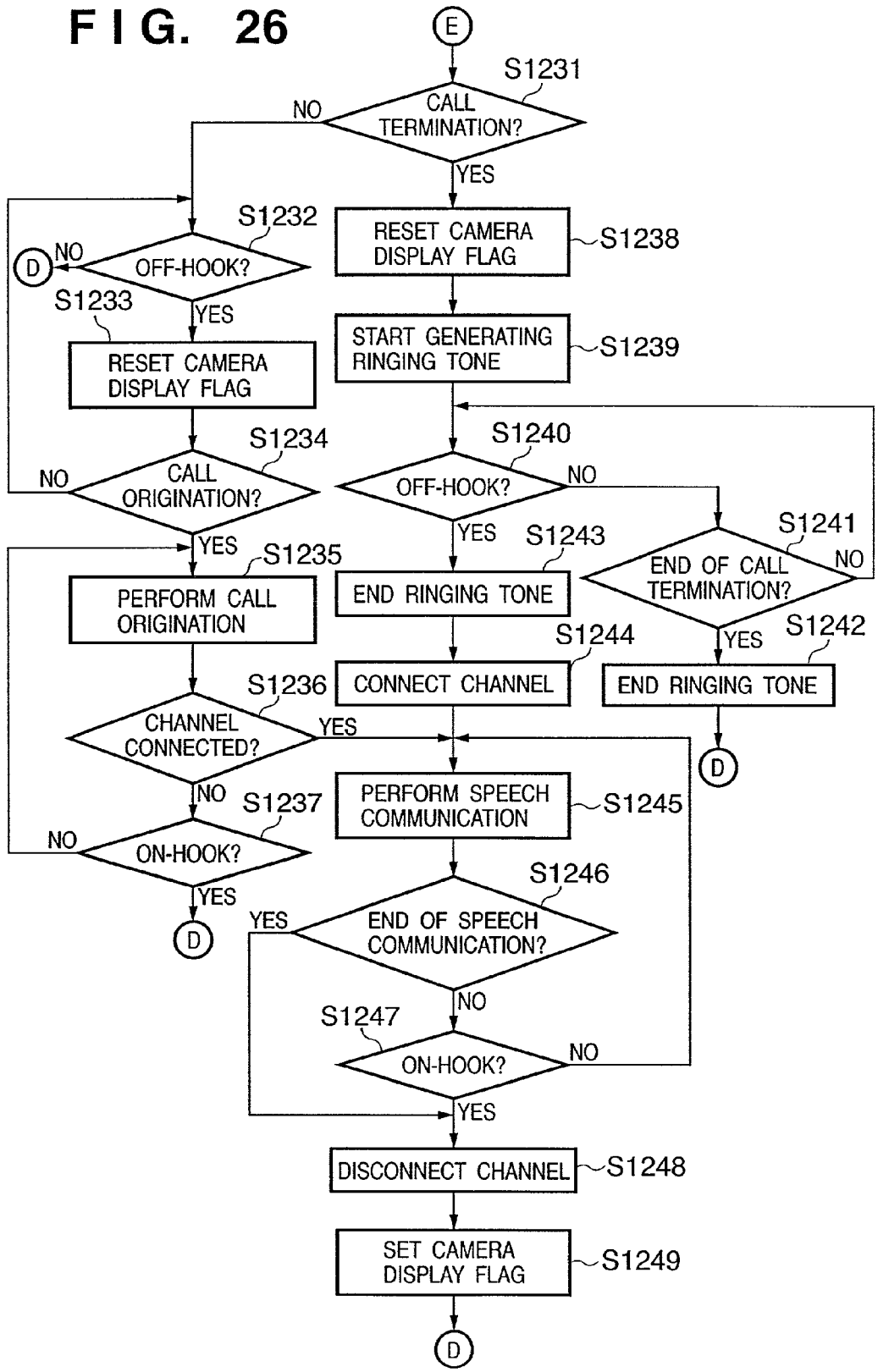
FIG. 26 is a flow chart showing the main routine of the communication apparatus according to the fourth embodiment of the present invention.
Figure 27:
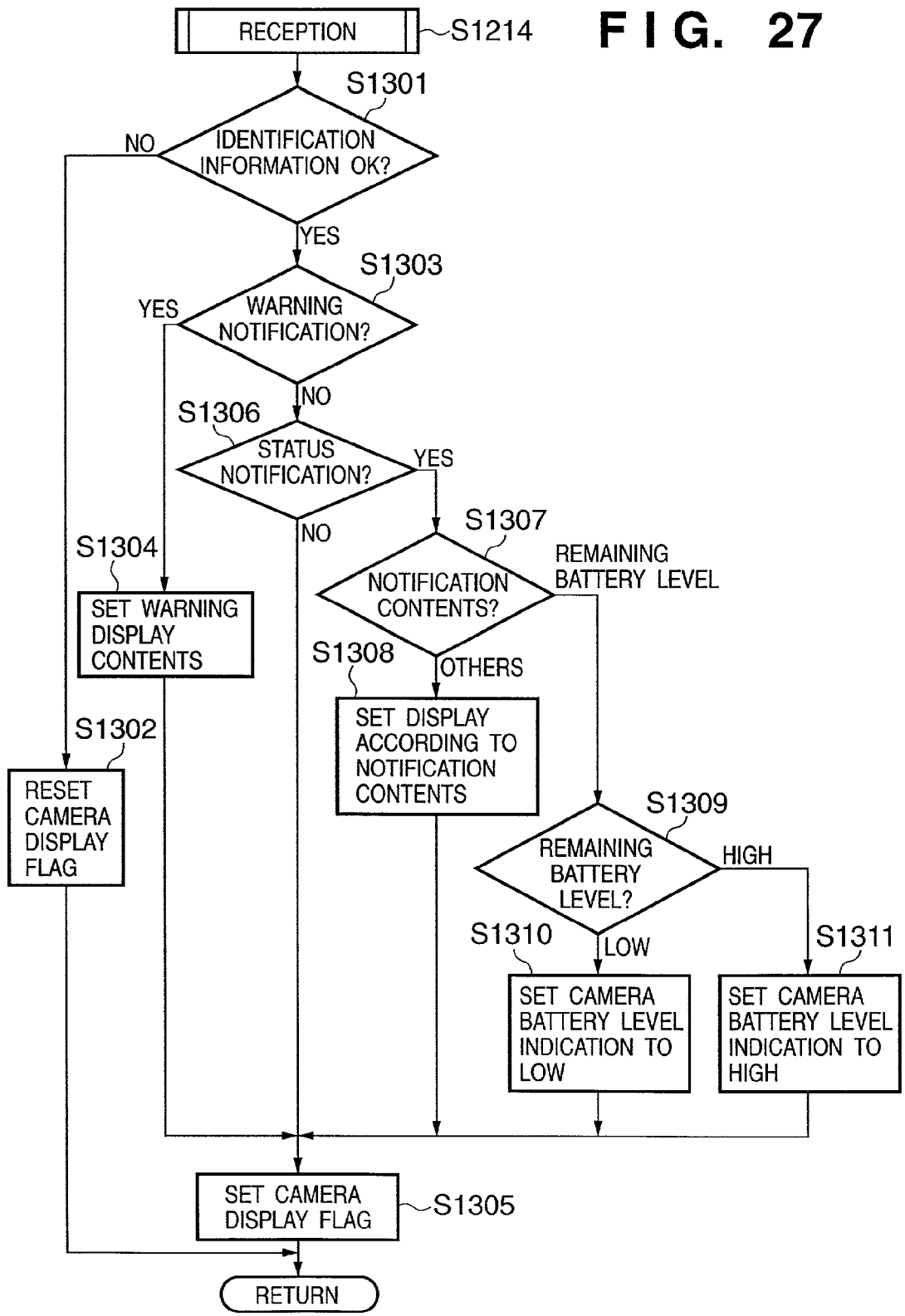
FIG. 27 is a flow chart showing the reception processing routine of the communication apparatus according to the fourth embodiment of the present invention.

FIGS. 25 and 26 are flow charts showing the main routine of the communication apparatus 300 according to the third embodiment.

The operation in steps S1201 to S1218 of FIG. 25 is the same as that in steps S701 to S718 described in the third embodiment with reference to FIG. 20, and a detailed description thereof will be omitted.

In step S1231 of FIG. 26, a communication system controller 350 determines whether call termination from another communication apparatus or communication base station is detected through an antenna 328 and communication unit 326. If no call termination from another communication apparatus or communication base station is detected (NO in step S1231), the flow advances to step S1232. If call termination from another communication apparatus or communication base station is detected (YES in step S1231), the flow advances to step S1238.

In step S1232, the communication system controller 350 determines whether the off-hook (speech communication start) switch included in an operation means 362 is set. If the off-hook switch is not set (NO in step S1232), the flow returns to step S1203 in FIG. 25.

When the off-hook (speech communication start) switch included in the operation means 362 is set (YES in step S1232), the communication system controller 350 resets the camera display flag stored in a predetermined area of the internal memory of the communication system controller 350 and/or a memory 352 in step S1233. During speech communication operation by the communication apparatus 300, display related to the communication apparatus 300 is performed while temporarily stopping display related to the image sensing apparatus 100.

The flow advances to step S1234 to determine whether call origination is set by the operation means 362. If call origination is not set (NO in step S1234), the flow returns to step S1232. If call origination is set by the operation means 362 (YES in step S1234), the communication system controller 350 executes call origination to another communication apparatus or communication base station in accordance with the set telephone number (step S1235).

While the channel to another communication apparatus or communication base station is not being connected (NO in step S1236), until the on-hook (speech communication cancel) switch included in the operation means 362 is set (i.e., until YES in step S1237), the communication system controller 350 returns to step S1235 to repeat the series of processing operations.

When the channel to another communication apparatus or communication base station is connected (YES in step S1236), the flow advances to step S1245.

When call termination is detected in step S1231, the communication system controller 350 resets the camera display flag stored in a predetermined area of the internal memory of the communication system controller 350 and/or the memory 352 (step S1238) and starts notifying the user of the communication apparatus 300 of call termination using a ringing tone, vibration, or the like by a call termination notification unit 364 (step S1239).

In this way, during speech communication operation by the communication apparatus 300, display related to the communication apparatus 300 is performed while temporarily stopping display related to the image sensing apparatus 100.

If the off-hook (speech communication start) switch included in the operation means 362 is not set (NO in step S1240), the communication system controller 350 determines whether the call termination from another communication apparatus or communication base station is ended (step S1241). If YES in step S1241, the communication system controller 350 ends call termination notification to the user of the communication apparatus 300 using a ringing tone, vibration, or the like by the call termination notification unit 364 (step S1242), and the flow returns to step S1203 in FIG. 25. If the call termination is not ended (NO in step S1241), the flow returns to step S1240.

If the off-hook (speech communication start) switch included in the operation means 362 is set (YES in step S1240), the communication system controller 350 ends call termination notification to the user of the communication apparatus 300 using a ringing tone, vibration, or the like by the call termination notification unit 364 (step S1243), connects a channel to another communication apparatus directly or through the communication base station, which has made a call to the communication apparatus 300, through the antenna 328 and communication unit 326 (step S1244), and performs speech communication operation with another communication apparatus directly or through the communication base station (step S1245).

In the speech communication operation, sound data received from another communication apparatus directly or through the communication base station through the antenna 328 and communication unit 326 is stored in the memory 320. The sound data read out from the memory 320 is subjected to predetermined decoding processing or sound processing by the memory controller 314. The sound data can be converted into a sound signal and output from the speaker 318 through the D/A converter 316.

In addition, generated sound is subjected to predetermined sound processing or encoding by the memory controller 314 through a microphone 310 and A/D converter 312 and stored in the memory 320. The sound data read out from the memory 320 can be transmitted to another communication apparatus directly or through the communication base station through the communication unit 326 and antenna 328.

When speech communication with another communication apparatus directly or through the communication base station is ended (YES in step S1246), or even if the speech communication is not ended (NO in step S1246), when the on-hook (speech communication cancel) switch included in the operation means 362 is set (YES in step S1247), the communication system controller 350 disconnects the channel to another communication apparatus directly or through the communication base station, with which the speech communication is executed (step S1248), and sets the camera display flag stored in a predetermined area of the internal memory of the communication system controller 350 and/or the memory 352 (step S1249), and the flow returns to step S1203 in FIG. 25.

When the speech communication operation by the communication apparatus 300 is ended, display related to the image sensing apparatus 100 can be performed again.

The display related to the image sensing apparatus 100 may be performed in place of the display related to the communication apparatus 300. Alternatively, both the display related to the image sensing apparatus 100 and the display related to the communication apparatus 300 may be simultaneously performed.

The reception processing in step S1214 of FIG. 25 will be described next with reference to the flow chart shown in FIG. 27.

In step S1301, the communication system controller 350 inquires of the system controller 50 about the contents of the identification information holding unit 58 of the image sensing apparatus 100 through the communication unit 330, antenna 332, antenna 112, and communication unit 110. If it is determined by checking the contents of the identification information holding unit 58 that communication with the image sensing apparatus 100 can be performed without any problem (YES in step S1301), the flow advances to step S1303. The contents of the identification information holding unit 58 of the image sensing apparatus 100 may be checked using the information in an identification information holding unit 356 of the communication apparatus 300.

Authentication between the image sensing apparatus 100 and the communication apparatus 300 can be done by checking the identification information.

If it is determined by checking the contents of the identification information holding unit 58 that communication with the image sensing apparatus 100 cannot be performed due to a problem (NO in step S1301), the communication system controller 350 cancels the camera display flag stored in a predetermined area of the internal memory of the communication system controller 350 and/or the memory 352 (step S1302) and ends the reception processing routine without executing the reception processing for the notification from the image sensing apparatus 100.

In step S1303, the communication system controller 350 determines whether the contents of the notification received from the image sensing apparatus 100 through the communication unit 110, antenna 112, antenna 332, and communication unit 330 represent a warning notification from the image sensing apparatus 100. If the contents of the received notification represent a warning notification from the image sensing apparatus 100 (YES in step S1303), the communication system controller 350 sets and stores the warning display contents in a predetermined area of the internal memory of the communication system controller 350 and/or the memory 352 (step S1304), and the flow advances to step S1305.

In this way, the notification unit 360 of the communication apparatus 300 can be set to display the warning notification about the image sensing apparatus 100, which is transmitted from the image sensing apparatus 100.

If it is determined that the contents of the received notification represent not a warning notification from the image sensing apparatus 100 (NO in step S1303) but a status notification from the image sensing apparatus 100 (YES in step S1306), the communication system controller 350 determines the contents of the status notification from the image sensing apparatus 100 (step S1307).

If the contents of the status notification from the image sensing apparatus 100 are determined as other status notification, display according to the notification contents is set and stored (step S1308), and the flow advances to step S1305.

Other status notifications include notifications of single shot/sequential image sensing, a self timer, an image compression ratio, the number of recording pixels, the number of sensed images, the number of recordable images, a shutter speed, an f number, exposure compensation, flash illumination, pink-eye effect mitigation, macro image sensing, a buzzer-set state, a timer battery level, an error state, operation of communication I/F, and date and time.

In this way, the notification of the operating status of the image sensing function, such as the image sensing mode, photometry mode, single shot/sequential image sensing/self image sensing mode, auto focus mode, distance measurement point selection, the number of recorded images, the number of recordable images, shutter speed setting, f number setting, exposure compensation, flash illumination, remaining battery level detection, error state detection, or communication, can be sent.

If the contents of the status notification from the image sensing apparatus 100 are determined in step S1307 as a status notification related to the remaining battery level, in accordance with the received remaining battery level (step S1309), the communication system controller 350 sets the camera battery level indication to H, which represents that the battery level is sufficient to continue the operation of the image sensing apparatus 100 (step S1310), or to L, which represents that the battery level is too low to continue the operation of the image sensing apparatus 100 (step S1311), and flow advances to step S1305.

In this way, the notification unit 360 of the communication apparatus 300 can be set to display the remaining battery level status of the image sensing apparatus 100, which is sent from the image sensing apparatus 100.

If the contents of the received notification do not represent a status notification from the image sensing apparatus 100 (NO in step S1306), the flow advances to step S1305.

In step S1305, the communication system controller 350 sets the camera display flag stored in a predetermined area of the internal memory of the communication system controller 350 and/or the memory 352, and the reception processing routine is ended.

As described above, according to the fourth embodiment, the image sensing apparatus 100 notifies the communication apparatus 300 of the status of the image sensing apparatus 100, and the communication apparatus 300 can display the status of the image sensing apparatus 100 in accordance with the received status of the image sensing apparatus 100.

In addition, the image sensing apparatus 100 notifies the communication apparatus 300 of various statuses, including remaining battery level status, in accordance with the power ON/OFF status of the image sensing apparatus 100, and the communication apparatus 300 can display various statuses of the image sensing apparatus 100, including the remaining battery level, in accordance with the received various statuses including the remaining battery level.

<Fifth Embodiment>

<Description of Arrangement of Image Sensing Apparatus 400>

Figure 28:
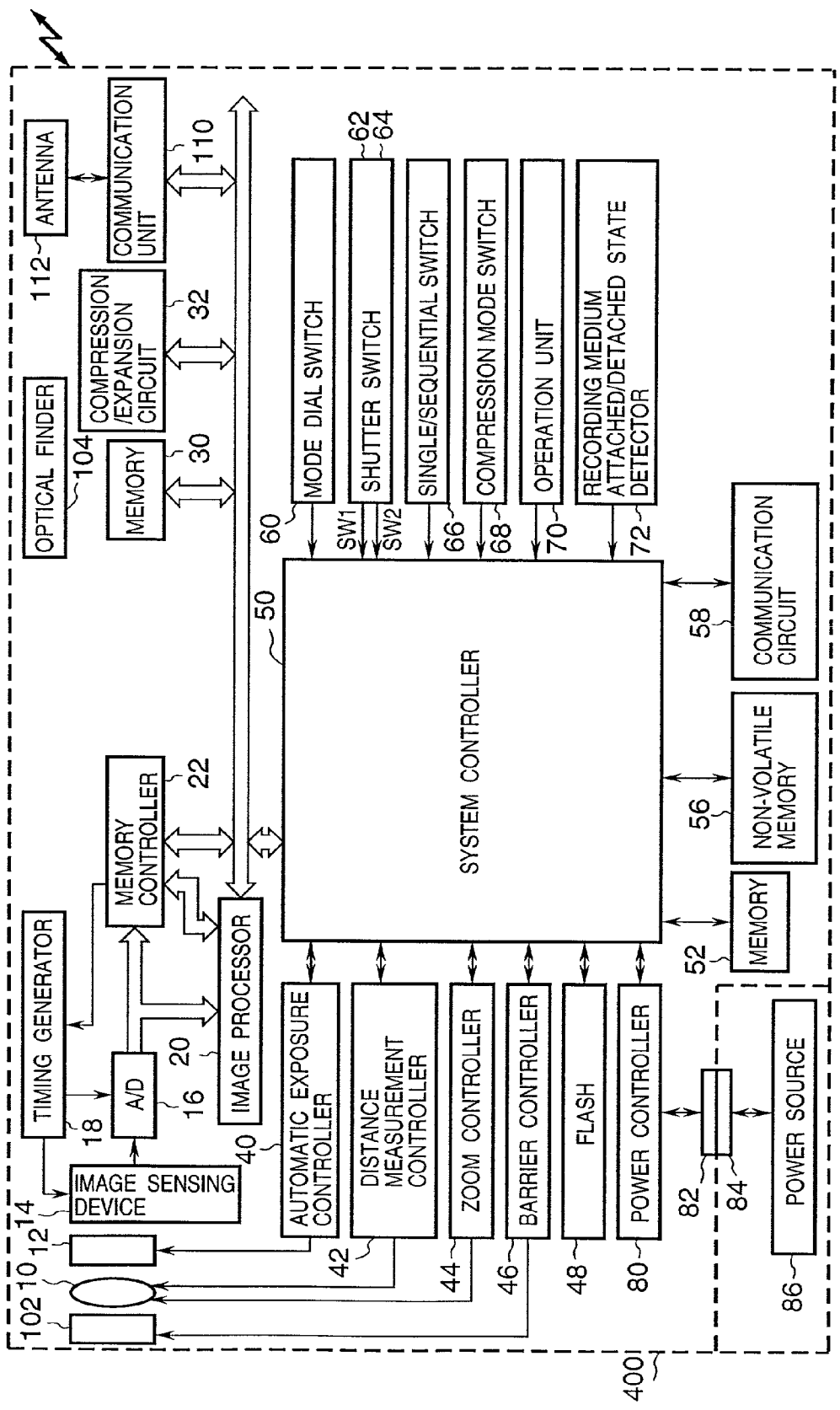
FIG. 28 is a block diagram showing the arrangement of an image sensing apparatus according to the fifth embodiment of the present invention.

FIG. 28 is a block diagram showing the detailed arrangement of an image sensing apparatus 400 according to the fifth embodiment.

The image sensing apparatus 400 shown in FIG. 28 is different from the image sensing apparatus 100 described with reference to FIG. 2 in that the notification unit 54, image display memory 24, D/A converter 26, and image display unit 28 are omitted. The remaining parts are the same as in FIG. 2, and a detailed description thereof will be omitted.

In the system configuration shown in FIG. 1, the image sensing apparatus 400 is used in place of the image sensing apparatus 100.

<Description of Operation of Image Sensing Apparatus 400>

Figure 29:
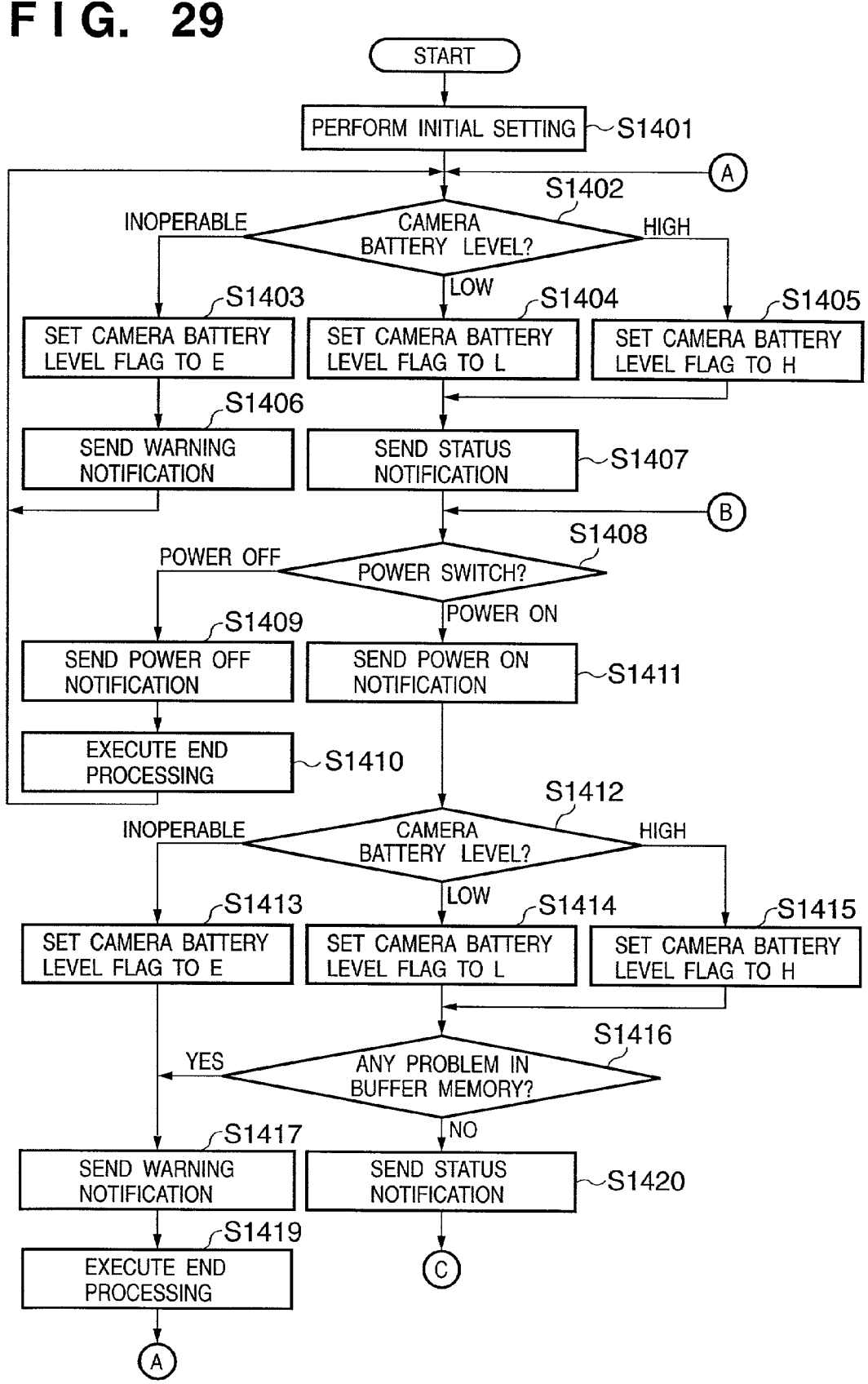
FIG. 29 is a flow chart showing the main routine of a communication apparatus according to the fifth embodiment of the present invention.
Figure 30:
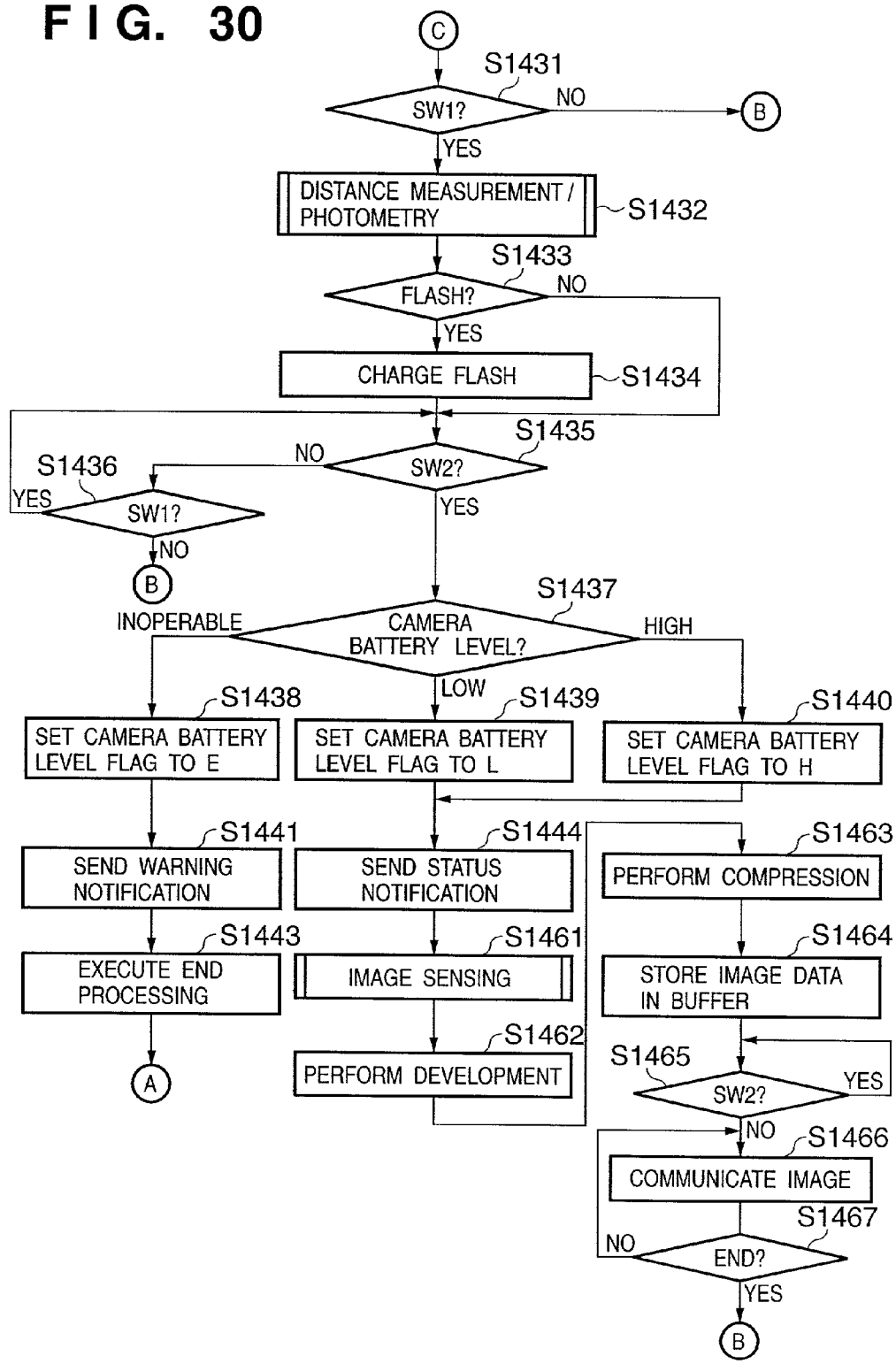
FIG. 30 is a flow chart showing the main routine of the communication apparatus according to the fifth embodiment of the present invention.

The operation of the image sensing apparatus 400 according to the fifth embodiment of the present invention will be described with reference to FIGS. 29 and 30. FIGS. 29 and 30 are flow charts showing the main routine of the image sensing apparatus 400 according to the fifth embodiment.

Processing in steps S1401 to S1416 of FIG. 29 is the same as that in steps S601 to S616 of FIG. 18 of the third embodiment, and a detailed description thereof will be omitted.

In step S1416, the system controller 50 determines whether the operating status of the memory 30 serving as a buffer for obtained image data has any problem for operation of the image sensing apparatus 400 and, more particularly, image data storage/read operation for the memory 30. If NO in step S1416, the flow advances to step S1420. Otherwise, the flow advances to step S1417.

In step S1417, the system controller 50 sends a predetermined warning notification to the communication apparatus 300 through the communication unit 110 and antenna 112 and executes predetermined end processing, e.g., changes the display of each display means to the end state, and if the image sensing apparatus has a protection means such as the barrier 102, closes it to protect the image sensing portion, records necessary parameters, set values, and set modes, including flags and control variables, in a he nonvolatile memory 56, and stops unnecessary power supply to the respective parts of the image sensing apparatus 400, including the image display unit 28, by a power controller 80 (step S1419). After that, the flow returns to step S1402. In the fifth embodiment, the image sensing apparatus 400 executes the next processing without warning that the memory has a problem because the image sensing apparatus 400 has neither the notification unit 54 nor image display unit 28, unlike the third embodiment.

In step S1420, the system controller 50 sends a predetermined status notification representing various set statuses of the image sensing apparatus 400 to the communication apparatus 300 through the communication unit 110 and antenna 112, and the flow advances to step S1431. In the fifth embodiment, the image sensing apparatus 400 executes the next processing without displaying various set statuses because the image sensing apparatus 400 has neither the notification unit 54 nor image display unit 28, unlike the third embodiment.

Processing in steps S1431 to S1440 of FIG. 30 is the same as that in steps S631 to S640 described in the third embodiment with reference to FIG. 19, and a detailed description thereof will be omitted.

In step S1438, the system controller 50 sets the camera battery level flag to E, which represents that the battery level has a problem for continuous operation of the image sensing apparatus 400. After that, in step S1441, the system controller 50 sends a predetermined warning notification to the communication apparatus 300 through the communication unit 110 and antenna 112, and executes predetermined end processing, e.g., changes the display of each display means to the end state, and if the image sensing apparatus has a protection means such as the barrier 102, closes it to protect the image sensing portion, records necessary parameters, set values, and set modes, including flags and control variables, in the nonvolatile memory 56, and stops unnecessary power supply to the respective parts of the image sensing apparatus 400, including the image display unit 28, by the power controller 80 (step S1443). After that, the flow returns to step S1402 in FIG. 29. In the fifth embodiment, the image sensing apparatus 400 executes the next processing without displaying the warning because the image sensing apparatus 400 has neither the notification unit 54 nor image display unit 28, unlike the third embodiment.

The system controller 50 sets the camera battery level flag to L, which represents that the battery level is too low to continue the operation of the image sensing apparatus 400 in step S1439, or to H, which represents that the battery level is sufficient to continue the operation of the image sensing apparatus 400 in step S1440. After that, in step S1444, the system controller 50 sends a predetermined status notification representing various set statuses of the image sensing apparatus 400 to the communication apparatus 300 through the communication unit 110 and antenna 112, and the flow advances to step S1461. In the fifth embodiment, the image sensing apparatus 400 executes the next processing without displaying various set statuses because the image sensing apparatus 400 has neither the notification unit 54 nor image display unit 28, unlike the third embodiment.

Processing from step S1461 is the same as that from step S661 in FIG. 19 described in the third embodiment, and a detailed description thereof will be omitted.

For distance measurement/photometry processing in step S1432, the operation shown in FIG. 7 is performed. For image sensing processing in step S1461, the operation shown in FIG. 8 is performed.

Figure 22:
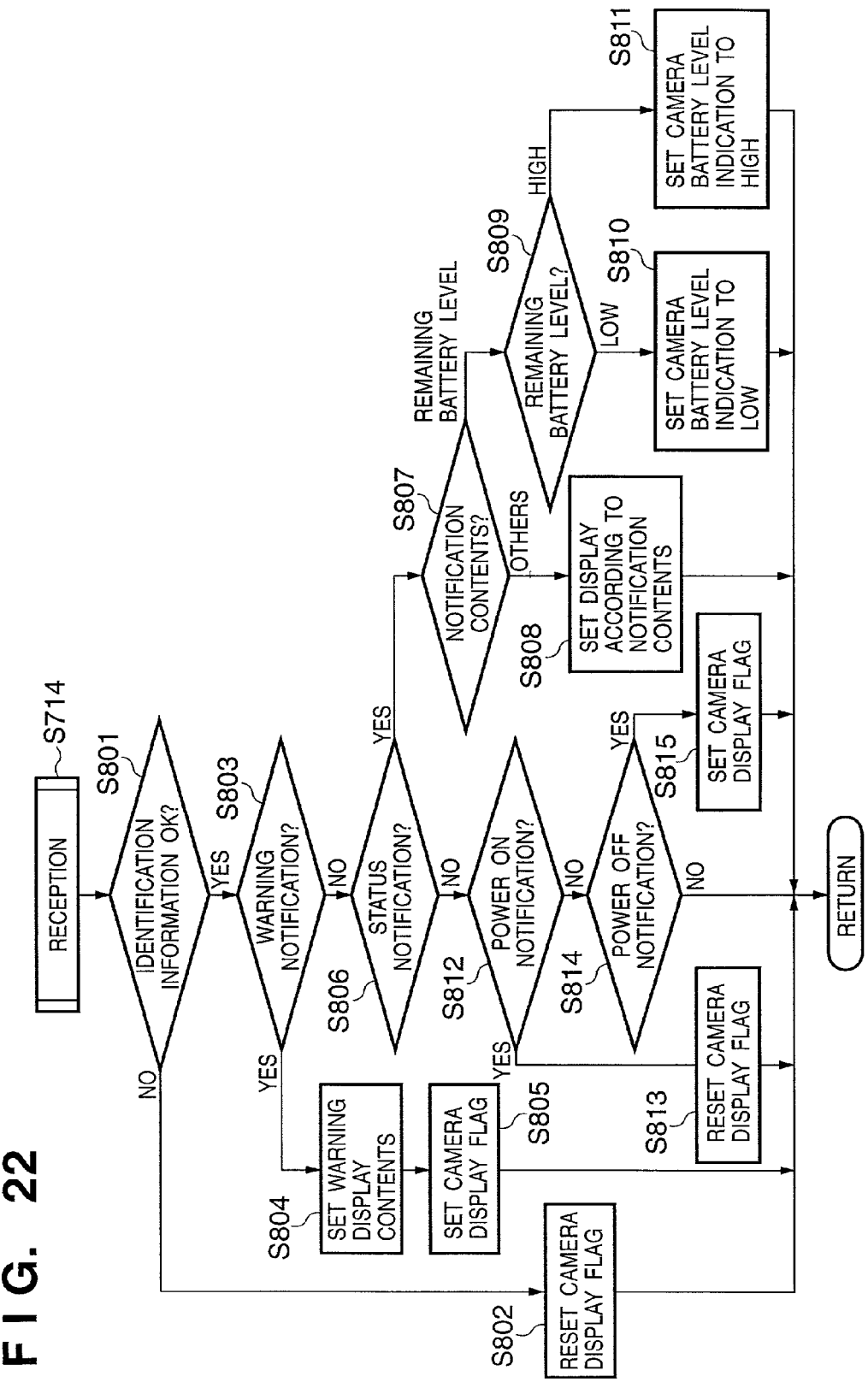
FIG. 22 is a flow chart showing the reception processing routine of the communication apparatus according to the third embodiment of the present invention.

The operation of the communication apparatus 300 according to the fifth embodiment is the same as that described in the third embodiment with reference to FIGS. 20 to 22 except that the communication apparatus 300 communicates not with the image sensing apparatus 100 but with the image sensing apparatus 400.

As described above, according to the fifth embodiment, the image sensing apparatus 400 notifies the communication apparatus 300 of the status of the image sensing apparatus 400, and the communication apparatus 300 determines the received status of the image sensing apparatus 400. The status of the image sensing apparatus 400 can be displayed on the communication apparatus 300 in accordance with the determination result.

The image sensing apparatus 400 notifies the communication apparatus 300 of various statuses of the image sensing apparatus 400, including the power ON/OFF status and remaining battery level status, and the communication apparatus 300 determines the received power ON/OFF status of the image sensing apparatus 400. Various statuses of the image sensing apparatus 400, including the remaining battery level status, can be displayed on the communication apparatus 300 in accordance with the determination result.

When it is determined that the image sensing apparatus 400 is in the power ON state, various statuses of the image sensing apparatus 400, including the remaining battery level status, can be displayed on the communication apparatus 300.

According to the present invention, the statuses of an image sensing apparatus such as an electronic camera communicable with a communication apparatus such as a portable telephone can be checked on the communication apparatus.

<Other Embodiment>

In the description of the above embodiments, various statuses of the image sensing apparatus 100 or 400 are displayed on the communication apparatus 300 in accordance with the power ON/OFF status of the image sensing apparatus 100 or 400. However, various statuses of the image sensing apparatus 100 or 400 may be displayed on the communication apparatus 300 in accordance with various image sensing operations of the image sensing apparatus 100 or 400.

For example, various statuses of the image sensing apparatus 100 or image sensing apparatus 400, including the remaining battery level status, may be displayed on the communication apparatus 300 in accordance with, e.g., the operation of the release button of the image sensing apparatus 100 or 400.

In addition, the frequency of warning notification and/or status notification from the image sensing apparatus 100 to the communication apparatus 300 may be changed in accordance with the power ON/OFF statuses of the image sensing apparatus 100 or 400.

For example, when the image sensing apparatus 100 or 400 is powered on, the warning notification and/or status notification from the image sensing apparatus 100 or 400 to the communication apparatus 300 may be often sent. When the image sensing apparatus 100 or 400 is powered off, the warning notification and/or status notification from the image sensing apparatus 100 or 400 to the communication apparatus 300 may be sent at low frequency.

When the warning notification and/or status notification from the image sensing apparatus 100 or 400 to the communication apparatus 300 is performed after mutual authentication using the identification information holding unit 58 of the image sensing apparatus 100 or 400 and the identification information holding unit 356 of the communication apparatus 300, any notification error to another device or notification reception error from another device can be prevented. To implement this processing, a means for registering information of which device is to be exchanged is provided in the image sensing apparatus 100 or 400 and the communication apparatus 300. Information registered by the registration means is recorded in the identification information holding unit 58 or 356. With this arrangement, devices set by the user can exchange the information.

In the description of the first to fifth embodiments, a single image sensing apparatus 100 or 400 and a single communication apparatus 300 are combined. However, an image sensing system may be built by combining a single or an arbitrary number of image sensing apparatuses and a single or an arbitrary number of communication apparatuses.

In the above description, the communication apparatus 300 is configured as connectable to the detachable recording medium 200. However, the image sensing apparatus 100 or 400 may have a configuration to connect to the detachable recording medium 200.

Further, it is also possible to configure both of the image sensing apparatus 100 or 400 and communication apparatus 300 to be connectable to the detachable recording medium 200.

In this case, a warning notification of the number of images recorded on the recording medium 200 attached to the image sensing apparatus 100 or 400, or the number of images recordable on the recording medium 200 may be sent from the image sensing apparatus 100 or 400 to the communication apparatus 300 as well as the remaining battery level warning notification.

The recording medium 200 may be not only a memory card such as a PCMCIA card, CF (Compact Flash) card, or MMC (Multi-Media Card), or SD (Secure Digital) card, or a hard disk, but also a micro DAT, a magnetooptical disk, an optical disk such as a CD-R or CD-WR, or a phase change optical disk such as a DVD. The recording medium 200 may be a composite medium of a memory card and hard disk. Also, the composite medium may be partially detachable.

In the description of the above embodiments, the recording medium 200 is separated from the communication apparatus 300 and can be arbitrary connected. However, the recording medium 200 may be kept fixed in the communication apparatus 300.

Further, the communication apparatus 300 may be configured so as to connect a single or an arbitrary number of recording media 200.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore to apprise the public of the scope of the present invention, the following claims are made.

What is claimed is:

1. An image sensing system comprising at least one image sensing apparatus and at least one communication apparatus, wherein said communication apparatus comprises transmission means for transmitting an operating status of a power source function of said communication apparatus to said image sensing apparatus; and said image sensing apparatus comprises image sensing means, reception means for receiving the operating status transmitted from said transmission means, first status determination means for determining the operating status of the power source function of said communication apparatus, which is received by said reception means, and display means for displaying the operating status of the power source function of said communication apparatus in accordance with a determination result obtained by said first status determination means.

2. The system according to claim 1, wherein said image sensing apparatus executes authentication processing for said communication apparatus, and when authentication is successful, allows said display means to display the operating status of the power source function of said communication apparatus.

3. The system according to claim 1, wherein said communication apparatus executes authentication processing for said image sensing apparatus, and when authentication is successful, transmits the operating status to said image sensing apparatus.

4. The system according to claim 1, wherein said image sensing apparatus further comprises second status determination means for determining an operating status of said image sensing apparatus, and said transmission means further transmits an operating status of a communication function of said communication apparatus, wherein the operating status of said image sensing apparatus is an operating status of an image sensing switch of said image sensing apparatus, and said display means displays at least one of the operating status of the power source function and the operating status of the communication function in accordance with a determination result of the status of the image sensing switch by said second status determination means.

5. The system according to claim 4, wherein when the determination result by said second status determination means represents that image sensing is being prepared for or image sensing is progressing, display of the operating status of the power source function of said communication apparatus by said display means is stopped.

6. The system according to claim 4, wherein when the determination result by said second status determination means represents that image sensing is being prepared for or image sensing is progressing, frequency of display of the operating status of the power source function of said communication apparatus by said display means is made lower than that when image sensing is not being prepared for or image sensing is not progressing.

7. The system according to claim 4, wherein the operating status of the communication function includes a call termination notification status.

8. The system according to claim 4, wherein the operating status of said image sensing apparatus includes at least one of an operating status of a power source function and an operating status of an image sensing function of said image sensing apparatus.

9. The system according to claim 8, wherein the operating status of the power source function is a status of a power switch of said image sensing apparatus, and the operating status of the image sensing function is at least one of operating statuses of an image sensing mode, photometry mode, single shot/sequential image sensing/self image sensing mode, auto focus mode, distance measurement point selection, the number of recorded images, the number of recordable images, shutter speed setting, f number setting, exposure compensation, flash illumination, remaining battery level detection, error state detection, and communication.

10. The system according to claim 1, wherein said display means for displaying the operating status of the power source function of said communication apparatus is used for image sensing by said image sensing apparatus.

11. A control method for an image sensing system comprising at least one image sensing apparatus and at least one communication apparatus, comprising:
   transmission step of transmitting an operating status of a power source function of the communication apparatus to the image sensing apparatus;
   a reception step of receiving the operating status transmitted in said transmission step;
   a first status determination step, of determining the operating status of the power source function of the communication apparatus, which is received in said reception step; and
   a display step, of displaying the operating status of the power source function of the communication apparatus in accordance with a determination result in said first status determination step.

12. The method according to claim 11, further comprising the step of executing authentication processing for the communication apparatus in the image sensing apparatus,
   wherein when authentication is successful, the operating status of the power source function of the communication apparatus is allowed to be displayed in said display step.

13. The method according to claim 11, further comprising the step of executing authentication processing for the image sensing apparatus in the communication apparatus,
   wherein when authentication is successful, the operating status is transmitted to the image sensing apparatus.

14. The method according to claim 11, further comprising a second status determination step of determining an operating status of the image sensing apparatus in the image sensing apparatus, and
   a second transmission step, of transmitting an operating status of a communication function of the communication apparatus,
   wherein the operating status of the image sensing apparatus is an operating status of an image sensing switch of the image sensing apparatus, and at least one of the operating status of the power source function and the operating status of the communication function is displayed in said display step in accordance with a determination result of the status of the image sensing switch obtained in said second status determination step.

15. The method according to claim 14, wherein when the determination result obtained in said second status determination step represents that image sensing is being prepared for or image sensing is progressing, display of the operating status of the power source function of the communication apparatus in said display step is stopped.

16. The method according to claim 14, wherein when the determination result obtained in said second status determination step represents that image sensing is being prepared for or image sensing is progressing, frequency of display of the operating status of the power source function of the communication apparatus in said display step is made lower than that when image sensing is not being prepared for or image sensing is not progressing.

17. The method according to claim 14, wherein the operating status of the communication function includes a call termination notification status.

18. The method according to claim 14, wherein the operating status of the image sensing apparatus includes at least one of an operating status of a power source function and an operating status of an image sensing function of the image sensing apparatus.

19. The method according to claim 18, wherein
   the operating status of the power source function is a status of a power switch of the image sensing apparatus, and
   the operating status of the image sensing function is at least one of operating statuses of an image sensing mode, photometry mode, single shot/sequential image sensing/self image sensing mode, auto focus mode, distance measurement point selection, the number of recorded images, the number of recordable images, shutter speed setting, f number setting, exposure compensation, flash illumination, remaining battery level detection, error state detection, and communication.

20. A computer program product comprising a computer usable medium having computer readable program code means embodied in said medium for controlling an image sensing system comprising at least one image sensing apparatus and at least one communication apparatus, said product including:
   first computer readable program code means for transmitting an operating status of a power source function of the communication apparatus to the image sensing apparatus;
   second computer readable program code means for receiving the operating status;
   third computer readable program code means for determining the operating status of the power source function of the communication apparatus; and
   fourth computer readable program code means for displaying the operating status of the power source function of the communication apparatus in accordance with a determination result obtained by said third computer readable program code means.

21. An image sensing apparatus capable of transmitting image data to an external communication apparatus by communication, comprising:
   image sensing means;
   reception means for receiving an operating status of a power source function of said external communication apparatus from said external communication apparatus;
   first status determination means for determining the operating status of the power source function of said external communication apparatus, which is received by said reception means; and
   display means for displaying the operating status of the power source function of said external communication apparatus in accordance with a determination result by said first status determination means.

22. The apparatus according to claim 21, wherein the image sensing apparatus executes authentication processing for said external communication apparatus, and when authentication is successful, allows said display means to display the operating status of the power source function of said external communication apparatus.

23. The apparatus according to claim 21, further comprising second status determination means for determining an operating status of the image sensing apparatus,
   wherein said reception means further receives an operating status of a communication function of said external communication apparatus, wherein the operating status of the image sensing apparatus is an operating status of an image sensing switch of the image sensing apparatus, and said display means displays at least one of the operating status of the power source function and the operating status of the communication function in accordance with a determination result of the status of the image sensing switch obtained by said second status determination means.

24. The apparatus according to claim 23, wherein when the determination result obtained by said second status determination means represents that image sensing is being prepared for or image sensing is progressing, display of the operating status of the power source function of said external communication apparatus by said display means is stopped.

25. The apparatus according to claim 23, wherein when the determination result obtained by said second status determination means represents that image sensing is being prepared for or image sensing is progressing, frequency of display of the operating status of the power source function of said external communication apparatus by said display means is made lower than that when image sensing is not being prepared for or image sensing is not progressing.

26. The apparatus according to claim 23, wherein the operating status of the communication function includes a call termination notification status.

27. The apparatus according to claim 23, wherein the operating status of the image sensing apparatus includes at least one of an operating status of a power source function and an operating status of an image sensing function of the image sensing apparatus.

28. The apparatus according to claim 27, wherein
the operating status of the power source function is a status of a power switch of the image sensing apparatus, and
the operating status of the image sensing function is at least one of operating statuses of an image sensing mode, photometry mode, single shotsequential image sensing/self image sensing mode, auto focus mode, distance measurement point selection, the number of recorded images, the number of recordable images, shutter speed setting, f number setting, exposure compensation, flash illumination, remaining battery level detection, error state detection, and communication.

29. The apparatus according to claim 21, wherein said display means for displaying the operating status of the power source function of said external communication apparatus comprises display means used for image sensing by the image sensing apparatus.

30. A control method for an image sensing apparatus capable of transmitting image data to an external communication apparatus by communication, comprising:
a reception step, of receiving an operating status of a power source function of the external communication apparatus, which is transmitted from the external communication apparatus;
a first status determination step, of determining the operating status of the power source function of the external communication apparatus, which is received in said reception step; and
a display step, of displaying the operating status of the power source function of the external communication apparatus in accordance with a determination result obtained in said first status determination step.

31. The method according to claim 30, further comprising the step of executing authentication processing for the external communication apparatus,
wherein when authentication is successful, the operating status of the power source function of the external communication apparatus is allowed to be displayed in said display step.

32. The method according to claim 30, further comprising a second status determination step, of determining an operating status of the image sensing apparatus, and
a second transmission step, of transmitting an operating status of a communication function of the external communication apparatus,
wherein the operating status of the image sensing apparatus is an operating status of an image sensing switch of the image sensing apparatus, and at least one of the operating status of the power source function and the operating status of the communication function is displayed in said display step in accordance with a determination result of the status of the image sensing switch obtained in said second status determination step.

33. The method according to claim 32, wherein when the determination result obtained in said second status determination step represents that image sensing is being prepared for or image sensing is progressing, display of the operating status of the power source function of the external communication apparatus in said display step is stopped.

34. The method according to claim 32, wherein when the determination result obtained in said second status determination step represents that image sensing is being prepared for or image sensing is progressing, frequency of display of the operating status of the power source function of the external communication apparatus in said display step is made lower than that when image sensing is not being prepared for or image sensing is not progressing.

35. The method according to claim 32, wherein the operating status of the communication function includes a call termination notification status.

36. The method according to claim 32, wherein the operating status of the image sensing apparatus includes at least one of an operating status of a power source function and an operating status of an image sensing function of the image sensing apparatus.

37. The method according to claim 36, wherein
the operating status of the power source function is a status of a power switch of the control method for the image sensing apparatus, and
the operating status of the image sensing function is at least one of operating statuses of an image sensing mode, photometry mode, single shotsequential image sensing/self image sensing mode, auto focus mode, distance measurement point selection, the number of recorded images, the number of recordable images, shutter speed setting, f number setting, exposure compensation, flash illumination, remaining battery level detection, error state detection, and communication.

38. A computer program product comprising a computer usable medium having computer readable program code means embodied in said medium for controlling an image sensing apparatus capable of transmitting image data to an external communication apparatus by communication, said product including:
first computer readable program code means for receiving an operating status of a power source function of the external communication apparatus, which is transmitted from the external communication apparatus;

second computer readable program code means for determining the received operating status of the power source function of the external communication apparatus; and third computer readable program code means for displaying the operating status of the power source function of the external communication apparatus in accordance with a determination result obtained by said second computer readable program code means.

39. A communication apparatus capable of receiving image data from an external image sensing apparatus by communication, comprising transmission means for transmitting an operating status of a power source function of said communication apparatus to said external image sensing apparatus.

40. The apparatus according to claim 39, wherein the communication apparatus executes authentication processing for said external image sensing apparatus, and when authentication is successful, transmits the operating status to said external image sensing apparatus.

41. The apparatus according to claim 39, wherein said transmission means further transmits an operating status of a communication function of the communication apparatus.

42. The apparatus according to claim 41, wherein the operating status of the communication function includes a call termination notification status.

43. A control method for a communication apparatus capable of receiving image data from an external image sensing apparatus by communication, comprising the transmission step of transmitting an operating status of a power source function of the communication apparatus to the external image sensing apparatus.

44. The method according to claim 43, further comprising the step of executing authentication processing for the external image sensing apparatus, wherein when authentication is successful, the operating status is transmitted to the external image sensing apparatus.

45. The method according to claim 43, further comprising transmitting an operating status of a communication function of the communication apparatus.

46. The method according to claim 45, wherein the operating status of the communication function includes a call termination notification status.

* * * * *

UNITED STATES PATENT AND TRADEMARK OFFICE
CERTIFICATE OF CORRECTION

PATENT NO. : 6,982,747 B2  
APPLICATION NO. : 09/858454  
DATED : January 3, 2006  
INVENTOR(S) : Yoichi Yamagishi Page 1 of 1

It is certified that error appears in the above-identified patent and that said Letters Patent is hereby corrected as shown below:

COLUMN 43:

Line 1, "S705," should read --S705--.

COLUMN 59:

Line 12, "transmission step" should read --a transmission step,--;  
    Line 15, "step" should read --step,--; and  
    Line 38, "step" should read --step,--.

COLUMN 61:

Line 40, "shotsequential" should read --shot/sequential--.

COLUMN 62:

Line 51, "shotsequential" should read --shot/sequential--.

Signed and Sealed this

Fifth Day of August, 2008

JON W. DUDAS  
*Director of the United States Patent and Trademark Office*